(12) United States Patent
Unagami et al.

(10) Patent No.: US 8,769,312 B2
(45) Date of Patent: *Jul. 1, 2014

(54) TAMPERING MONITORING SYSTEM, PROTECTION CONTROL MODULE, AND DETECTION MODULE

(75) Inventors: Yuji Unagami, Osaka (JP); Yuichi Futa, Osaka (JP); Natsume Matsuzaki, Osaka (JP); Hiroki Shizuya, Miyagi (JP); Eisuke Koizumi, Miyagi (JP); Shingo Hasegawa, Miyagi (JP)

(73) Assignee: Panasonic Corporation, Osaka (JP)

( * ) Notice: Subject to any disclaimer, the term of this patent is extended or adjusted under 35 U.S.C. 154(b) by 13 days.

This patent is subject to a terminal disclaimer.

(21) Appl. No.: 13/513,664

(22) PCT Filed: Oct. 19, 2011

(86) PCT No.: PCT/JP2011/005858
§ 371 (c)(1),
(2), (4) Date: Jun. 4, 2012

(87) PCT Pub. No.: WO2012/056656
PCT Pub. Date: May 3, 2012

(65) Prior Publication Data
US 2012/0246490 A1    Sep. 27, 2012

(30) Foreign Application Priority Data
Oct. 28, 2010 (JP) .................. 2010-241986

(51) Int. Cl.
*G06F 21/22* (2006.01)
*G06F 21/55* (2013.01)
*H04L 9/08* (2006.01)
*H04L 9/32* (2006.01)

(52) U.S. Cl.
CPC .............. *G06F 21/55* (2013.01); *G06F 21/554* (2013.01); *H04L 9/085* (2013.01); *H04L 9/3236* (2013.01); *H04L 9/3247* (2013.01)
USPC ........... 713/193; 713/156; 713/158; 713/171; 713/176; 713/181; 726/22; 726/23; 726/24; 726/27; 380/33; 380/34; 380/38; 380/277

(58) Field of Classification Search
CPC ......... G06F 21/50; G06F 21/52; G06F 21/54; G06F 21/55; G06F 21/554; G06F 21/556; H04L 9/085; H04L 9/3236; H04L 9/3247; H04L 9/3268; H04L 2209/60
USPC ......... 713/190–193, 150, 156, 168, 171, 176, 713/181, 200; 726/22, 23, 27; 380/38, 33, 380/201, 277
See application file for complete search history.

(56) References Cited

U.S. PATENT DOCUMENTS

| | | |
|---|---|---|
| 6,539,266 B1 | 3/2003 | Ishikawa |
| 2008/0034442 A1* | 2/2008 | Nonaka et al. ................ 726/27 |
| 2009/0019288 A1* | 1/2009 | Oom Temudo de Castro et al. ............................ 713/181 |
| 2010/0180343 A1 | 7/2010 | Maeda et al. |
| 2010/0235588 A1 | 9/2010 | Maeda et al. |
| 2010/0287366 A1 | 11/2010 | Araki |
| 2011/0246783 A1 | 10/2011 | Unagami et al. |

FOREIGN PATENT DOCUMENTS

| | | |
|---|---|---|
| JP | 10-333902 | 12/1998 |
| JP | 3056732 | 6/2000 |
| WO | 2008/093690 | 8/2008 |
| WO | 2008/099682 | 8/2008 |
| WO | 2009/118800 | 10/2009 |
| WO | 2011/033773 | 3/2011 |

OTHER PUBLICATIONS

Kaoru Kurosawa, "Invitation to Modern Encryption", pp. 132-147, Sep. 10, 2010, ISBN978-4-7819-1262-2 (with verified partial English translation of pp. 133-136 and 140-141).
International Search Report issued Dec. 13, 2011 in corresponding International Application No. PCT/JP2011/005858.
"Information technology—Open Systems Interconnection—The Directory: Authentication framework", ITU-T Recommendation X.509, Aug. 1997, pp. 1-71.

Benny Chor et al., "Verifiable Secret Sharing and Achieving Simultaneity in the Presence of Faults", Massachusetts Institute of Technology, Laboratory for Computer Science, 1985, pp. 383-395.

* cited by examiner

*Primary Examiner* — Amare F Tabor
*Assistant Examiner* — Noura Zoubair
(74) *Attorney, Agent, or Firm* — Wenderoth, Lind & Ponack, L.L.P.

(57) ABSTRACT

Tampering monitoring system can detect whether protection control module is tampered with even if some of detection modules are tampered with. Tampering monitoring system includes protection control module detection modules, and management device. Protection control module includes: generation unit generating d pieces of distribution data from computer program, n and d being positive integers, d smaller than n; selection unit selecting d detection modules; and distribution unit distributing d pieces of distribution data to d detection modules. Each detection module judges whether received piece of distribution data is authentic to detect whether protection control module is tampered with, and transmits judgment result indicating whether protection control module is tampered with. Management device receives judgment results from d detection modules and manages protection control module with regard to tampering by using received judgment results.

25 Claims, 40 Drawing Sheets

FIG.12

| Divisional ID info | Reference info | Appl. ID info | Data | Verification value | Certificate |
|---|---|---|---|---|---|
| (3, 1) | 3 | 110 | Encrypted data of appl. 110 | Verification value A for divisional data 1 of appl. 110 Hash (encrypted data of appl.110 ‖ divisional data of appl. 110) | Decryption process certificate Sign (signature secret key, Hash (verification value A ‖ verification value B ‖ verification value C ‖ verification value D ‖ verification value E)) |
| | | 111 | Encrypted data of appl. 111 | Verification value B for divisional data 1 of appl. 111 | |
| | | 112 | Encrypted data of appl. 112 | Verification value C for divisional data 1 of appl. 112 | |
| | | 113 | Encrypted data of appl. 113 | Verification value D for divisional data 1 of appl. 113 | |
| | | 114 | Encrypted data of appl. 114 | Verification value E for divisional data 1 of appl. 114 | |

Verification base data — 630
631, 632, 633a, 633b, 633c, 633d, 633e, 634

FIG.13

Verification base data 650

| Divisional ID info | Reference info | Appl. ID info | Data | Verification value | Certificate |
|---|---|---|---|---|---|
| (3, 2) | 3 | 110 | Encrypted data of appl. 110 | Verification value for divisional data 2 of appl. 110 | Decryption process certificate |
| | | 111 | Encrypted data of appl. 111 | Verification value for divisional data 2 of appl. 111 | |
| | | 112 | Encrypted data of appl. 112 | Verification value for divisional data 2 of appl. 112 | |
| | | 113 | Encrypted data of appl. 113 | Verification value for divisional data 2 of appl. 113 | |
| | | 114 | Encrypted data of appl. 114 | Verification value for divisional data 2 of appl. 114 | |

Verification base data 670

| Divisional ID info | Reference info | Appl. ID info | Data | Verification value | Certificate |
|---|---|---|---|---|---|
| (3, 3) | 3 | 110 | Encrypted data of appl. 110 | Verification value for divisional data 3 of appl. 110 | Decryption process certificate |
| | | 111 | Encrypted data of appl. 111 | Verification value for divisional data 3 of appl. 111 | |
| | | 112 | Encrypted data of appl. 112 | Verification value for divisional data 3 of appl. 112 | |
| | | 113 | Encrypted data of appl. 113 | Verification value for divisional data 3 of appl. 113 | |
| | | 114 | Encrypted data of appl. 114 | Verification value for divisional data 3 of appl. 114 | |

| | | | Verification base data | | Certificate | Partial decryption identifier |
|---|---|---|---|---|---|---|
| | | | | Verification value | | |
| | Reference info | Appl. ID info | Data | | 243a 248a | |
| Data for partial decryption process 1 (241a) | 3 | 110 | Encrypted data of appl. 110 | Decryption verification value of appl. 110 | 244a Decryption process certificate 246a 247a | 001 (249a) |
| | | 111 | Encrypted data of appl. 111 | Decryption verification value of appl. 111 | 245a | |
| | | 112 | Encrypted data of appl. 112 | Decryption verification value of appl. 112 | | |
| | | 113 | Encrypted data of appl. 113 | Decryption verification value of appl. 113 | | |
| | | 114 | Encrypted data of appl. 114 | Decryption verification value of appl. 114 | | |
| | Reference info | Appl. ID info | Data | Verification value | 243b 248b | |
| Data for partial decryption process 2 (241b) | 3 | 110 | Intermediate value 1 of appl. 110 | Decryption verification value of appl. 110 | 244b Decryption process certificate 246b 247b | 002 (249b) |
| | | 111 | Intermediate value 1 of appl. 111 | Decryption verification value of appl. 111 | 245b | |
| | | 112 | Intermediate value 1 of appl. 112 | Decryption verification value of appl. 112 | | |
| | | 113 | Intermediate value 1 of appl. 113 | Decryption verification value of appl. 113 | | |
| | | 114 | Intermediate value 1 of appl. 114 | Decryption verification value of appl. 114 | | |
| | Reference info | Appl. ID info | Data | Verification value | 243c 248c | |
| Data for partial decryption process 3 (241c) | 3 | 110 | Intermediate value 2 of appl. 110 | Decryption verification value of appl. 110 | 244c Decryption process certificate 246c 247c | 003 (249c) |
| | | 111 | Intermediate value 2 of appl. 111 | Decryption verification value of appl. 111 | 245c | |
| | | 112 | Intermediate value 2 of appl. 112 | Decryption verification value of appl. 112 | | |
| | | 113 | Intermediate value 2 of appl. 113 | Decryption verification value of appl. 113 | | |
| | | 114 | Intermediate value 2 of appl. 114 | Decryption verification value of appl. 114 | | |

Verification base data of partial decryption process 1

250a

| | Reference info | Appl. ID info | Data | Verification value | Certificate | Partial decryption identifier |
|---|---|---|---|---|---|---|
| Data for partial decryption process 1 | 3 | 110 | Encrypted data of appl. 110 | Decryption verification value of appl. 110 | Decryption process certificate | 001 |
| | | 111 | Encrypted data of appl. 111 | Decryption verification value of appl. 111 | | |
| | | 112 | Encrypted data of appl. 112 | Decryption verification value of appl. 112 | | |
| | | 113 | Encrypted data of appl. 113 | Decryption verification value of appl. 113 | | |
| | | 114 | Encrypted data of appl. 114 | Decryption verification value of appl. 114 | | |

FIG.38

Verification base data of partial decryption process 2 — 250b

| | Reference info | Appl. ID info | Data | Verification value | Certificate | Partial decryption identifier |
|---|---|---|---|---|---|---|
| Data for partial decryption process 2 | 3 | 110 | Intermediate value 1 of appl. 110 | Decryption verification value of appl. 110 | Decryption process certificate | 002 |
| | | 111 | Intermediate value 1 of appl. 111 | Decryption verification value of appl. 111 | | |
| | | 112 | Intermediate value 1 of appl. 112 | Decryption verification value of appl. 112 | | |
| | | 113 | Intermediate value 1 of appl. 113 | Decryption verification value of appl. 113 | | |
| | | 114 | Intermediate value 1 of appl. 114 | Decryption verification value of appl. 114 | | |

FIG.39

Verification base data of partial decryption process 3

250c

| | | | | | |
|---|---|---|---|---|---|
| | Reference info | Appl. ID info | Data | Verification value | Certificate | Partial decryption identifier |
| Data for partial decryption process 3 | 3 | 110 | Intermediate value 2 of appl. 110 | Decryption verification value of appl. 110 | Decryption process certificate | 003 |
| | | 111 | Intermediate value 2 of appl. 111 | Decryption verification value of appl. 111 | | |
| | | 112 | Intermediate value 2 of appl. 112 | Decryption verification value of appl. 112 | | |
| | | 113 | Intermediate value 2 of appl. 113 | Decryption verification value of appl. 113 | | |
| | | 114 | Intermediate value 2 of appl. 114 | Decryption verification value of appl. 114 | | |

…

TAMPERING MONITORING SYSTEM, PROTECTION CONTROL MODULE, AND DETECTION MODULE

TECHNICAL FIELD

The present invention relates to a technology for monitoring modules and the like that operate in devices.

BACKGROUND ART

In recent years, attempts have been made to develop technologies for protecting application programs by means of software, to prevent the application programs, which include confidential data, from being analyzed by a malicious third party (hereinafter referred to as "attacker").

One of such technologies for protecting application programs by means of software is, for example, a tampering verification technology using hash values. Another example is the decryption load function which is a function to encrypt an application program and store the encrypted application program when the application is not used, and to decrypt the encrypted application program and load the application program into the memory only when the application program is used.

Even when such technology is used, however, the very software that is used to protect application programs (hereinafter, a "protection control module") may be tampered with by the attacker. If the protection control module is tampered with, application programs are also exposed to attack by the attacker. One of the technologies for countering such an attack is to use a detection module that detects whether the protection control module is tampered with.

The detection module attempts to detect tampering of the protection control module by reading all the data constituting the protection control module, calculating the MAC (Message Authentication Code) value, and comparing the calculated MAC value with a MAC value that has been stored in advance.

CITATION LIST

Patent Literature

Patent Literature 1: Japanese Patent No. 3056732
Patent Literature 2: WO2008/099682
Patent Literature 3: WO2009/118800

Non-Patent Literature

Non-Patent Literature 1: Tatsuaki OKAMOTO and Hirosuke YAMAMOTO, "Gendai Ango" (Modern Cryptography), Sangyotosho Inc., 1997 (in Japanese).
Non-Patent Literature 2: ITU-T Recommendation X.509 (1997E): Information Technology—Open Systems Interconnection—The Directory: Authentication Framework, 1997.

SUMMARY OF INVENTION

Technical Problem

However, when a detection module is tampered with and the security of the detection module is deteriorated, there is a risk that the tampered module uses, in an unauthorized manner, the key data included in the protection control module or the function of the protection control module itself. This leads to a possibility that an unauthorized application is installed by the detection module, and user's personal information, contents or the like are leaked by the application.

It is therefore an object of the present invention to provide a tampering monitoring system, a protection control module, a detection module, a control method, and a recording medium with a control program recorded thereon, which can detect tampering of the protection control module even when some of a plurality of detection modules are tampered with.

Solution to Problem

The above object is fulfilled by a tampering monitoring system comprising: a protection control module protecting a computer program; n detection modules monitoring the protection control module, wherein "n" is a positive integer; and a management device, the protection control module including: a generation unit generating d pieces of distribution data from the computer program, wherein "d" is a positive integer smaller than "n"; a selection unit selecting d detection modules from among the n detection modules; and a distribution unit distributing the generated d pieces of distribution data to the selected d detection modules on a one-to-one basis, each of the d detection modules judging whether or not a received piece of distribution data is authentic to detect whether or not the protection control module is tampered with, and transmitting a judgment result indicating whether or not the protection control module is tampered with, and the management device receiving judgment results from the d detection modules and managing the protection control module with regard to tampering by using the received judgment results.

Advantageous Effects of Invention

With this structure, not all the detection modules, but the detection modules selected by the protection control module are caused to execute the detection process. With this structure, even if some detection modules not selected by the protection control module are tampered with and operate in an unauthorized manner, if the selected detection modules are not tampered with, it is regarded as a whole of the tampering monitoring system that the tampering does not have an effect on the tampering detection process targeted for the protection control module. This makes it possible to verify whether or not the protection control module is tampered with.

BRIEF DESCRIPTION OF DRAWINGS

FIG. 12 illustrates the data structure of the verification base data 630 corresponding to divisional data 1.

FIG. 13 illustrates the data structure of the verification base data 650 corresponding to divisional data 2.

FIG. 14 illustrates the data structure of the verification base data 670 corresponding to divisional data 3.

FIG. 32 is a block diagram illustrating the structure of the verification base data distribution unit 220a.

FIG. 33 illustrates the data structure of verification base data 240.

FIG. 37 illustrates the data structure of the verification base data 250a of the partial decryption process 1.

FIG. 38 illustrates the data structure of the verification base data 250b of the partial decryption process 2.

FIG. 39 illustrates the data structure of the verification base data 250c of the partial decryption process 3.

DESCRIPTION OF EMBODIMENTS

Figure 1:
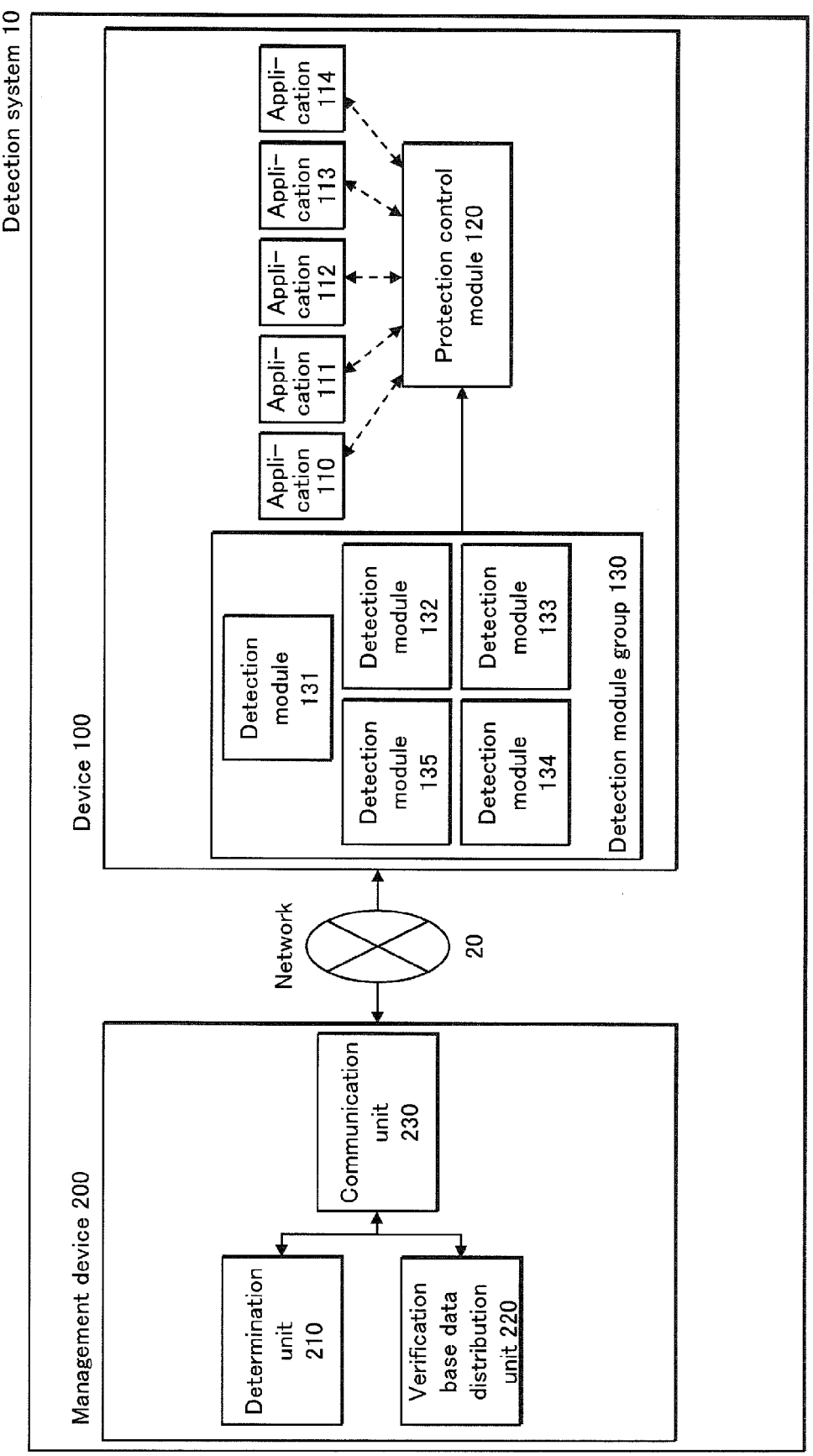
FIG. 1 illustrates the entire structure of the detection system 10 in Embodiment 2.

One aspect of the present invention relates to a tampering monitoring system comprising: a protection control module protecting a computer program; n detection modules monitoring the protection control module, wherein "n" is a positive integer; and a management device, the protection control module including: a generation unit generating d pieces of distribution data from the computer program, wherein "d" is a positive integer smaller than "n"; a selection unit selecting d detection modules from among the n detection modules; and a distribution unit distributing the generated d pieces of distribution data to the selected d detection modules on a one-to-one basis, each of the d detection modules judging whether or not a received piece of distribution data is authentic to detect whether or not the protection control module is tampered with, and transmitting a judgment result indicating whether or not the protection control module is tampered with, and the management device receiving judgment results from the d detection modules and managing the protection control module with regard to tampering by using the received judgment results.

With the above structure, not all the detection modules, but the detection modules selected by the protection control module are caused to execute the detection process. With this structure, even if some detection modules not selected by the protection control module are tampered with and operate in an unauthorized manner, if the selected detection modules are not tampered with, it is regarded as a whole of the tampering monitoring system that the tampering does not have an effect on the tampering detection process targeted for the protection control module. This makes it possible to verify whether or not the protection control module is tampered with.

The above tampering monitoring system may comprise: an information processing device that includes the protection control module and the n detection modules and stores the computer program, the information processing device being connected with the management device via a network.

With the above structure, one information processing device includes the protection control module and the n detection modules, and thus the detection modules can always monitor the protection control module while the information processing device operates.

The above tampering monitoring system may comprise: an information processing device; and n detection devices, the information processing device including the protection control module and storing the computer program, each of the n detection devices including one of the n detection modules, and the information processing device, the n detection devices, and the management device being connected with each other via a network.

With the above structure, the detection devices including the detection modules and the information processing device including the protection control module are connected with each other via a network. This reduces the possibility that the protection control module and the detection modules are tampered with at the same time.

Another aspect of the present invention relates to a protection control module protecting a computer program, the protection control module comprising: a generation unit generating d pieces of distribution data from the computer program, wherein "d" is a positive integer; a selection unit selecting d detection modules from among n detection modules monitoring the protection control module, wherein "n" is a positive integer greater than "d"; and a distribution unit distributing the generated d pieces of distribution data to the selected d detection modules on a one-to-one basis, each of the d detection modules judging whether or not a received piece of distribution data is authentic to detect whether or not the protection control module is tampered with.

With the above structure, not all the detection modules, but the detection modules selected by the protection control module are caused to execute the detection process. With this structure, even if some detection modules not selected by the protection control module are tampered with and operate in an unauthorized manner, if the selected detection modules are not tampered with, it is regarded as a whole of the tampering monitoring system that the tampering does not have an effect on the tampering detection process targeted for the protection control module. This makes it possible to verify whether or not the protection control module is tampered with.

In the above protection control module, the generation unit may include: a storage unit storing an encrypted computer program having been generated by encrypting the computer program; a decryption unit generating a computer program by decrypting the encrypted computer program; and a distribution data generating unit generating the d pieces of distribution data from the generated computer program. Also, in the above protection control module, the distribution data generating unit may generate the d pieces of distribution data by dividing data constituting the computer program.

With the above structure, confidential data that is kept secret by the protection control module itself is not used for the purpose of detecting tampering of the protection control module. This prevents the confidential data from leaking to the detection modules.

In the above protection control module, the distribution data generating unit may generate the d pieces of distribution data from the data constituting the computer program by a verifiable secret sharing scheme, the verifiable secret sharing scheme being a secret sharing scheme for splitting the computer program amongst a plurality of members, each of which is allocated a share of the computer program so that the computer program can be restored by using k or more pieces of split data, wherein "k" is a positive integer smaller than "d".

With the above structure, it is detected whether or not the protection control module is tampered with by using the monitoring results sent from k detection modules that are smaller in number than the d detection modules. It is thus possible to detect tampering of the protection control module even when (d−k) or less detection modules are tampered with.

In the above protection control module, the generation unit may include: a storage unit storing an encrypted computer program having been generated by encrypting the computer program; and a decryption unit generating the d pieces of distribution data from the encrypted computer program when performing a decryption process to decrypt the encrypted computer program, and the decryption process is composed of d decryption sub-processes, and in the decryption process, the d decryption sub-processes are performed in sequence to decrypt the encrypted computer program, and d outputs of the respective d decryption sub-processes are used as the d pieces of distribution data.

With the above structure, confidential data that is kept secret by the protection control module itself is not used for the purpose of detecting tampering of the protection control module. This prevents the confidential data from leaking to the detection modules.

In the above protection control module, the selection unit may hold a correspondence table including one or more pairs of: a combination of d detection modules among the n detection modules; and a piece of identification information identifying the combination of d detection modules, and the selection unit obtains selection information to be used to select a combination of d detection modules, obtains a combination of d detection modules identified by a piece of identification information that corresponds to the obtained selection information, and selects detection modules included in the obtained combination.

In the above protection control module, the selection unit may generate a random number and use the generated random number as the selection information.

In the above protection control module, the selection unit may newly generate selection information each time the distribution unit distributes d pieces of distribution data.

In the above protection control module, each detection module may generate a random number and transmit the generated random number to all of the other detection modules, each detection module may generate selection information by using received random numbers and the random number generated by the detection module itself, and transmit the generated selection information to the protection control module, and the selection unit may receive the selection information from the detection modules, and use the received selection information.

In the above protection control module, a management device managing the protection control module with regard to tampering may generate the selection information and transmit the generated selection information to the protection control module, and the selection unit receives the selection information from the management device and uses the received selection information.

With the above structure, the protection control module cannot select detection modules arbitrarily.

In the above protection control module, the computer program may be one of: an application program to be protected by the protection control module; and a program that indicates an operation procedure of the protection control module.

In the above protection control module, the protection control module may be included in an information processing device, and the information processing device stores the computer program.

A further aspect of the present invention relates to a detection module monitoring a protection control module protecting a computer program, the detection module comprising: a receiving unit receiving a piece of distribution data from the protection control module that generates d pieces of distribution data from the computer program, selects d detection modules from among n detection modules that are for monitoring the protection control module, and distributes the generated d pieces of distribution data to the selected d detection modules, respectively, wherein "n" and "d" are positive integers and "d" is smaller than "n"; a verification unit judging whether or not the received piece of distribution data is authentic; and a transmission unit transmitting a monitoring result indicating that the piece of distribution data is authentic to other detection modules when the verification unit judges that the received piece of distribution data is authentic, the reception unit receiving, from the other detection modules, monitoring results indicating that distribution data received by the other detection modules are authentic, the verification unit judging whether or not the protection control module is tampered with by using the monitoring result of the detection module itself and the received monitoring results, and the transmission unit transmitting a judgment result indicating whether or not the protection control module is tampered with.

With the above structure, confidential data that is kept secret by the protection control module itself is not used for the purpose of detecting tampering of the protection control module. This prevents the confidential data from leaking to the detection modules.

In the above detection module, the detection unit may judge whether or not all of the d detection modules including the detection module itself have judged that the distribution data received by the d detection modules are authentic, by using the monitoring result of the detection module itself and the received monitoring results, determine that the protection control module is not tampered with if it is judged that all of the d detection modules have judged that the received distribution data are authentic, and determine that the protection control module is tampered with if it is judged that at least one of the d detection modules has judged that the received distribution data is not authentic.

With the above structure, not all the detection modules, but the detection modules selected by the protection control module are caused to execute the detection process. With this structure, even if some detection modules not selected by the protection control module are tampered with and operate in an unauthorized manner, if the selected detection modules are not tampered with, it is regarded as a whole of the tampering monitoring system that the tampering does not have an effect on the tampering detection process targeted for the protection control module. This makes it possible to verify whether or not the protection control module is tampered with.

In the above detection module, the protection control module may generate the d pieces of distribution data by a verifiable secret sharing scheme from data constituting the computer program, the verifiable secret sharing scheme being a secret sharing scheme for splitting the computer program amongst a plurality of members, each of which is allocated a share of the computer program so that the computer program can be restored by using k or more pieces of split data, wherein "k" is a positive integer smaller than "d", the detection unit judges whether or not at least k detection modules, including the detection module itself, have judged that the distribution data received by the at least k detection modules are authentic, by using the monitoring result of the detection module itself and the received monitoring results, determines that the protection control module is not tampered with if it is judged that the at least k detection modules have judged that the received distribution data are authentic, and determines that the protection control module is tampered with if it is judged that distribution data received by (d−k+1) or more detection modules are not authentic.

With the above structure, it is detected whether or not the protection control module is tampered with by using the monitoring results sent from k detection modules that are smaller in number than the d detection modules. It is thus possible to detect tampering of the protection control module even when (d−k) or less detection modules are tampered with.

In the above detection module, the n detection modules and the protection control module may be included in an information processing device that stores the computer program.

In the above detection module, the detection module may be included in a detection device, and the protection control module may be included in an information processing device that stores the computer program.

Embodiments of the present invention are described below with reference to the attached drawings.

1. Embodiment 1

(1) The following describes a tampering monitoring system $10d$ of one embodiment of the present invention.

Figure 40:
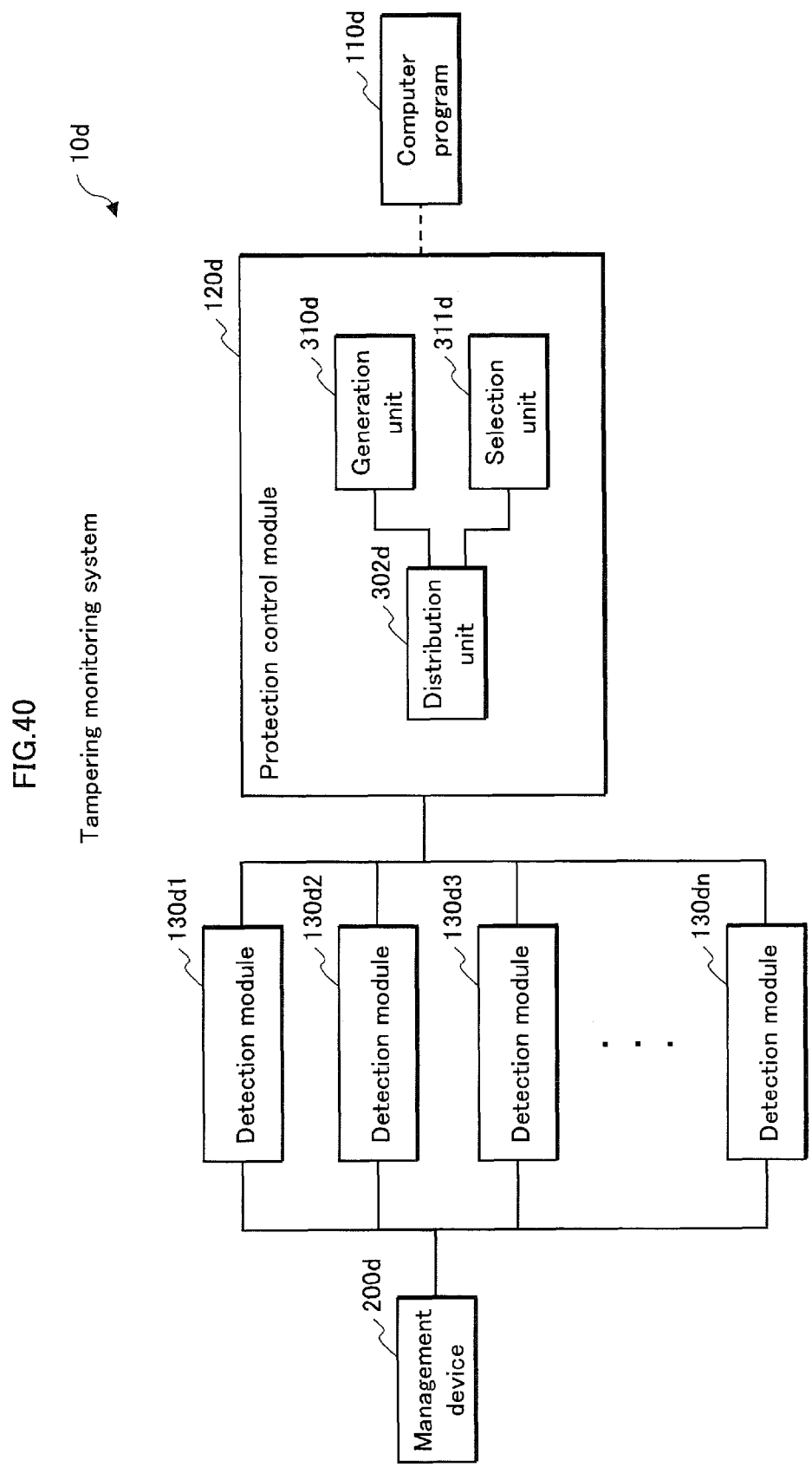
FIG. 40 illustrates the entire structure of the monitoring system 10d in Embodiment 1.

As shown in FIG. 40, the tampering monitoring system $10d$ includes a protection control module $120d$, n detection modules (detection module $130d1$, detection module $130d2$, detection module $130d3$, . . . , and detection module $130dn$), and a management device $200d$.

The protection control module $120d$ protects a computer program $110d$.

The n detection modules, detection module $130d1$, detection module $130d2$, detection module $130d3$, . . . , and detection module $130dn$, monitor the protection control module $120d$.

The protection control module $120d$ includes a generation unit $310d$, a selection unit $311d$, and a distribution unit $302d$.

The generation unit $310d$ generates d pieces of distribution data based on the computer program $110d$, wherein "d" is a positive integer smaller than "n".

The selection unit $311d$ selects d detection modules from among the n detection modules, detection module $130d1$, detection module $130d2$, detection module $130d3$, . . . , and detection module $130dn$.

The distribution unit $302d$ distributes the generated d pieces of distribution data to the selected d detection modules, respectively.

Each of the d detection modules judges whether or not a received piece of distribution data is authentic, judges whether or not the protection control module is tampered with, and transmits a judgment result indicating whether or not the protection control module is tampered with.

The management device $200d$ receives judgment results from the detection modules, and manages the tampering of the protection control module $120d$ based on the received judgment results.

With this structure, not all the detection modules, but the detection modules selected by the protection control module are caused to execute the detection process. With this structure, even if some detection modules not selected by the protection control module are tampered with and operate in an unauthorized manner, if the selected detection modules are not tampered with, it is regarded as a whole of the tampering monitoring system that the tampering does not have an effect on the tampering detection process targeted for the protection control module. This makes it possible to verify whether or not the protection control module is tampered with.

(2) The following structure may be adopted.

The tampering monitoring system $10d$ includes one information processing device (not illustrated). This information processing device includes the protection control module $120d$ and the n detection modules (detection module $130d1$, detection module $130d2$, detection module $130d3$, . . . , and detection module $130dn$), and stores the computer program $110d$.

The information processing device and the management device $200d$ are connected to each other via a network.

(3) The following structure may be adopted.

The tampering monitoring system $10d$ includes one information processing device (not illustrated) and n detection devices (not illustrated).

This information processing device includes the protection control module $120d$ and stores the computer program $110d$.

Each of the n detection devices includes one of the detection modules.

The information processing device, the n detection devices, and the management device $200d$ are connected to each other via a network.

(4) The following structure may be adopted.

(4-1) The generation unit $310d$ includes a storage unit, a decryption unit, and a distribution data generation unit.

The storage unit stores an encrypted computer program generated by encrypting the computer program $110d$.

The decryption unit generates a computer program by decrypting the encrypted computer program.

The distribution data generation unit generates the d pieces of distribution data based on the computer program generated by the decryption unit.

(4-2) The distribution data generation unit generates the d pieces of distribution data by dividing the data constituting the computer program into d pieces.

(4-3) The distribution data generation unit generates the d pieces of distribution data by the verifiable secret sharing scheme from the data constituting the computer program. Note that the verifiable secret sharing scheme is a secret sharing scheme for splitting the computer program amongst a plurality of detection modules, each of which is allocated a share of the computer program so that the computer program can be restored by using k or more pieces of split data, wherein "k" is a positive integer smaller than "d".

(5) The following structure may be adopted.

The generation unit 310d includes a storage unit and a decryption unit.

The storage unit stores an encrypted computer program generated by encrypting the computer program 110d.

The decryption unit generates the d pieces of distribution data during a process of decrypting the encrypted computer program. The decryption process is composed of d decryption sub-processes. In the decryption process, the d decryption sub-processes are performed in sequence to decrypt the encrypted computer program, and d outputs of the respective d decryption sub-processes are used as the d pieces of distribution data.

(6) The following structure may be adopted.

(6-1) The selection unit 311d holds a correspondence table (not illustrated). This correspondence table includes one or more pairs of: a combination of d detection modules among the n detection modules; and a piece of identification information identifying the combination of d detection modules. The selection unit 311d obtains selection information to be used to select a combination of d detection modules, obtains a combination of d detection modules identified by a piece of identification information that corresponds to the obtained selection information, and selects detection modules included in the obtained combination.

(6-2) The selection unit 311d generates a random number, and uses the generated random number as the selection information.

(6-3) The selection unit 311d newly generates selection information each time the distribution unit 302d distributes d pieces of distribution data.

(6-4) Each detection module generates a random number and transmits the generated random number to all of the other detection modules. Also, each detection module generates selection information by using received random numbers and a random number generated by the detection module itself, and transmits the generated selection information to the protection control module.

The selection unit 311d receives the selection information from the detection modules, and uses the received selection information.

(6-5) The management device 200d generates the selection information, and transmits the generated selection information to the protection control module 120d.

The selection unit 311d receives the selection information from the management device 200d, and uses the received selection information.

(7) The computer program 110d may be an application program to be protected by the protection control module 120d, or a program that indicates an operation procedure of the protection control module 120d.

(8) The following structure may be adopted.

(8-1) The detection module 130d1 includes a reception unit, a verification unit, and a transmission unit. The other detection modules have the same structure.

The verification unit receives one piece of the distribution data from the protection control module 120d. Here, the protection control module 120d generates d pieces of distribution data based on the computer program 110d ("d" is a positive integer smaller than "n"), selects d detection modules from among the n detection modules, detection module 130d1, detection module 130d2, detection module 130d3, . . . , and detection module 130dn that are for monitoring the protection control module 120d, and distributes the generated d pieces of distribution data to the selected d detection modules, respectively.

The verification unit judges whether or not a received piece of the distribution data is authentic.

The transmission unit, when the verification unit judges that the received piece of the distribution data is authentic, transmits a monitoring result indicating that the piece of the distribution data is authentic, to the other detection modules.

The reception unit receives, from the other detection modules, monitoring results indicating whether or not distribution data received by the other detection modules are authentic.

The verification unit judges whether or not the protection control module is tampered with by using the monitoring result of the detection module itself and the received monitoring results.

The transmission unit transmits a judgment result indicating whether or not the protection control module is tampered with.

(8-2) The verification unit judges whether or not all of the d detection modules, including the detection module itself, have judged that the distribution data received by them are authentic, by using the monitoring result of the detection module itself and the received monitoring results. When it is determined that the distribution data received by the d detection modules are authentic, it is determined that the protection control module 120d has not been tampered with. When it is determined that distribution data received by at least one of the d detection modules is not authentic, it is determined that the protection control module 120d is tampered with.

(8-3) The protection control module 120d generates the d pieces of distribution data by using the verifiable secret sharing scheme from the data constituting the computer program 110d. Note that the verifiable secret sharing scheme is a secret sharing scheme for splitting the computer program amongst a plurality of detection modules, each of which is allocated a share of the computer program so that the computer program can be restored by using k or more pieces of split data, wherein "k" is a positive integer smaller than "d".

The detection unit (a) judges whether or not all of the k detection modules, including the detection module itself, have judged that the distribution data received by them are authentic, by using the monitoring result of the detection module itself and the received monitoring results. (b) When it is determined that the distribution data received by the k detection modules are authentic, it is determined that the protection control module has not been tampered with. (c) When it is determined that distribution data received by (d—k+1) or more detection modules are not authentic, it is determined that the protection control module is tampered with.

2. Embodiment 2

The following describes another embodiment of the present invention, a detection system 10 including an information processing device and a management device.

2.1 Structure of Detection System 10

As shown in FIG. 1, the detection system 10 includes a device 100, which is an information processing device, and a management device 200. The device 100 and the management device 200 are connected to each other via a network 20.

The device 100 is an information processing device for providing users with various services via the network 20. For example, a user of the device 100 can purchase a music or video content by accessing a content distribution server (not illustrated) via the network 20 and play back the purchased content. Also a user of the device 100 can use a net banking (to make a balance inquiry, send money via direct deposit, and so on) by accessing a system (not illustrated) of a financial institution.

(1) Structure of Device 100

The device 100, as described below, is a computer system composed of a processor, a memory and other units. The device 100 fulfills its functions when the processor operates in accordance with a control computer program stored in the memory.

As shown in FIG. 1, the memory of the device 100 stores application software (hereinafter referred to as "application") 110, an application 111, an application 112, an application 113, an application 114, a protection control module 120, and a detection module group 130. Here, the applications 110, 111, 112, 113, and 114, the protection control module 120, and detection modules included in the detection module group 130 are all computer programs. To fulfill its function, each of these computer programs is composed of a combination of instruction codes that indicate instructions to the computer. The processor operates in accordance with the applications 110, 111, 112, 113, and 114, the protection control module 120, and detection modules included in the detection module group 130. In this manner, the applications 110, 111, 112, 113, and 114, the protection control module 120, and detection modules included in the detection module group 130 fulfill their functions.

As described above, the memory storing the protection control module 120 and the processor constitute one protection control circuit.

The applications 110, 111, 112, 113, and 114 are software, namely computer programs for providing users who use the device 100 via the network, with various functions. For example, the application 110 is software for purchasing a music or video content from a content distribution server (not illustrated), the application 111 is software for playing back the purchased content, and the application 112 is software for using a net banking (to make a balance inquiry, send money via direct deposit, and so on) by accessing a system (not illustrated) of a financial institution.

Each application has confidential data such as an authentication key used in an authentication process performed with the content distribution server or the financial institution. The confidential data is data that needs to be protected from being extracted from an application and used in an unauthorized manner by a malicious third party (hereinafter referred to as "attacker").

The protection control module 120 is a module for controlling functions to protect the applications from attackers who would analyze the applications to extract confidential data such as an authentication key. The functions to protect the applications include, for example, a decryption load function, a tampering detection function, and an analysis tool detection function. The decryption load function is a function to encrypt an application and store the encrypted application when the application is not used, and to decrypt the encrypted application and load the application into the memory only when the application is used. Also, the tampering detection function is a function to check whether or not an application is tampered with. The analysis tool detection function is a function to check whether or not an analysis tool such as a debugger operates.

The protection control module 120 checks, for example, whether or not any of the applications is analyzed by an attacker, by controlling operations of these functions. If it detects an attack by an attacker, the protection control module 120 stops operation of an application from which the attack is detected, and then clears memory areas (by, for example, embedding the memory areas with "0") that are used by the application, in particular, memory areas in which the confidential data is recorded. In this way, it is possible to prevent leakage of the confidential data.

The detection module group 130 is composed of n detection modules, wherein "n" is a positive integer. For example, as shown in FIG. 1, the detection module group 130 is composed of five detection modules, detection modules 131, 132, 133, 134, and 135.

Here, a pair of a memory storing the detection module 131 and a processor constitutes one detection circuit. Similarly, each pair of a memory storing one of the detection modules 132, 133, 134, and 135 and a processor constitutes one detection circuit.

The detection modules 131, 132, 133, 134, and 135 judge whether or not results of the processes of decrypting encrypted applications performed by the protection control module 120 are authentic, to verify whether or not the protection control module 120 is tampered with.

The detection modules transmit monitoring results and judgment results on the protection control module 120 to the management device 200 via the network 20. Here, the monitoring results indicate whether or not the distribution data are authentic, and the judgment results indicate whether or not the protection control module 120 is tampered with.

(2) Structure of Management Device 200

The management device 200 generates verification base data. Here, the verification base data is data that is necessary for verifying whether or not the protection control module 120 is operating correctly. The management device 200 then distributes the generated verification base data to the device 100.

As shown in FIG. 1, the management device 200 includes a determination unit 210, a verification base data distribution unit 220, and a communication unit 230. The communication unit 230 communicates with the device 100 via the network 20. Note that a communication path whose safety is ensured by, for example, allowing encrypted data to be transferred thereon may be used for the communication between the device 100 and the management device 200 via the network.

The management device 200 is specifically a computer system that includes a CPU, a ROM, a RAM, a hard disk unit and the like. The management device 200 fulfills the above functions when the CPU operates in accordance with a computer program stored in the ROM or the hard disk unit.

The determination unit 210 determines a process that is to be executed by the device 100 based on the state of the software (the applications 110, 111, 112, 113, and 114, the protection control module 120, and the detection module group 130) included in the device 100 (namely, for example, based on the state whether or not any software is tampered with), and issues various instructions to the verification base data distribution unit 220. A detailed structure thereof is described below.

The verification base data distribution unit 220 transmits the verification base data to be used by a detection module when the detection module verifies the software (protection control module 120) provided in the device 100. The verification base data is described in detail below.

The communication unit 230 outputs information received from the device 100 to units provided in the management device 200 depending on the information received from the device 100. Also, the communication unit 230 transmits instructions or information from the units provided in the management device 200 to the device 100. More specifically, the communication unit 230 transmits an instruction or a notification from the verification base data distribution unit 220 to the device 100 during the update process, and outputs information from the device 100 such as a result of monitoring the tempering detection to the determination unit 210.

The following explains each module in detail.

(3) Detailed Structure of Protection Control Module 120

Figure 2:
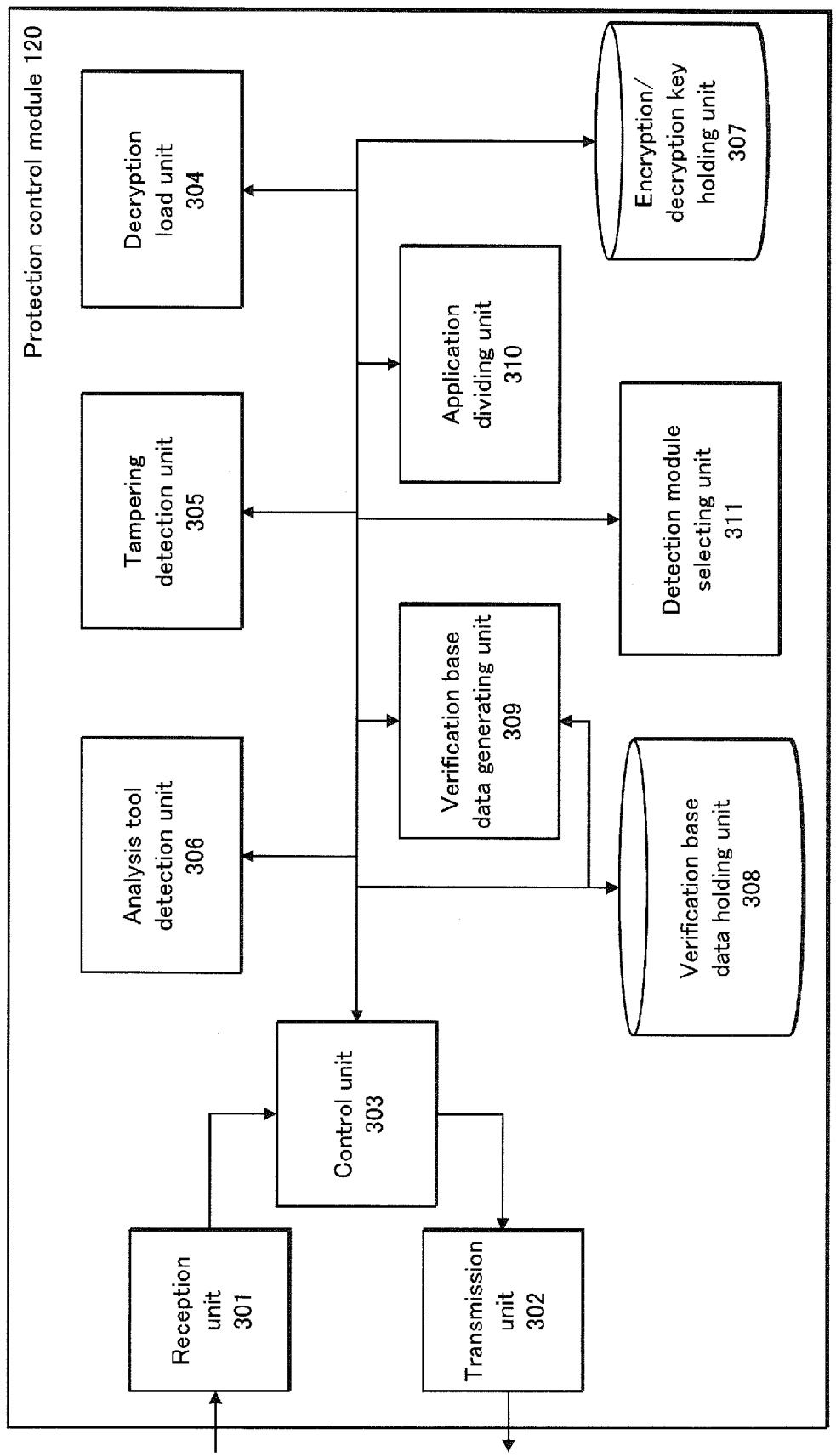
FIG. 2 is a block diagram illustrating the structure of the protection control module 120.

FIG. 2 is a functional block diagram illustrating the functional structure of the protection control module 120.

As shown in FIG. 2, the protection control module 120 includes a reception unit 301, a transmission unit 302, a control unit 303, a decryption load unit 304, a tampering detection unit 305, an analysis tool detection unit 306, an encryption/decryption key holding unit 307, a verification base data holding unit 308, a verification base data generating unit 309, an application dividing unit 310, and a detection module selecting unit 311.

The reception unit 301 receives various requests and the like from the detection modules.

The transmission unit 302 transmits various requests and the like to the detection modules.

The control unit 303 detects an attack being made to any of the applications by controlling the decryption load unit 304, tampering detection unit 305, and analysis tool detection unit 306.

The decryption load unit 304, when executing an encrypted application (one of the applications 110 to 114) held inside the device 100, decrypts the encrypted application (one of the applications 110 to 114) by using an encryption/decryption key, and loads an application (one of the applications 110 to 114) obtained by the decryption into the memory. When a context switch to another application occurs while an application (one of the applications 110 to 114) is executed, the decryption load unit 304 encrypts the data in the memory by using the encryption/decryption key; and when a context switch to the original application (one of the applications 110 to 114) occurs, the decryption load unit 304 decrypts the encrypted data by using the encryption/decryption key.

Note that the context switch is a process performed to store or restore the state (context) of a CPU so that a plurality of processes can share the same CPU.

The tampering detection unit 305 performs a tampering detection process to check whether or not any of the applications is tampered with. The tampering detection process may adopt a method of using a certificate for detecting tampering that is attached to each application, or a method of comparing values of MAC.

Note that the certificate is explained in detail in the Non-Patent Literature 2.

The analysis tool detection unit 306 detects an installation or operation of an analysis tool such as a debugger. This is because it is supposed that an unauthorized attacker might install or operate an analysis tool to attack the applications. An installation or operation of an analysis tool may be detected by a method of searching for a file name, a method of checking whether or not a special register, which is used by a debugger, is used, or a method of detecting an interruption set by a debugger.

The encryption/decryption key holding unit 307 holds the encryption/decryption key that is used to encrypt and decrypt the applications.

The verification base data holding unit 308 holds the verification base data received from the management device 200. The structure of the verification base data is described below.

The verification base data generating unit 309 generates verification base data from the verification base data held by the verification base data holding unit 308.

The application dividing unit 310 divides the data of the application (one of the applications 110 to 114) decrypted by the decryption load unit 304, namely the data constituting the computer program of the application.

The detection module selecting unit 311 selects detection modules that are to perform detections in the detection process. The method for selecting detection modules is described below.

(4) Detailed Structure of Detection Module

The following explains the detection modules 131, 132, 133, 134, and 135 in detail.

Figure 3:
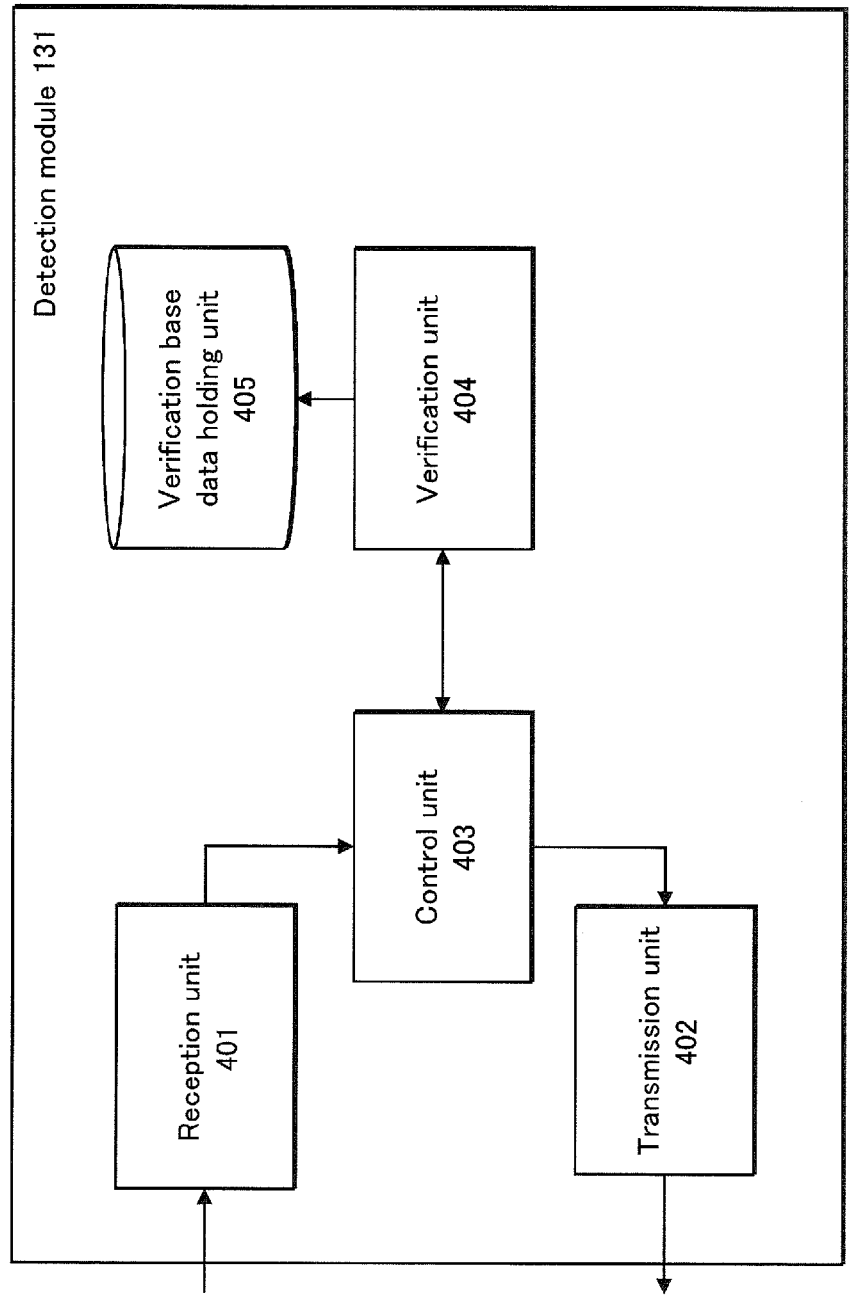
FIG. 3 is a block diagram illustrating the structure of the detection module 131.

FIG. 3 is a block diagram illustrating the functional structure of the detection module 131. The detection modules 132, 133, 134, and 135 have the same structure as the detection module 131, and description thereof is omitted here.

As shown in FIG. 3, the detection module 131 includes a reception unit 401, a transmission unit 402, a control unit 403, a verification unit 404, and a verification base data holding unit 405.

The reception unit 401 receives various instructions from the management device 200. The reception unit 401 also receives results of the processes that have been performed by other modules upon request, and monitoring results on the protection control module 120 from the other detection modules.

The transmission unit 402 transmits data of results of various processes and the like to the management device 200, protection control module 120, and other detection modules.

The control unit 403 performs the verification process on the protection control module 120 by controlling the verification unit 404 based on the various instructions and notifications received by the reception unit 401.

The verification unit 404 verifies whether or not the protection control module 120 is operating normally. As the verification method, in the case of verification on the protection control module 120, the verification unit 404 verifies whether or not the protection control module 120 is operating normally, based on the verification base data held by the verification base data holding unit 405.

The verification base data holding unit 405 holds the verification base data that is used to verify whether or not the decryption load unit 304 of the protection control module 120 operates normally. The verification base data is provided from the protection control module 120.

(5) Detailed Structure of Determination Unit 210

Figure 4:
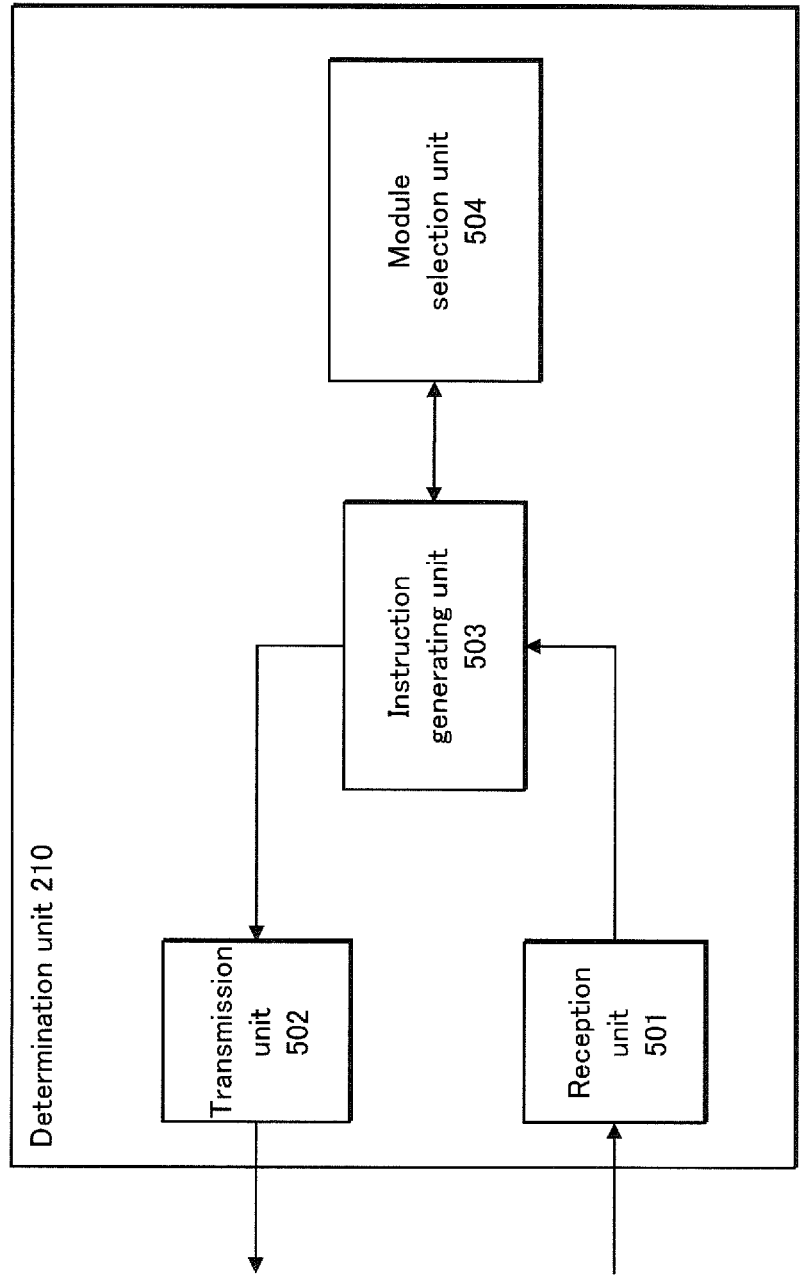
FIG. 4 is a block diagram illustrating the structure of the determination unit 210.

FIG. 4 is a block diagram illustrating the functional structure of the determination unit 210. As shown in FIG. 4, the determination unit 210 includes a reception unit 501, a transmission unit 502, an instruction generating unit 503, and a module selection unit 504.

The reception unit 501 receives monitoring results, various requests and the like from the detection modules, and transmits the received information to the instruction generating unit 503. The reception unit 501 also receives from the verification base data distribution unit 220 a notification that the process is completed, and transmits the received notification to the instruction generating unit 503.

The transmission unit 502 transmits an instruction generated by the instruction generating unit 503 to the verification base data distribution unit 220 in the management device 200.

Upon receiving a request from the protection control module 120 to transmit the verification base data, the instruction generating unit 503 generates an instruction instructing the verification base data distribution unit 220 to distribute the verification base data based on the received request, and outputs the generated instruction to the transmission unit 502. The instruction generating unit 503 also generates an instruction instructing the module selection unit 504 to select detection modules that execute the verification during the execution of the verification process on the protection control module 120, and outputs the generated instruction to the module selection unit 504.

Upon receiving the instruction to select detection modules from the instruction generating unit 503, the module selection unit 504 selects detection modules that execute the verification during the execution of the verification process on the protection control module 120. The module selection unit 504 selects d detection modules from among n detection modules constituting the detection module group 130 held by the device 100, wherein "d" is a positive integer smaller than "n". In this selection, a method of selecting the detection modules in order, for example, selecting the detection modules 131, 132, 133, 134, and 135 in the stated order, may be used. Alternatively, a method of selecting one or more detection modules at random from among a plurality of detection modules may be used. The module selection unit 504 then transmits detection module identifiers of the selected detection modules to the device 100 via the instruction generating unit 503, the transmission unit 502, the communication unit 230, and the network 20.

(6) Detailed Structure of Verification Base Data Distribution Unit 220

Figure 5:
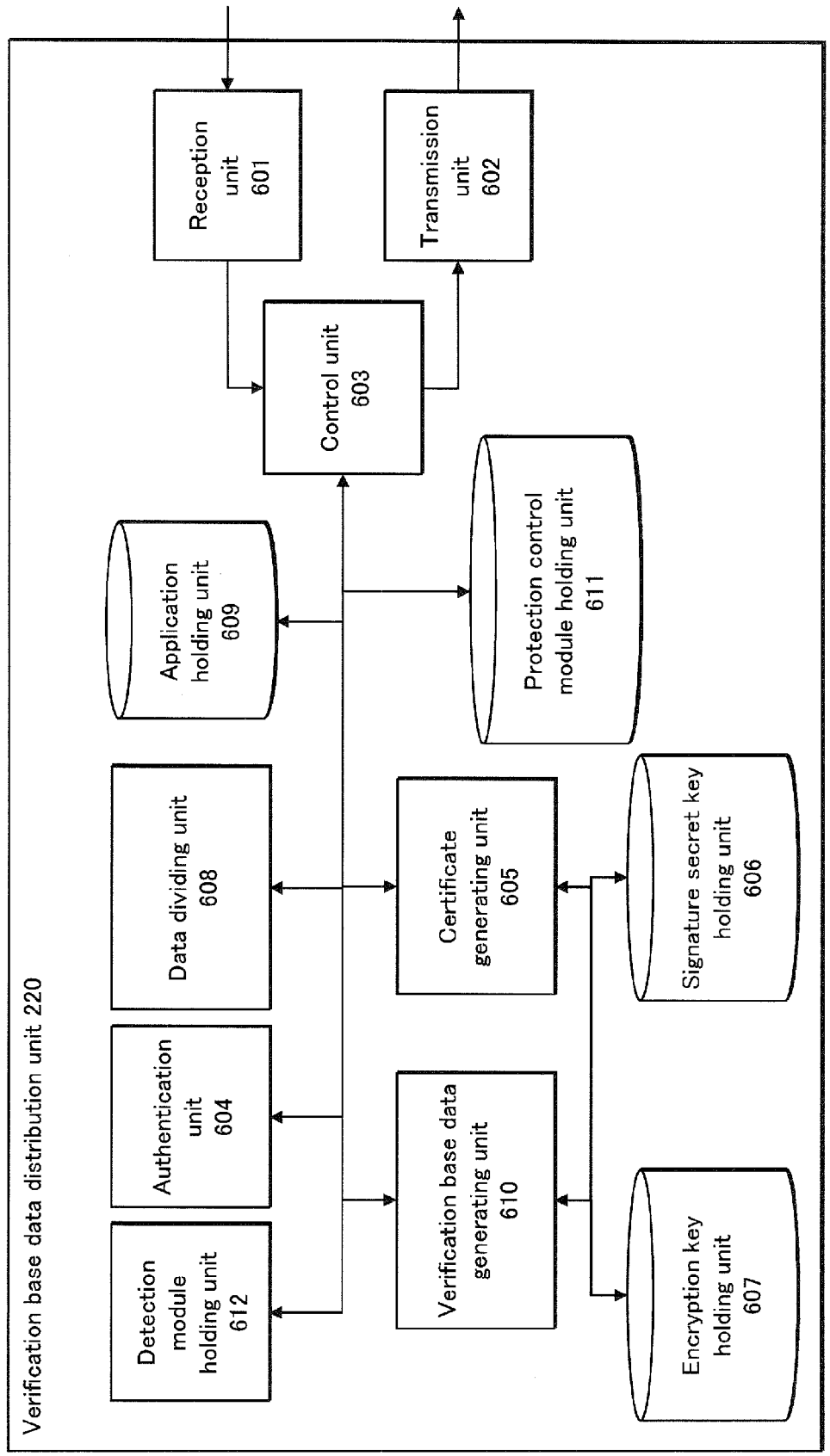
FIG. 5 is a block diagram illustrating the structure of the verification base data distribution unit 220.

FIG. 5 is a functional block diagram illustrating the functional structure of the verification base data distribution unit 220.

As shown in FIG. 5, the verification base data distribution unit 220 includes a reception unit 601, a transmission unit 602, a control unit 603, an authentication unit 604, a certificate generating unit 605, a signature secret key holding unit 606, an encryption key holding unit 607, a data dividing unit 608, an application holding unit 609, a verification base data generating unit 610, a protection control module holding unit 611, and a detection module holding unit 612.

The signature secret key holding unit 606 holds a signature secret key (signature private key) of the management device 200 that is used when the certificate generating unit 605 generates a certificate.

The encryption key holding unit 607 holds the encryption/decryption key shared with the protection control module 120.

The application holding unit 609 holds the data of the applications 110, 111, 112, 113, and 114 installed in the device 100, namely the computer programs constituting the respective applications.

The protection control module holding unit 611 holds computer programs constituting the protection control module 120 installed in the device 100.

The detection module holding unit 612 holds computer programs constituting the detection modules installed in the device 100.

To fulfill its function, each of these computer programs is composed of a combination of instruction codes that indicate instructions to the computer.

The reception unit 601 receives monitoring results on the protection control module 120 from the detection modules.

The transmission unit 602 transmits a request to verify whether or not an application in the device 100 or the protection control module 120 is tampered with, and transmits verification base data that is necessary for verification.

The control unit 603 controls the structural elements of the verification base data distribution unit 220.

The authentication unit 604 performs mutual authentication with each detection module and the protection control module 120.

The certificate generating unit 605 causes the data dividing unit 608 to divide the data of the applications held by the application holding unit 609, obtains encrypted applications by causing the decryption load unit 304 included in a computer program constituting the protection control module 120 held by the protection control module holding unit 611, and generates verification values from the encrypted applications and the divisional data. The certificate generating unit 605 also generates signature data by using the signature secret key (signature private key) of the management device 200, and further generates a certificate that includes the generated signature data.

Note that details of the signature schemes are provided in Non-Patent Literature 1 in pages 171 to 187.

The data dividing unit 608 generates a plurality of pieces of divisional data by dividing the data of each of the applications 110, 111, 112, 113, and 114 stored in the application holding unit 609.

The verification base data generating unit 610 generates the verification base data from: the data of the applications stored in the application holding unit 609; and the plurality of pieces of divisional data generated by the data dividing unit 608. The verification base data generating unit 610 transmits the generated verification base data to the device 100. The structure of the verification base data is described below.

(7) Hardware Structure of Device 100

Figure 6:
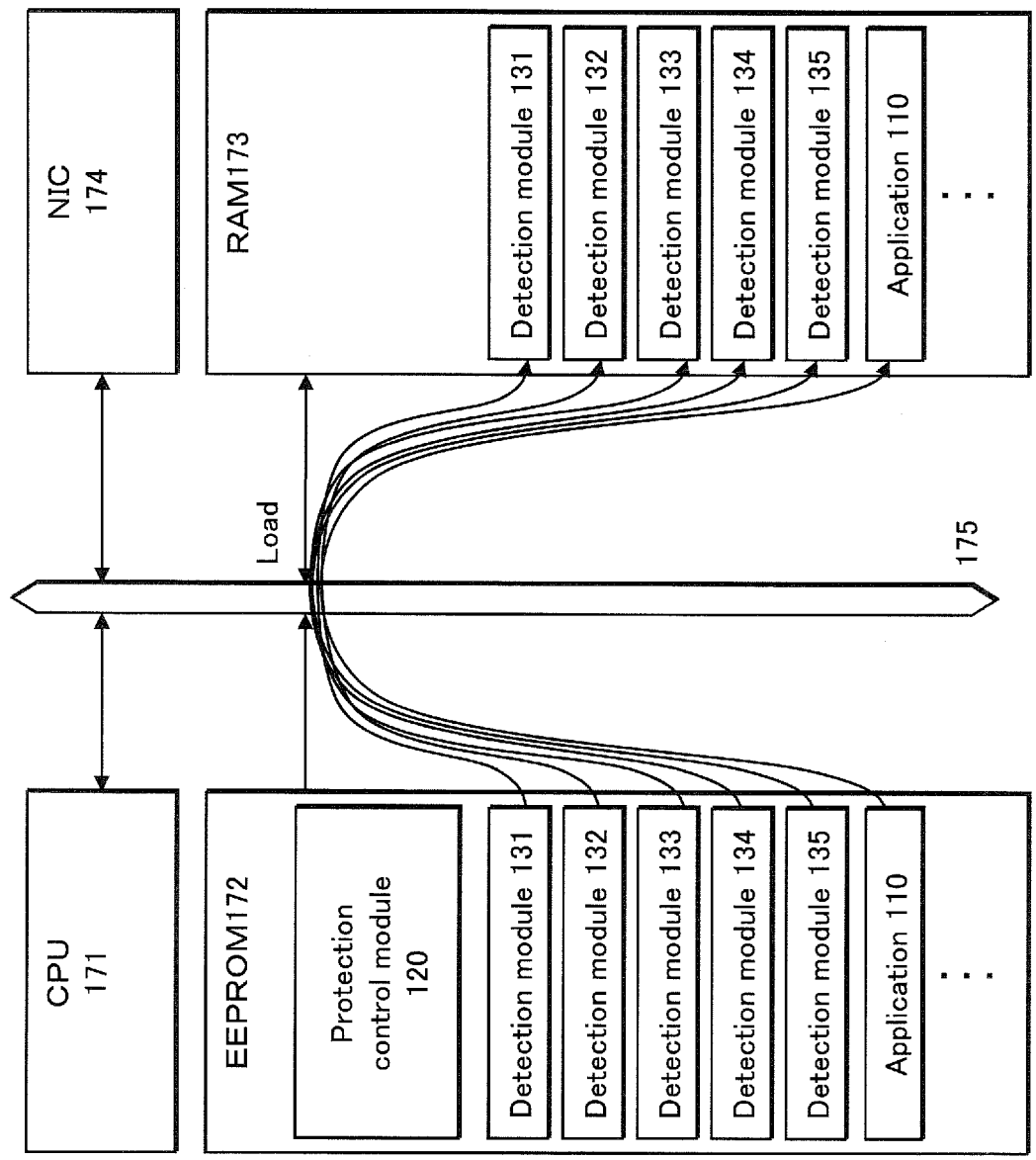
FIG. 6 is a hardware structure diagram of the device 100.

The following describes the hardware structure of the device 100 with reference to FIG. 6.

As shown in FIG. 6, the device 100 includes a CPU (Central Processing Unit) 171, an EEPROM (Electrically Erasable and Programmable Read Only Memory) 172, a RAM (Random Access Memory) 173, and an NIC (Network Interface Card) 174 which are connected so as to be able to communicate with each other via a bus 175, wherein the EEPROM 172, RAM 173, and NIC 174 are nonvolatile memories.

The EEPROM 172 stores various control modules including the protection control module 120, the detection modules 131, 132, 133, 134, and 135, and the applications 110, 111, 112, 113, and 114.

The control of the functional units of the various control modules is fulfilled when the CPU 171 executes the various control modules including the protection control module 120 stored in the EEPROM 172. Specifically, the functional units are realized upon description by the compute programs.

The RAM 173 is used as a work area for the CPU 171. The detection modules and applications are loaded onto the RAM 173. The functions of the detection modules and applications are realized when the detection modules and applications stored in the RAM 173 are executed by the CPU 171.

The NIC 174 is an expansion card used for a connection to a network.

(8) Software Hierarchy

Figure 7:
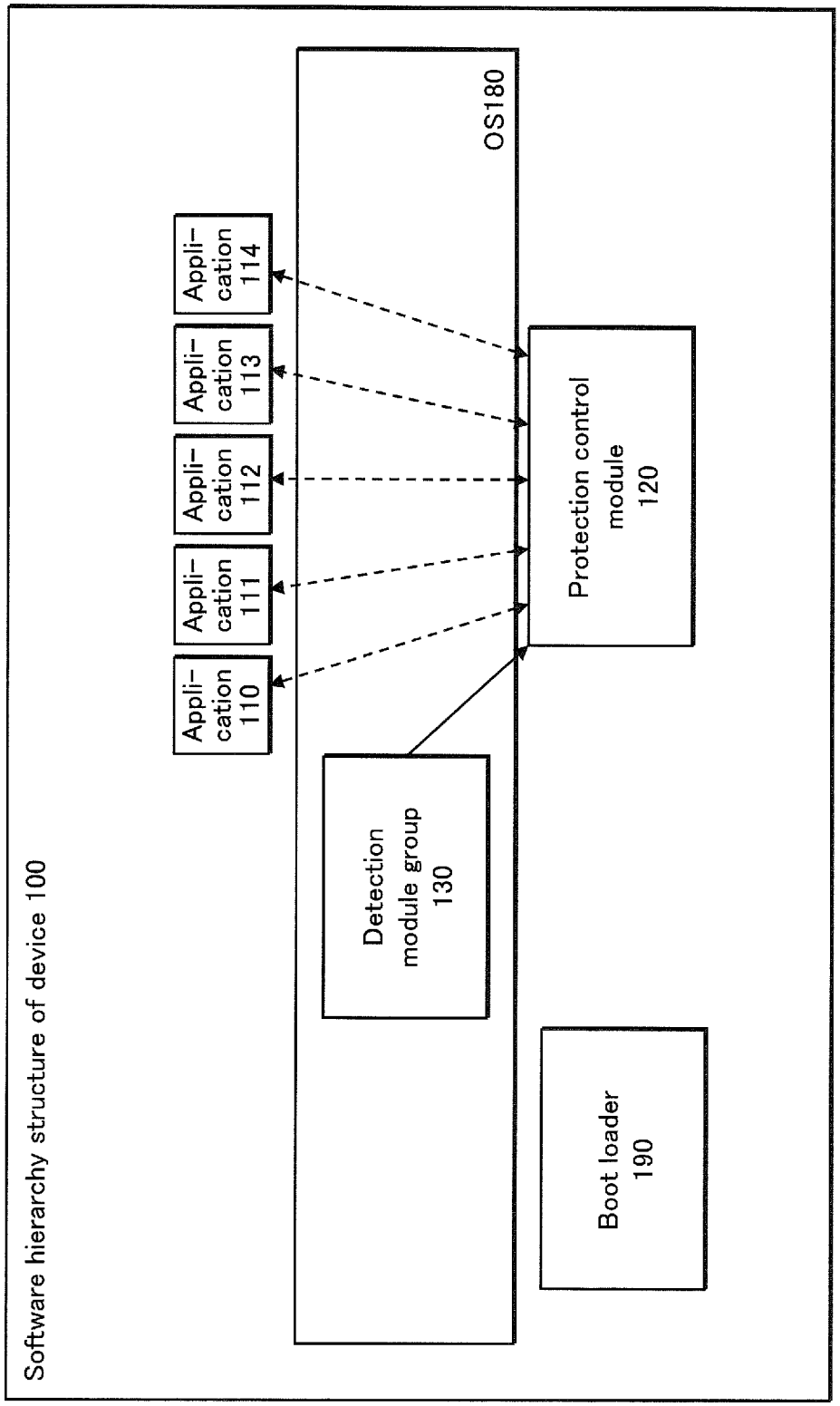
FIG. 7 is a software hierarchy diagram of the device 100.

The following describes the hierarchy structure of the software (computer programs) operating in the device 100 with reference to FIG. 7.

In the device 100, a boot loader 190, the protection control module 120, an OS 180, and the applications 110, 111, 112, 113, and 114 operate as the computer programs. The boot loader 190, protection control module 120, OS 180, and applications 110, 111, 112, 113, and 114 are structured hierarchically.

As shown in FIG. 7, the boot loader 190 and protection control module 120 are present in the lowest layer. The OS 180 is present in a layer located above the lowest layer, and the applications 110, 111, 112, 113, and 114 are present in a layer located above the layer of the OS 180.

As shown in FIG. 7, the detection module group 130 is incorporated in the OS 180. The applications operate under the control of the OS 180, and the protection control module 120, the boot loader 190 and the like are out of the management by the OS 180.

When the device 100 is booted, the boot loader 190 is started first, followed by the protection control module 120 and the OS 180. During the start of the OS 180, the detection module group 130 is started. Subsequently, the applications 110, 111, 112, 113, and 114 are started, and the applications are executed.

2.2 Operation Outline of Detection System 10

(1) Overall Operation Outline

The operation of the detection system 10 is described with reference to the flowchart shown in FIG. 8. First, a description is given of the large processes of the detection system 10. The following two large processes are executed by the detection system 10.

The first large process is an initial setting process for embedding the data such as the verification base data that are necessary for verifying the software (protection control module 120).

The second large process is a detection process for detecting whether or not the software (protection control module 120) in the device 100 is tampered with.

Figure 8:
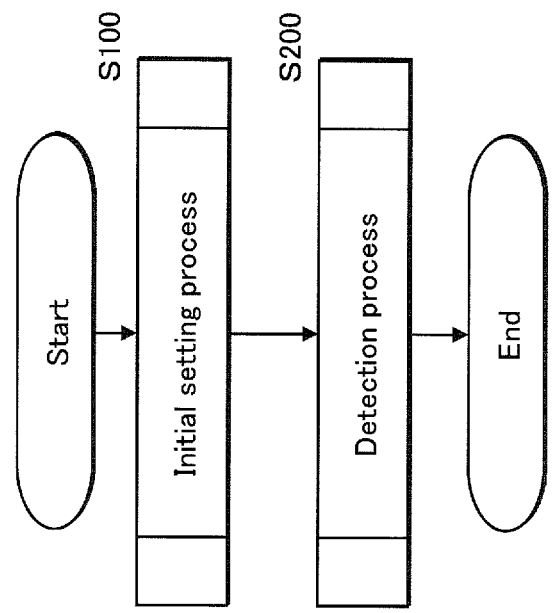
FIG. 8 is a flowchart illustrating the overall operation of the detection system 10.

The above two processes are interrelated as shown in FIG. 8.

When the device 100 is manufactured in the factory, the initial setting process is performed in the detection system 10 and the verification base data is embedded into the protection control module 120 (step S100). The device 100 is then shipped from the factory to be supplied for use by user.

When the device 100 is used by a user, the protection control module 120 operates in the device 100 to protect the applications from attacks by the attackers. At the same time, the detection modules perform the detection process to check whether or not the protection control module 120 is being attacked (step S200).

The result of the detection process, namely the monitoring result on the protection control module 120 by the detection modules is notified to the management device 200. Also, if it is detected that the protection control module 120 is tampered with, the fact is displayed on a display unit provided in the device 100.

The following explains the two large processes in detail.

(2) Operation in Initial Setting Process

Firstly, the initial setting process is explained.

Figure 9:
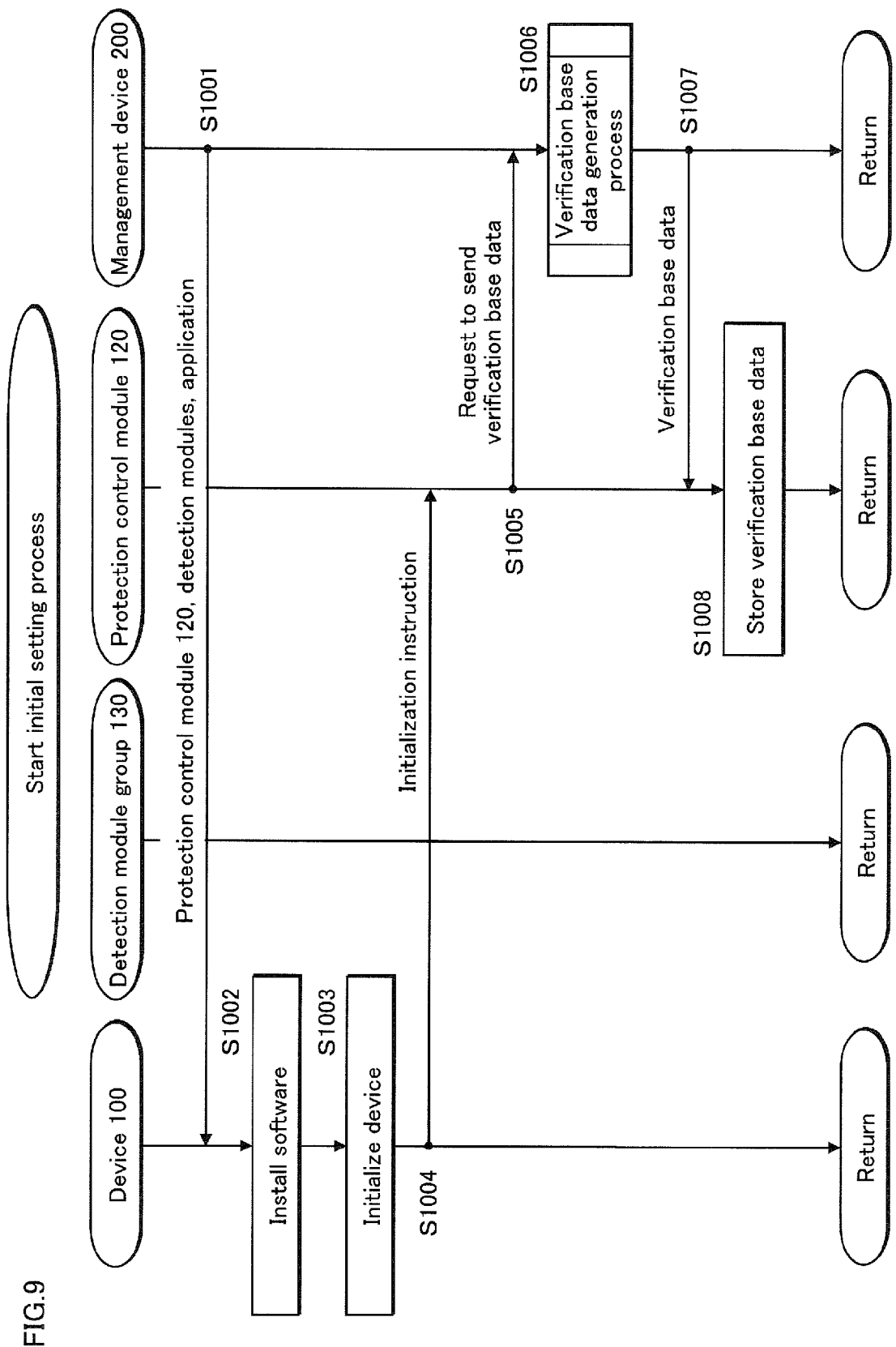
FIG. 9 is a sequence diagram of the initial setting process.

FIG. 9 is a sequence diagram illustrating the flow of the operation of the detection system 10 in the initial setting process. In the sequence diagram, the processes performed independently by the detection modules 131, 132, 133, 134, and 135 are collectively illustrated as the process performed by the detection module group 130.

The protection control module 120 is held by the protection control module holding unit 611 of the management device 200. The detection modules 131, 132, 133, 134, and 135 are held by the detection module holding unit 612 of the management device 200. The applications 110, 111, 112, 113, and 114 are held by the application holding unit 609.

When the device 100 is manufactured in the factory, the management device 200 transmits the protection control module 120, the detection modules 131, 132, 133, 134, and 135, and the applications 110, 111, 112, 113, and 114 to the device 100, and the device 100 receives the protection control module 120, the detection modules 131, 132, 133, 134, and 135, and the applications 110, 111, 112, 113, and 114 (step S1001). The device 100 installs (writes) the received applications, protection control module 120, and detection modules onto the EEPROM 172 of the device 100 (step S1002). A certificate (certificate for detecting tampering) that is used to verify whether or not the software is tampered with is attached to each of the applications. Software, other than the above-mentioned software, that are necessary for the operation of the device 100 are installed as well.

After the software are installed (step S1002), the device 100 performs the initial setting process by executing software for performing an initial setting of the device 100, software for testing whether or not it operates normally, and the like (step S1003). The device 100 the outputs an initialization instruction to the protection control module 120 (step S1004).

In the initial setting process, the initialization process of the protection control module 120 is performed.

Upon receiving the initialization instruction (step S1004), the protection control module 120 requests the management device 200 to send the verification base data (step S1005). Upon receiving the request from the protection control module 120 (step S1005), the management device 200 executes the verification base data generation process (step S1006). After the verification base data generation process is completed, the management device 200 transmits the generated verification base data to the protection control module 120 (step S1007). Upon receiving the verification base data from the management device 200 (step S1007), the protection control module 120 stores the received verification base data into the verification base data holding unit 308 (step S1008).

(3) Operation in Verification Base Data Generation Process

Figure 10:
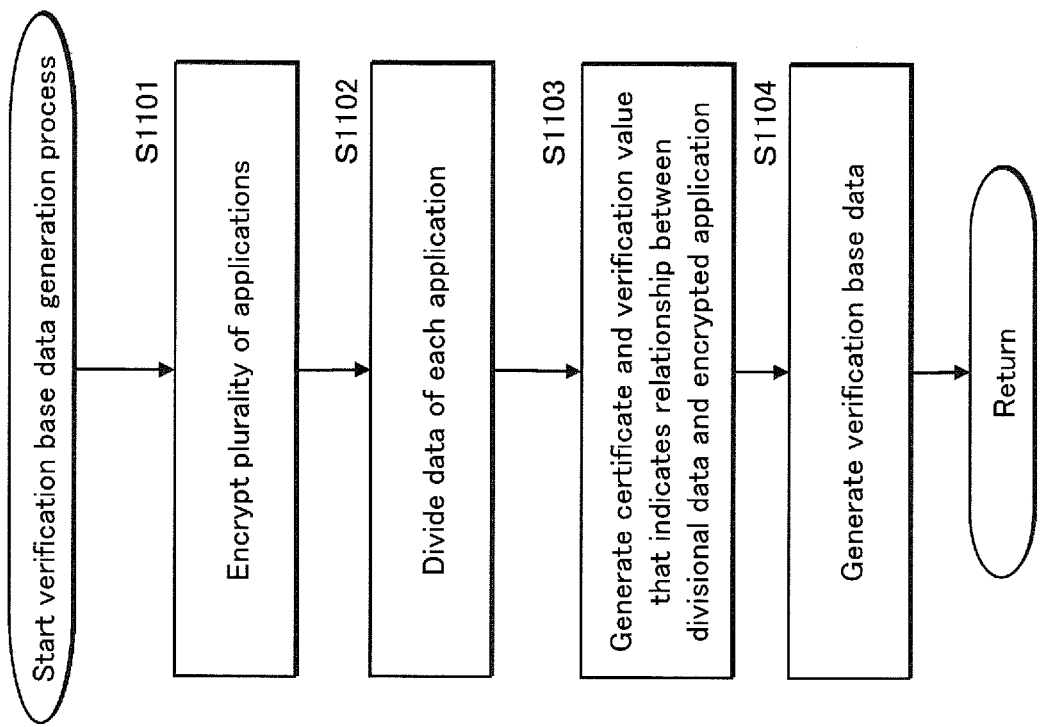
FIG. 10 is a flowchart illustrating the operation in the verification base data generation process performed in the initial setting process.

Here, a detailed explanation is given of the verification base data generation process performed in step S1006 of FIG. 9, with reference to the flowchart shown in FIG. 10.

The verification base data generating unit 610 of the management device 200 reads a plurality of applications from the application holding unit 609, reads the encryption/decryption key from the encryption key holding unit 607, and generates a plurality of encrypted applications by encrypting the plurality of applications by using the encryption/decryption key (step S1101). One example of the encryption algorithm used in this process is AES (Advanced Encryption Standard).

Next, the data dividing unit 608 reads the plurality of applications from the application holding unit 609, and generates a plurality of pieces of divisional data by dividing each of the read applications (step S1102). To divide each application, the data of the application loaded in the memory may be divided by a constant value of size. Alternatively, a modulo operation may be performed on the data of an application. For example, modulo operations with moduli (divisors) "7", "11" and "17" may be performed on the data of one application to generate three pieces of divisional data from the data of one application.

Figure 11:
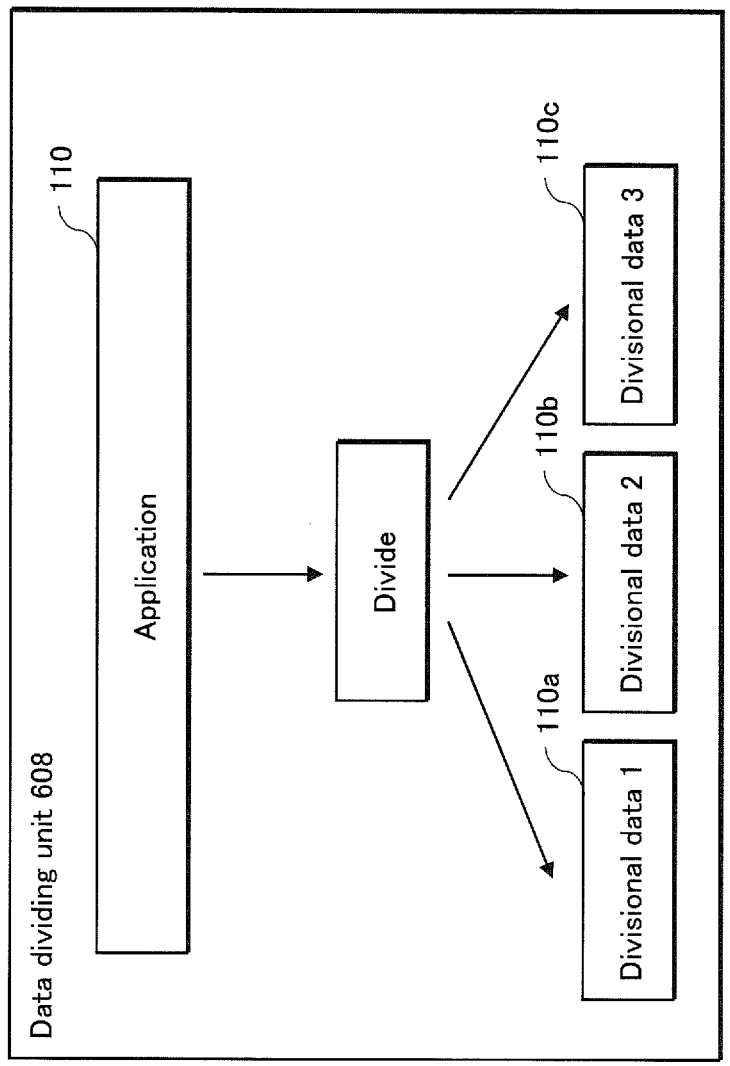
FIG. 11 illustrates the operation of dividing data.

FIG. 11 illustrates an outline of the operation for dividing the data of an application. As shown as one example in FIG. 11, the data dividing unit 608 generates three pieces of divisional data, divisional data 1 (110a), divisional data 2 (110b), and divisional data 3 (110c), by dividing the data of application 110. More specifically, the data dividing unit 608 generates the three pieces of divisional data 1, 2 and 3 for each application by dividing each of the applications 110, 111, 112, 113, and 114 into three pieces.

Note that, as the method of dividing the data of an application, the Chinese remainder theorem may be used so that the data of the application can be restored. The Chinese remainder theorem is described in Non-Patent Literature 1, page 15. Suppose the following case, for example. The data of an application is "1200" in decimal notation, and modulo operations with moduli (divisors), for example, "7", "11" and "17" are performed on the data of the application. Here, 7×11×17=1309. The data of the application is "1200" and is smaller than "1309". Thus it is drawn from the Chinese remainder theorem that the data of the application "1200" can be uniquely obtained from the values that are obtained by performing modulo operations with moduli (divisors) "7", "11" and "17" on the data of the application. Note that, although in the above example, the data of an application is "1200" in decimal notation, this value is used for the sake of simplification. It is needless to say that, in the actuality, the application is a computer program having a far larger size, and the data of the application is hardly as small as "1200" in decimal notation.

Here, an explanation is given with reference to the example shown in FIG. 11 in which the data of the application is divided into three pieces. The data dividing unit 608 generates three pieces of divisional data 1, 2 and 3 for each application by dividing each of the applications 110, 111, 112, 113, and 114 into three pieces. As one example, as shown in FIG. 11, the data dividing unit 608 generates divisional data 1 (110*a*), divisional data 2 (110*b*), and divisional data 3 (110*c*) by dividing the data of the application 110.

After the division by the data dividing unit 608, the certificate generating unit 605 generates, for each piece of divisional data, a verification value, which indicates relationship between an encrypted application and the piece of divisional data, and a certificate (decryption process certificate) (step S1103).

Next, the verification base data generating unit 610 generates, for each piece of divisional data, the verification base data that includes the divisional identification information, reference information, a plurality of verification value sets, and a certificate (decryption process certificate) (step S1104). The divisional identification information and the reference information are described below.

(Data Structure of Verification Base Data)

The following explains an example of the data structure of the verification base data with reference to FIGS. 12 to 14.

Verification base data 630, 650 and 670 shown in FIGS. 12, 13 and 14 respectively are obtained by dividing each of the applications 110, 111, 112, 113, and 114 into three pieces, for example.

The verification base data 630 shown in FIG. 12 is generated in correspondence with the divisional data 1 that is generated from each of the applications 110, 111, 112, 113, and 114. The verification base data 650 shown in FIG. 13 is generated in correspondence with the divisional data 2 that is generated from each of the applications 110, 111, 112, 113, and 114. The verification base data 670 shown in FIG. 14 is generated in correspondence with the divisional data 3 that is generated from each of the applications 110, 111, 112, 113, and 114.

As shown in FIGS. 12 to 14, each of the verification base data 630, 650 and 670 includes the divisional identification information, reference information, a plurality of verification value sets, and a certificate.

The verification base data 630 shown in FIG. 12 includes, as one example, divisional identification information 631, reference information 632, verification value sets 633*a*, 633*b*, 633*c*, 633*d* and 633*e*, and a certificate 634.

The divisional identification information is an identifier identifying which piece of divisional data of an application corresponds to the verification base data. In other words, the divisional identification information is information that indicates which piece of divisional data among all pieces of divisional data divided from an application corresponds to the verification base data.

As one example, the divisional identification information includes the number of pieces of divisional data and information identifying a piece of divisional data.

It is supposed here that, for example, the data of the application is divided by a constant value of size, and, for example, the application is divided into three pieces, and the three pieces of divisional data are represented as (3, 1), (3, 2) and (3, 3), respectively. Here, (a, b) denotes the $b^{th}$ piece of divisional data among "a" pieces of divisional data into which the application is divided. In this case, the divisional identification information 631 shown in FIG. 12 is, as one example, (3, 1), and the verification base data 630 shown in FIG. 12 corresponds to the first piece of divisional data among three pieces of divisional data into which the application is divided. Also, the divisional identification information 651 shown in FIG. 13 is, as one example, (3, 2), and the verification base data 650 shown in FIG. 13 corresponds to the second piece of divisional data among the three pieces of divisional data into which the application is divided. Further, the divisional identification information 671 shown in FIG. 14 is, as one example, (3, 3), and the verification base data 670 shown in FIG. 14 corresponds to the third piece of divisional data among the three pieces of divisional data into which the application is divided.

Also, in the case where modulo operations with a plurality of moduli are performed on the data of an application to generate a plurality of pieces of divisional data from the data of one application, for example, when modulo operations with moduli (divisors) "7", "11" and "17" are performed on the data of an application to divide the data of the application, divisional identification information may be an identifier identifying which piece of divisional data of the application corresponds to the verification base data, by including the number of pieces of divisional data and the modulus (divisor). In this case, the divisional identification information 631 shown in FIG. 12 is, as one example, (3, 7) which indicates that the number of pieces of divisional data is "3" and the modulus (divisor), which is used in the modulo operation performed on the data of each of the plurality of applications, is "7". Also, the divisional identification information 651 shown in FIG. 13 is, as one example, (3, 11) which indicates that the number of pieces of divisional data is "3" and the modulus (divisor), which is used in the modulo operation performed on the data of each of the plurality of applications, is "11". Further, the divisional identification information 671 shown in FIG. 14 is, as one example, (3, 17) which indicates that the number of pieces of divisional data is "3" and the modulus (divisor), which is used in the modulo operation performed on the data of each of the plurality of applications, is "17". Here, divisional identification information (a, b) indicates that the application is divided into "a" pieces, and "b" is used as the modulus.

It should be noted here that, although in the above example, the divisional identification information includes the number of pieces of divisional data. However, not limited to this, the divisional identification information, for example, may include only a piece of information that indicates the ordinal number of the piece of divisional data, namely the place of the piece of divisional data in the sequence of a plurality of pieces of divisional data divided from the application, not including the number of pieces of divisional data. That is to say, the divisional identification information may be any information as far as it can distinguish a piece of divisional identification information from the other pieces of divisional identification information. Also, not limited to the above method of dividing the data of the application into pieces which each have a constant size, the pieces of divisional data may be different in size, or some parts of the data of the application may be collected as a piece of divisional data.

The reference information is information used to determine whether all pieces of divisional data have been verified.

As one example, the reference information includes the number of pieces of divisional data. In this case, when as many different pieces of divisional data as indicated by the reference information are verified, all pieces of divisional data are verified. For example, in the case where the data of the application is divided into three pieces which each have a constant size, the reference information includes a value "3" that is equivalent to the number of pieces of divisional data "3". In this case, when three different pieces of divisional data are verified, all pieces of divisional data are verified.

For example, each of reference information 632 shown in FIG. 12, reference information 652 shown in FIG. 13, and reference information 672 shown in FIG. 14 is "3". Accordingly, in this case, when the three pieces of divisional data are verified, all pieces of divisional data are verified.

Also, when a plurality of pieces of divisional data are generated by performing modulo operations with a plurality of moduli on the data of the application, the reference information may be a value obtained by multiplying the plurality of moduli. For example, when modulo operations with moduli "7", "11" and "17" are performed, the reference information is "1309". Here, "1309" is a value obtained by multiplying "7", "11" and "17". This makes it possible to determine that the Chinese remainder theorem is true. Also, since the data of the application only needs to be divided such that the Chinese remainder theorem is true, the following are possible: when the decryption is performed by the RSA encryption of the public key encryption, the reference information only needs to be a value greater than a value "n (=p×q) ("p" and "q" are prime numbers)" of the public key in the RSA encryption; and when the decryption is performed by the AES encryption of the common key encryption, the reference information only needs to be a value greater than 128 bits. The RSA encryption is described in Non-Patent Literature 1, pages 110 to 113.

In the above example, the reference information is described in the verification base data. However, not limited to this, the reference information may be held in advance by each detection module. Alternatively, the reference information may be held by any detection module and transmitted to other detection modules as necessary.

The number of the verification value sets is equal to the number of application. For example, the plurality of verification value sets included in the verification base data 630 correspond to the applications 110, 111, 112, 113, and 114 respectively. Each of the verification value sets includes application identification information, data, and a verification value.

The application identification information is an identifier identifying a corresponding application.

The data is an encrypted application of the corresponding application.

The verification value is a value used to verify the divisional data of the corresponding application. The verification value is a hash value obtained by performing a calculation using a hash function onto concatenated data that is obtained by concatenating the data of the corresponding encrypted application with the generated divisional data.

(Verification value)=Hash(data of encrypted application| |divisional data)

Here, "Hash (a)" represents a hash value that is obtained by performing a calculation using a hash function onto "a", and "X| |Y" represents X and Y concatenated in this order.

Note that although in the above example, a hash value obtained by performing a calculation using a hash function is used as the verification value. However, not limited to this, a signature, for example, may be used as explained below.

(Verification value)=Sign(signature private key, data of encrypted application| |divisional data)

Here, "Sign (a, b)" represents signature data that is generated for "b" by using a key "a".

The data onto which an operation is performed to obtain a hash value is not limited to the concatenated data of encrypted data and divisional data, but may include, for example, application identification information identifying an application and information indicating the contents of the application (application for playing back DVD or BD, application for the net banking, and so on). Also, the data onto which an operation is performed to obtain a hash value may include identification information of the protection control module 120.

The certificate is the decryption process certificate. The certificate is signature data that is obtained by generating concatenated data by concatenating all verification values included in the verification base data, calculating a hash value by performing a calculation using a hash function onto the generated concatenated data, and applying a signature secret key held by the signature secret key holding unit 606 to the calculated hash value.

(Certificate)=Sign(signature secret key, Hash(verification value| |verification value| | . . . | |verification value))

In the case of the verification base data 630 shown in FIG. 12, the certificate 634 is calculated as follows.

(Certificate 634)=Sign(signature secret key, Hash (verification value A| |verification value B| |verification value C| |verification value D| |verification value E))

With regard to the verification base data 650 shown in FIG. 13 and the verification base data 670 shown in FIG. 14, the certificates are calculated in similar manners to the above.

(4) Operation in Detection Process

Figure 15:
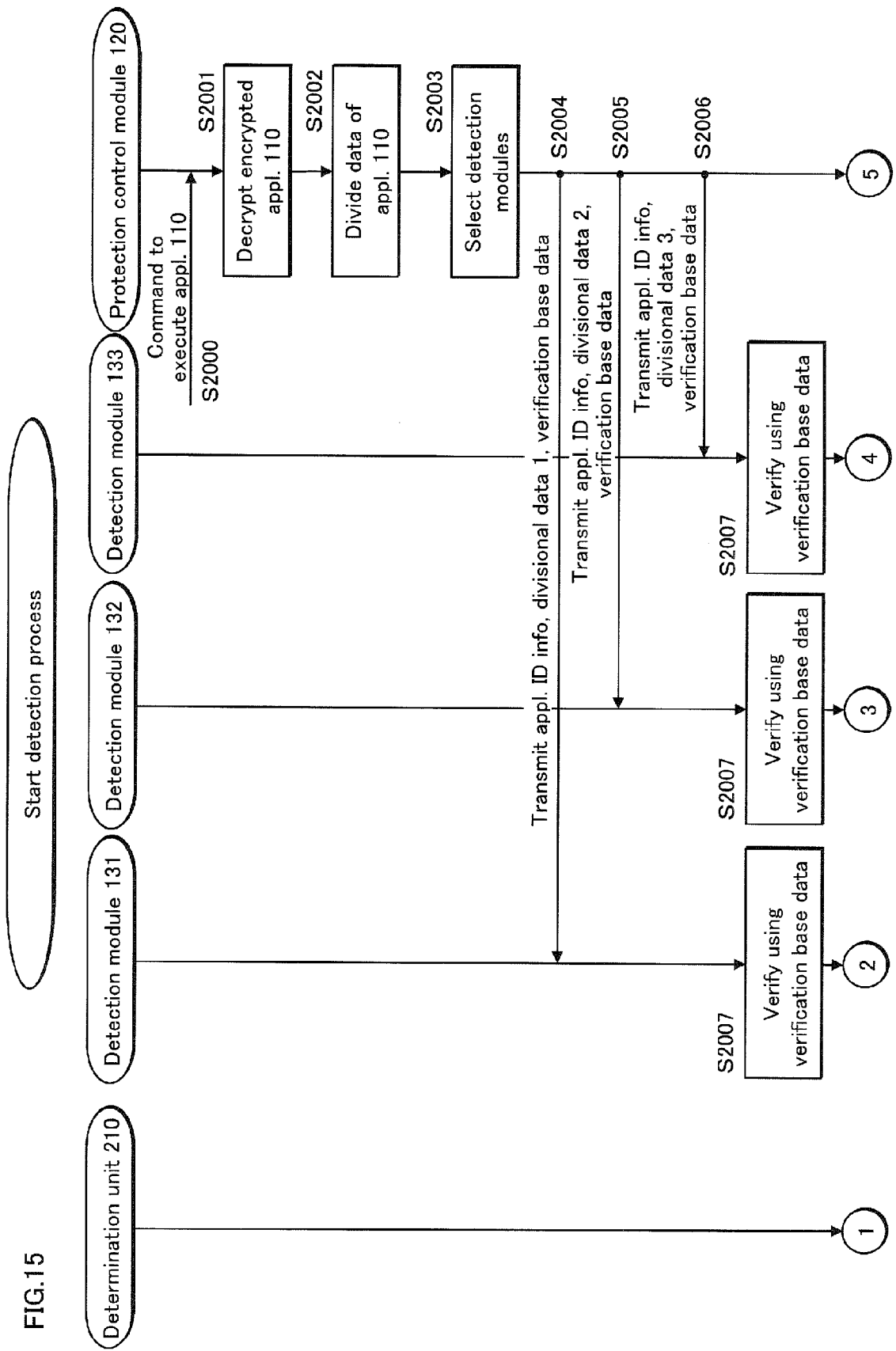
FIG. 15 is a sequence diagram illustrating the operation in the detection process, continuing to FIG. 16.
Figure 16:
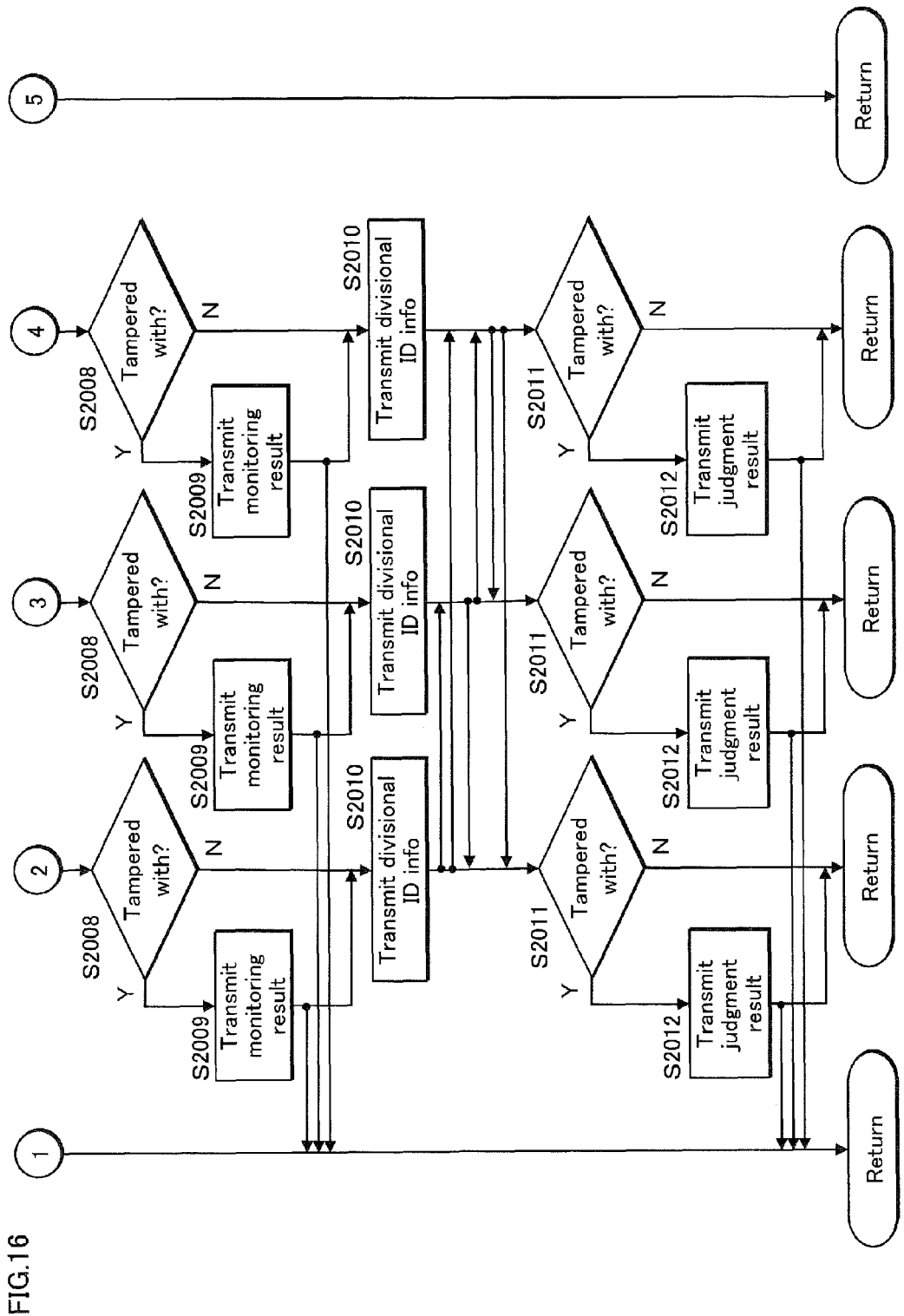
FIG. 16 is a sequence diagram illustrating the operation in the detection process, continuing from FIG. 15.

The following describes the detection process performed in step S200 of FIG. 8, with reference to FIGS. 15 and 16. FIGS. 15 and 16 are sequence diagrams of the detection process.

Upon completion of the initial setting process performed in step S100 of FIG. 8, the device 100 is shipped from the factory to a user. When the user uses the device 100 and the applications, the protection control module 120, which is provided in the device 100, controls functions, such as the decryption load function, tampering detection function, and analysis tool detection function, to protect the applications from attacks by attackers. Here, an explanation is given taking an example case where the protection control module 120 is verified when the application 110 is executed. The cases where the protection control module 120 is verified when the other applications 111, 112, 113 and 114 are executed provide similar operations, and description thereof is omitted.

The protection control module 120 receives a command to execute the application 110 from the OS 180 (step S2000). Upon receiving this command, the decryption load unit 304 decrypts the encrypted application 110 (step S2001). Next, the application dividing unit 310 divides the data of the application 110, which was generated by the decryption performed by the decryption load unit 304, based on the divisional identification information of the verification base data stored in the verification base data holding unit 308 (step S2002). If a division into three pieces is written in the divisional identification information, it divides the application into three pieces. The following explains the case where the application is divided into three pieces.

The detection module selecting unit 311 of the protection control module 120 selects detection modules to each of which the application identification information, divisional data, and verification base data are to be distributed (step S2003). Here, the application identification information is identification information identifying the application that is specified by the command, which was received by the protection control module 120 from the OS 180, to be executed. The divisional data is the divisional data generated by the division performed by the application dividing unit 310. The verification base data is a piece of verification base data which, among a plurality of pieces of verification base data held by the verification base data holding unit 308, corresponds to the generated divisional data. Examples of the verification base data are shown in FIGS. 12 to 14.

(4-1) Detection Module Selection Method

Figure 17:
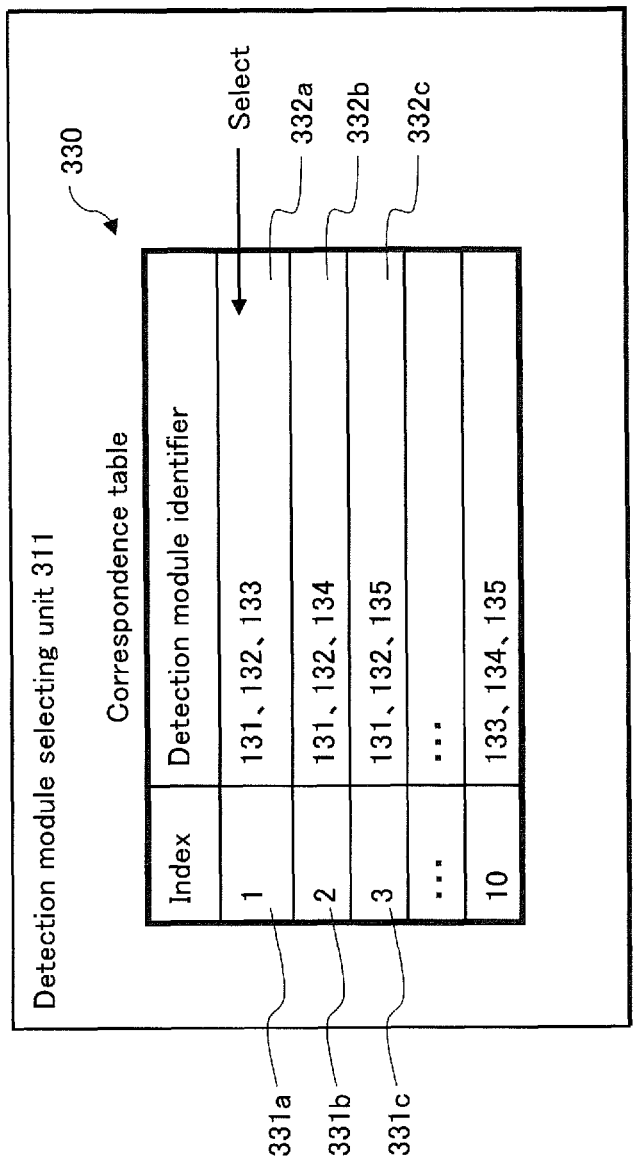
FIG. 17 illustrates the data structure of the correspondence table 330 used to select detection modules.

The following describes how the detection module selecting unit 311 selects detection modules, with reference to FIG. 17.

The detection module selecting unit 311 holds a correspondence table 330 illustrated in FIG. 17.

The detection module selecting unit 311 selects detection modules by determining to which detection modules among the detection modules 131, 132, 133, 134, and 135 the information are to be distributed, by referring to the correspondence table 330 held by the detection module selecting unit 311.

The correspondence table 330 held by the detection module selecting unit 311 indicates, in association with indices provided in the index column, all combinations of three detection modules selected from among the detection modules 131, 132, 133, 134, and 135.

The correspondence table 330 illustrated in FIG. 17 includes a plurality of pairs of an index and a set of detection module identifiers. The index is an identifier identifying a corresponding combination. For example, the correspondence table 330 includes: a combination 332a which is a combination of identifiers "131", "132" and "133" identifying detection modules 131, 132 and 133, respectively, in association with index 331a "1"; a combination 332b which is a combination of identifiers "131", "132" and "134" identifying detection modules 131, 132 and 134, respectively, in association with index 331b "2"; and a combination 332c which is a combination of identifiers "131", "132" and "135" identifying detection modules 131, 132 and 135, respectively, in association with index 331c "3".

Here, each index is a positive integer, and the indices 331a, 331b, 331c, . . . are "1", "2", "3", . . . "10". These values are obtained by adding "1" to a value to obtain the next value in sequence, with "1" being set as the initial value.

The detection module selecting unit 311 generates a random number and uses the generated random number as the selection information for selecting detection modules. The random number is a number selected at random from among numbers in a range from "1" to the number of pairs included in the correspondence table 330.

The detection module selecting unit 311 selects the detection modules by determining an index that has the same value as the selection information by referring to the correspondence table 330, and selecting a combination associated with the determined index by referring to the correspondence table 330. For example, if the selection information is "1", the detection module selecting unit 311 selects the combination 332a corresponding to the index 331a "1" in the correspondence table 330. Since the combination 332a include identifiers "131", "132" and "133", the detection modules 131, 132 and 133 are selected.

In the following, an explanation is given on the presumption that a combination of the detection modules 131, 132 and 133 was selected.

Back to FIG. 15, the explanation of the detection process is continued.

The protection control module 120 distributes the application identification information, divisional data, and verification base data corresponding to the divisional data to the selected detection modules. Here, as one example, the protection control module 120: transmits the application identification information "110", the first piece of divisional data (divisional data 1 (110a)) for the application, and the verification base data 630 to the detection module 131 (step S2004); transmits the application identification information "110", the second piece of divisional data (divisional data 2 (110b)) for the application, and the verification base data 650 to the detection module 132 (step S2005); and transmits the application identification information "110", the third piece of divisional data (divisional data 3 (110c)) for the application, and the verification base data 670 to the detection module 133 (step S2006).

Each of the detection modules verifies, using the received verification base data, whether or not the input data (namely, the encrypted application) of the decryption process for the application performed by the protection control module 120 correctly corresponds to the divisional data (step S2007). More specifically, each of the detection modules generates a verification value from the data of the encrypted application corresponding to the application identification information in the verification base data and from the divisional data of the received application. Each of the detection modules then compares the generated verification value with a verification value included in the received verification base data, and checks whether or not both verification values match. Each of the detection modules further verifies the signature of the certificate (decryption process certificate) included in the verification base data.

The verification of the signature of the certificate (decryption process certificate) included in the verification base data is performed as follows.

Verify(signature public key,certificate 634,Hash(verification value $A$| |verification value $B$| |verification value $C$| |verification value $D$| |verification value $E$))

In the present example, the verification base data 630 shown in FIG. 12 is used. The signature public key is a public key of the management device 200. The certificate 634 and verification values A, B, C, D and E are included in the verification base data 630 received by the detection module. The Verify (a, b, c) represents a verification result of a verification in which a public key "a" is used to verify whether or not a certificate "b" is correct with regard to data "c". The verification result indicates whether the verification succeeded or failed.

If the verification values do no match or the verification has failed, each detection module judges that the protection control module 120 is tampered with (Y in step S2008), and transmits, to the determination unit 210 of the management device 200, a monitoring result indicating that the divisional data is tampered with (step S2009). When the verification values match and the verification has succeeded, each detection module judges that the protection control module 120 is not tampered with (N in step S2008), and transmits, to the other detection modules, a monitoring result indicating that the divisional data is not tampered with, together with the divisional identification information in the verification base data (step S2010). Following this, each of the detection modules confirms whether or not all pieces of divisional data transmitted from the protection control module 120 have been verified to be authentic (step S2011).

The following describes the above in more detail.

The detection module 131 transmits the divisional identification information 631 "(3, 1)" to the detection modules 132 and 133. The divisional identification information 631 "(3, 1)" is information indicating that the number of pieces of divisional data is "3" and the divisional data is the first piece of data among the three pieces of divisional data.

The detection module 131 receives the divisional identification information 651 "(3, 2)" from the detection module 132, and receives the divisional identification information 671 "(3, 3)" from the detection module 133. Here, the divisional identification information 651 "(3, 2)" is information indicating that the number of pieces of divisional data is "3" and the divisional data is the second piece of data among the three pieces of divisional data, and the divisional identification information 671 "(3, 3)" is information indicating that the number of pieces of divisional data is "3" and the divisional data is the third piece of data among the three pieces of divisional data. The detection module 131 recognize that the data of the application has been divided into three pieces, by referring to the reference information 632 included in the verification base data 630. Also, detection module 131 recognize that the second and third pieces of data have been verified by the detection modules 132 and 133, respectively, by referring to the received divisional identification information 651 and 671.

As understood from the above, each of the detection modules can confirm that all pieces of divisional data transmitted from the protection control module 120 have been verified by the detection modules.

If not all pieces of divisional data have been verified to be authentic, or if all pieces of divisional data have been transmitted to one detection module, each detection module judges that the protection control module 120 has operated in an unauthorized manner and judges that the protection control module 120 is tampered with (Y in step S2011), and transmits, to the determination unit 210, a judgment result indicating that the protection control module 120 is tampered with (step S2012).

When it judges that the protection control module 120 is not tampered with (N in step S2011), the process ends. In this case, each detection module may transmit, to the determination unit 210, a judgment result indicating that the protection control module 120 is not tampered with.

(5) Operation in Verification Base Data Update Process

When an application is newly added and installed in the device 100, the detection system 10 needs to update the verification base data in the protection control module 120. When an application is added, the protection control module 120 requests the management device 200 to generate the verification base data, and receives and holds the new verification base data generated by the management device 200.

Figure 18:
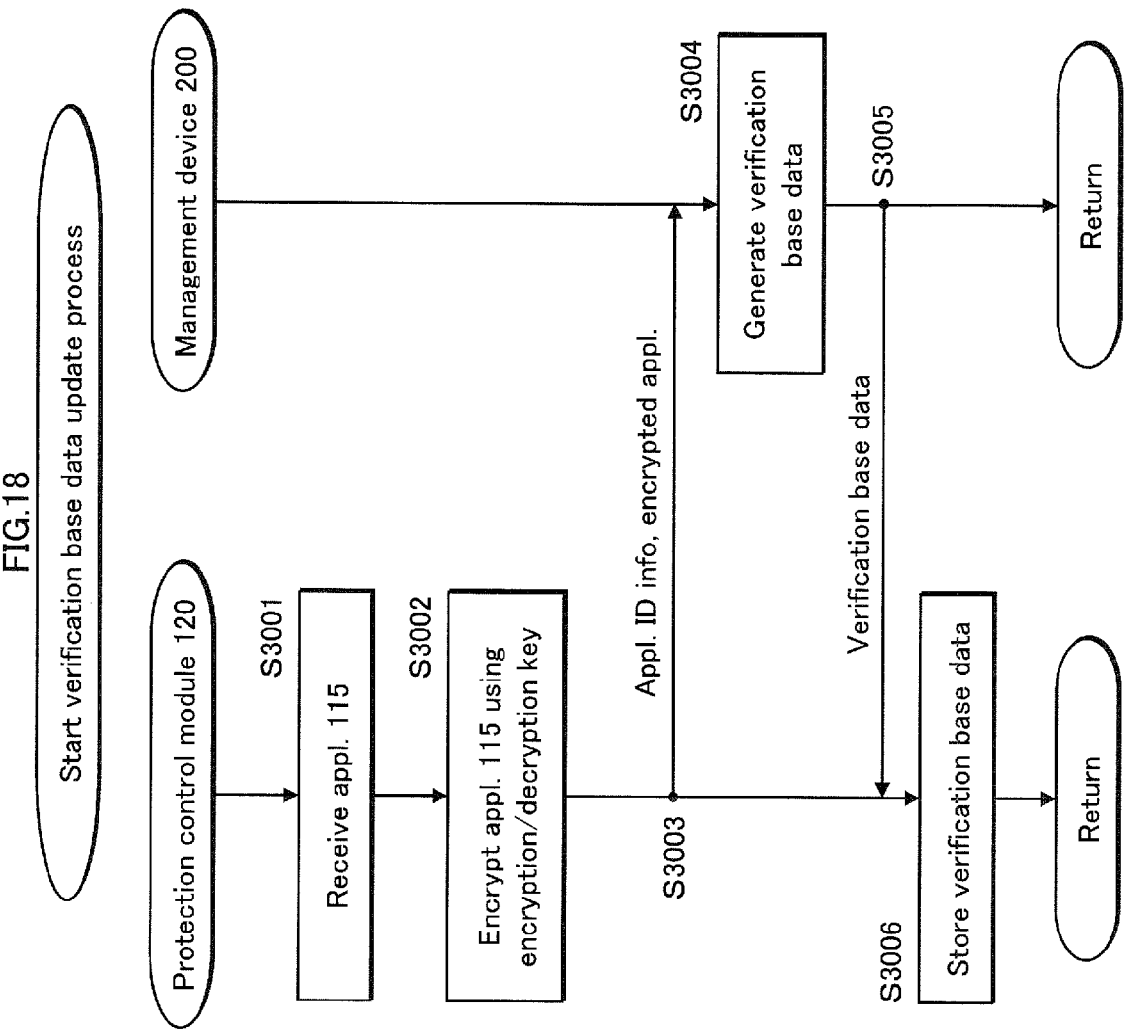
FIG. 18 is a sequence diagram illustrating the verification base data update process.

Here, an explanation is given of the verification base data update process with reference to a sequence diagram illustrated in FIG. 18, taking an example case where an application ("application 115") is newly added and installed in the device 100.

When the new application 115 is downloaded into the device 100, the protection control module 120 receives the application 115 from the OS 180 (step S3001). The protection control module 120 encrypts the application 115 by using the encryption/decryption key held by the encryption/decryption key holding unit 307 (step S3002). The protection control module 120 then transmits, to the management device 200, application identification information identifying the application 115, encrypted application 115, and a request to send verification base data (step S3003).

The management device 200 receives the application identification information, encrypted application 115, and request to send verification base data (step S3003), and decrypts the received encrypted application 115 by using the encryption/decryption key of the protection control module 120 held by the protection control module holding unit 611. The management device 200 then, as described above, newly generates verification base data including the decrypted application 115 (step S3004). The management device 200 transmits the new verification base data to the protection control module 120 (step S3005). The protection control module 120 receives the new verification base data and stores it in the verification base data holding unit 308 (step S3006).

2.3 Effects of Detection System 10

The detection system 10 verifies the process of decrypting the encrypted application performed by the protection control module 120. Accordingly, it is possible to determine whether or not the protection control module 120 is tampered with, without using the encryption/decryption key held by the protection control module 120.

Also, each of the detection modules verifies the divisional data. Accordingly, each of the detection modules can perform the verification without recognizing all data of an application.

With the above structure, even if a detection module is tampered with and operates in an unauthorized manner, information of the protection control module 120 or information of the application is not leaked to outside. This enhances the security of the system.

Also, according to the present invention, not all detection modules included in the detection module group 130 are selected, but the protection control module 120 selects detection modules from among the detection modules in the detection module group 130 and causes the selected detection modules to execute the detection process. Thus, even if some detection modules not selected by the protection control module are tampered with and operate in an unauthorized manner, if the selected detection modules are not tampered with, it is regarded as a whole of the tampering monitoring system that the tampering does not have an effect on the tampering detection process targeted for the protection control module 120. This makes it possible to verify whether or not the protection control module is tampered with.

3. Embodiment 3

The following describes a detection system 10a (not illustrated) as another embodiment of the present invention.

The detection system 10a has a similar structure to the detection system 10 in Embodiment 2. The following description centers on the difference from the detection system 10.

3.1 Outline

According to the structure of the detection system 10, if one of the d detection modules, which are instructed to execute the tampering detection process for the protection control module, is attacked, it is impossible to verify whether or not the protection control module is tampered with.

In contrast, in the detection system 10a, instead of the generation of a plurality of pieces of divisional data which is adopted in the detection system 10, a plurality of pieces of distribution data are generated by using the threshold secret sharing scheme and the generated distribution data are distributed to a plurality of detection modules. With this structure, even if a few detection modules among d detection modules to which the distribution data have been distributed are attacked, if k detection modules among the d detection modules are not tampered with, it is possible to verify whether or not the protection control module is tampered with, wherein "k" is a positive integer smaller than "d". Here, "d" is referred to as the number of detection operations, and "k" is referred to as a detection threshold.

The following describes details of the threshold secret sharing scheme in the present embodiment.

The data dividing unit 608 of the management device 200 selects integers $a_1, a_2, \ldots, a_{k-1}$ at random. Here, the integers $a_1, a_2, \ldots, a_{k-1}$ are called parameters, and are represented as "parameters $(a_1, a_2, \ldots, a_{k-1})$". The data dividing unit 608 also selects a prime number r.

Figure 23:
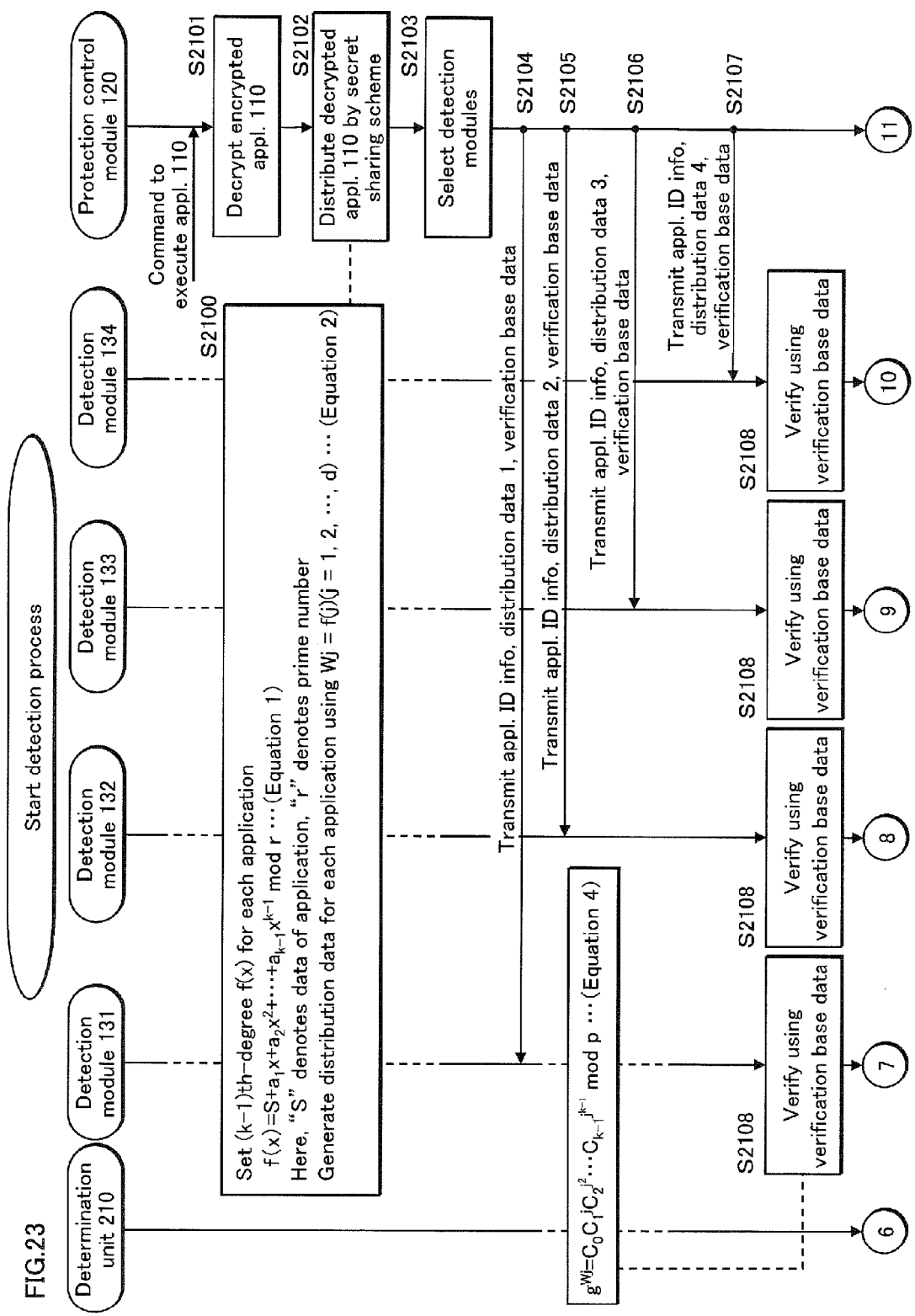
FIG. 23 is a sequence diagram illustrating the operation in the detection process, continuing to FIG. 24.

In this way, the data dividing unit 608 sets a $(k-1)^{th}$ degree polynomial, as shown in Equation 1 in FIG. 23. In Equation 1, "s" denotes a constant term that is data common to the applications. The integers $a_1, a_2, \ldots, a_{k-1}$ are each a coefficient of a term with degree "1" or more.

Also, the data dividing unit 608 selects a prime number "p" so that "r|p−1" is satisfied, and defines an element "g" so that the order of the element g is "r" in a modulo group $Z^*_p$.

Figure 20:
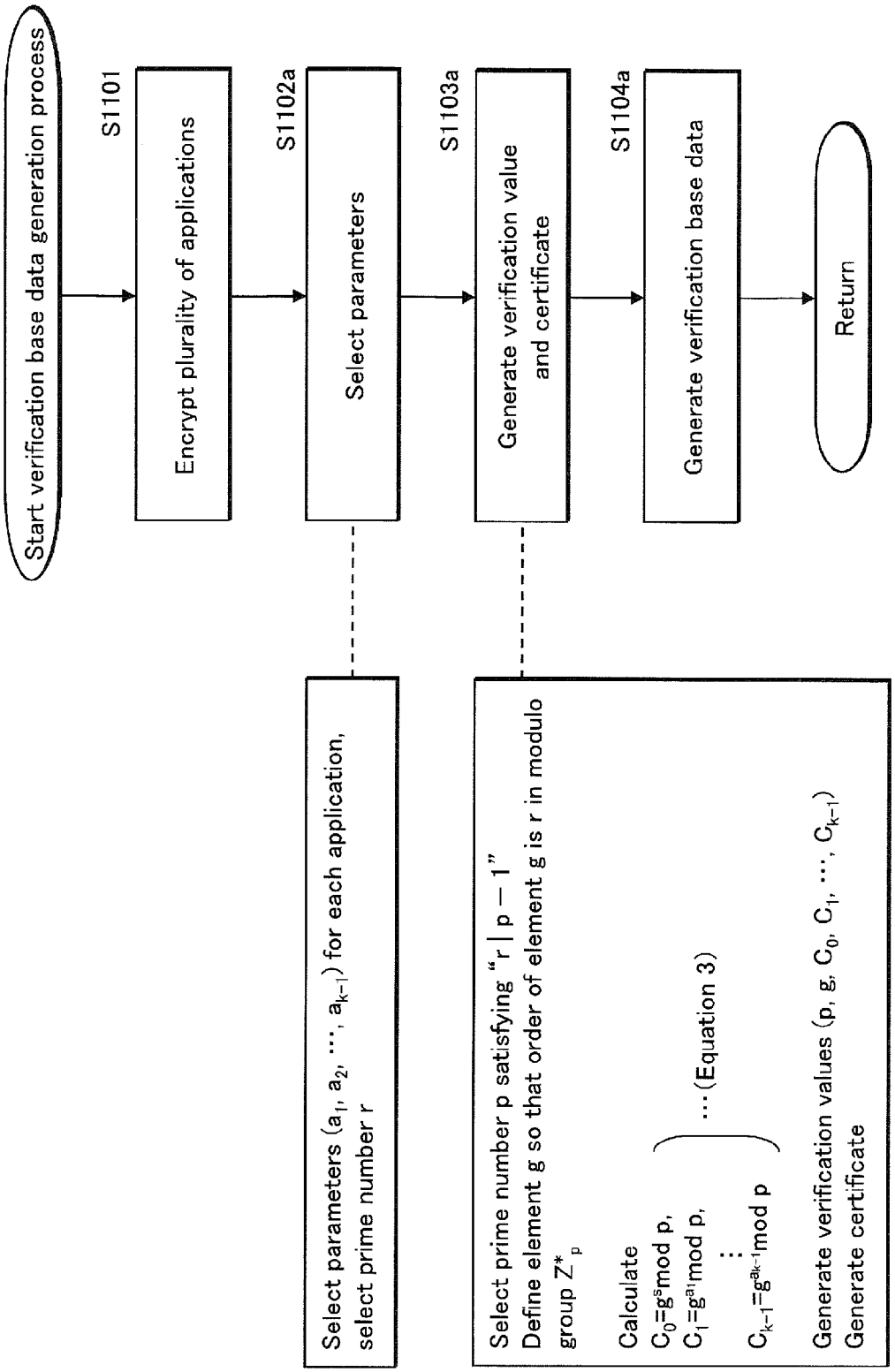
FIG. 20 is a flowchart illustrating the operation in the verification base data generation process.

Next, the data dividing unit 608 calculates $C_0, C_1, \ldots, C_{k-1}$ by using Equation 3 shown in FIG. 20.

The values p, g, $C_0, C_1, \ldots, C_{k-1}$ are represented as verification values (p, g, $C_0, C_1, \ldots, C_{k-1}$).

The management device 200 outputs the verification values (p, g, $C_0, C_1, \ldots, C_{k-1}$) to the protection control module 120.

The application dividing unit 310 of the protection control module 120 generates distribution data Wj=f(j) (j=1, 2, ..., d) (Equation 2) for each application by using the $(k-1)^{th}$ degree polynomial shown as Equation 1 in FIG. 23. The protection control module 120 transmits the distribution data Wj=f(j) (j=1, 2, ..., d) to each of the selected d detection modules. The protection control module 120 also transmits the verification values (p, g, $C_0, C_1, \ldots, C_{k-1}$) to each of the d detection modules.

Each of the detection modules verifies whether or not the transmitted distribution data Wj is authentic by judging whether or not Equation 4 shown in FIG. 23 is true. Each detection module judges that the transmitted distribution data Wj is authentic when Equation 4 is true. Each detection module judges that the transmitted distribution data Wj is not authentic when Equation 4 is not true.

Also, each detection module receives verification results from the other detection modules, and when the received verification results and the verification result of the detection module itself indicate that the verification by Equation 4 was successful in k or more detection modules, each detection module determines that the protection control module 120 is not tampered with. On the other hand, if the received verification results and the verification result of the detection module itself indicate that the verification by Equation 4 was successful in less than k detection modules, each detection module does not determine that the protection control module 120 is not tampered with.

This secret sharing scheme, also called a verifiable secret sharing scheme, is a secret sharing scheme for splitting data (in this example, the computer program) amongst a plurality of members (in this example, the detection modules), each of which is allocated a share of the data (computer program) so that the data (computer program) can be restored by using k or more pieces of split data, wherein "k" is a positive integer smaller than "d".

Note that details of the secret sharing scheme and verifiable secret sharing scheme are provided in Non-Patent Literature 1 in pages 209 to 219 in detail, and description thereof is omitted here.

3.2 Operation (1) Operation in Initial Setting Process

Firstly, the initial setting process is explained. The initial setting process of the detection system 10a is similar to that of the detection system 10 shown in FIG. 9. The following description centers on the difference from the initial setting process of the detection system 10, explaining with reference to the sequence diagram of FIG. 19.

Figure 19:
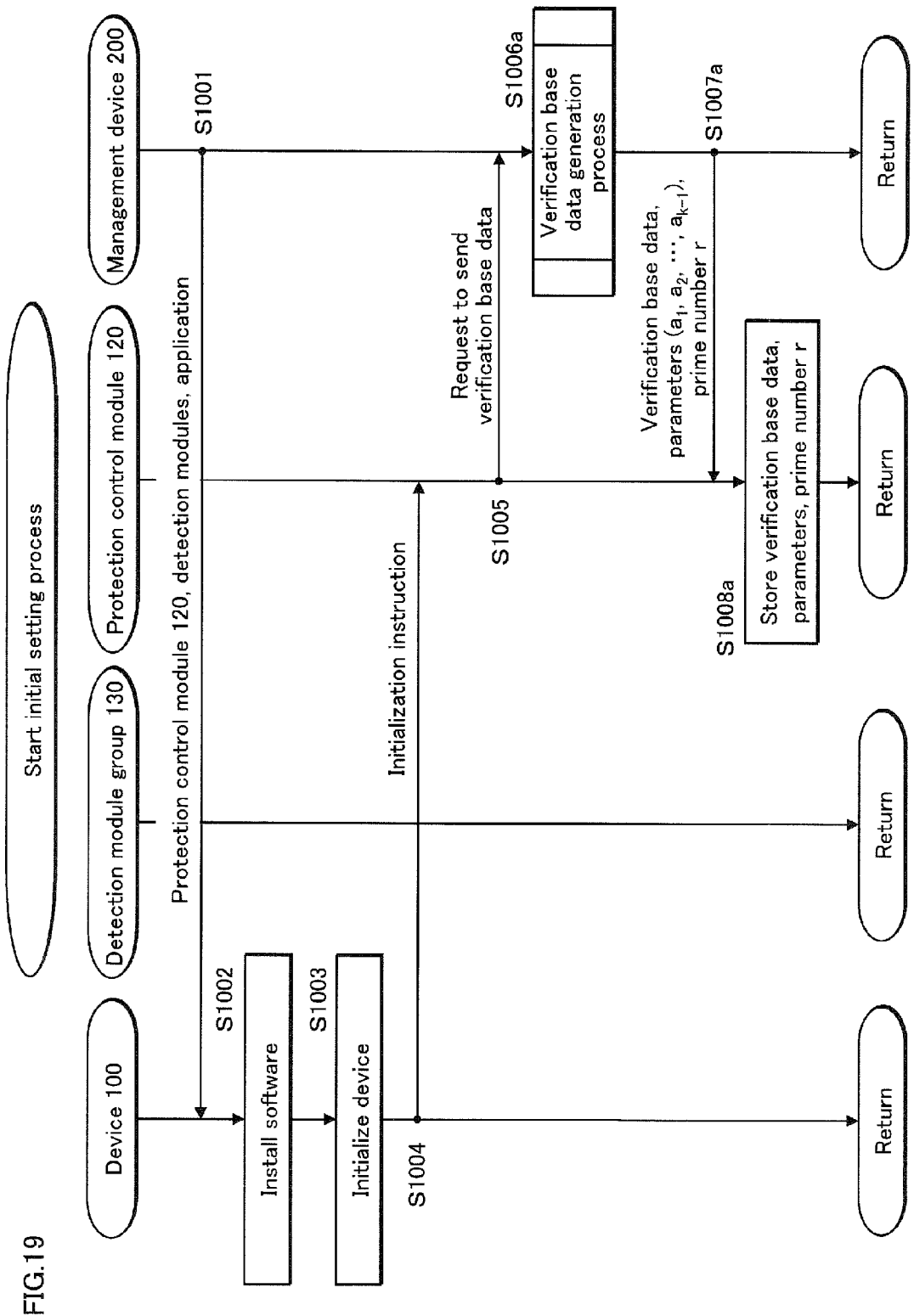
FIG. 19 is a sequence diagram illustrating the operation in the initial setting process in Embodiment 3.

Steps S1001-S1005 in the sequence diagram of FIG. 19 are the same as those shown in FIG. 9, and description thereof is omitted here.

Following step S1005, the management device 200 executes the verification base data generation process (step S1006a). Details of the verification base data generation process are provided below. After the verification base data generation process is completed, the management device 200 transmits the generated verification base data, parameters ($a_1, a_2, \ldots, a_{k-1}$) and prime number "r" to the protection control module 120 (step S1007a). The protection control module 120 receives the verification base data, parameters ($a_1, a_2, \ldots, a_{k-1}$) and prime number "r" from the management device 200 (step S1007a), and stores the received verification base data, parameters ($a_1, a_2, \ldots, a_{k-1}$) and prime number "r" into the verification base data holding unit 308 (step S1008a).

(2) Operation in Verification Base Data Generation Process

The operation of the detection system 10a in the verification base data generation process is described with reference to the flowchart of FIG. 20. The verification base data generation process described here is a detail of step S1006a shown in FIG. 19. The verification base data generation process of the detection system 10a is similar to that of the detection system 10 shown in FIG. 10. The following describes the difference between them.

Step S1101 in the flowchart shown in FIG. 20 is the same as the corresponding step in FIG. 10, and description thereof is omitted here.

The data dividing unit 608 of the verification base data distribution unit 220 selects, at random for each application, coefficients $a_1, a_2, \ldots, a_{k-1}$ of the terms of the $(k-1)^{th}$ degree polynomial f(x) shown as Equation 1 of FIG. 23, and selects prime number "r", wherein these coefficients are integers (step S1102a).

Next, the data dividing unit 608 selects, for each application, a prime number "p" satisfying "r|p−1", defines an element "g" so that the order of the element g is "r" in a modulo group $Z^*_p$, and calculates $C_0, C_1, \ldots, C_{k-1}$ by using Equation 3 shown in FIG. 20. Furthermore, the data dividing unit 608 generates a certificate by generating concatenated data as described above by concatenating a plurality of verification values generated for a plurality of applications by using the verification values (p, g, $C_0, C_1, \ldots, C_{k-1}$) generated for each application, calculating a hash value by performing a calculation using a hash function onto the generated concatenated data, and applying a digital signature to the calculated hash value by using a signature secret key.

(Certificate)=Sign(signature secret key, Hash(verification value| |verification value| | . . . | |verification value))

Note that, when the verification values are concatenated, the verification values p, g, $C_0$, $C_1$, ..., $C_{k-1}$ are concatenated in this order (step S1103a).

Figure 22:
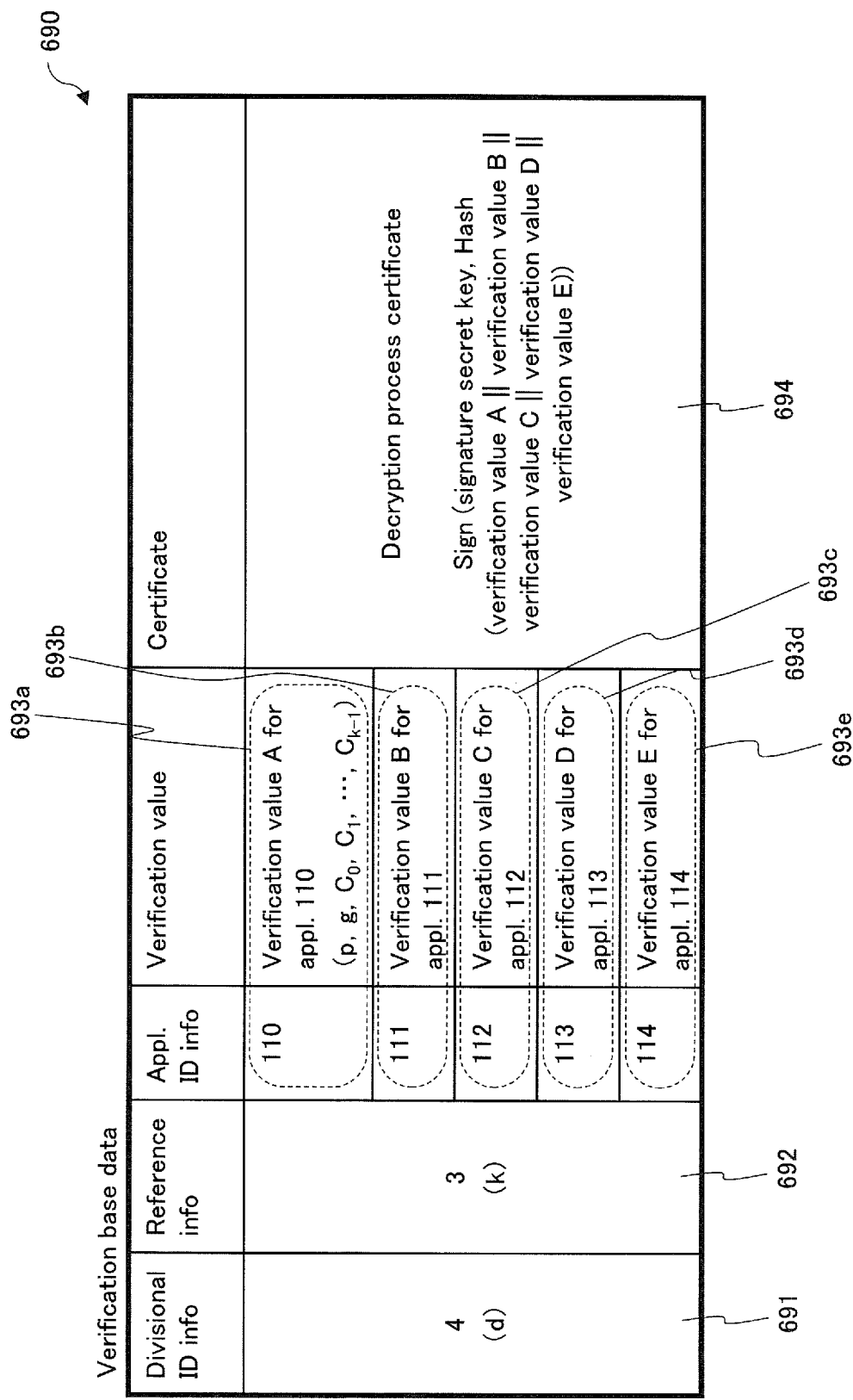
FIG. 22 illustrates the data structure of the verification base data 690.

Subsequently, the verification base data generating unit 610 generates a piece of verification base data. As shown in FIG. 22, the verification base data includes the divisional identification information, reference information, a plurality of verification value sets, and a certificate (decryption process certificate). Each of the verification value sets includes application identification information and a verification value (step S1104a). The divisional identification information and the reference information are described below.

Figure 21:
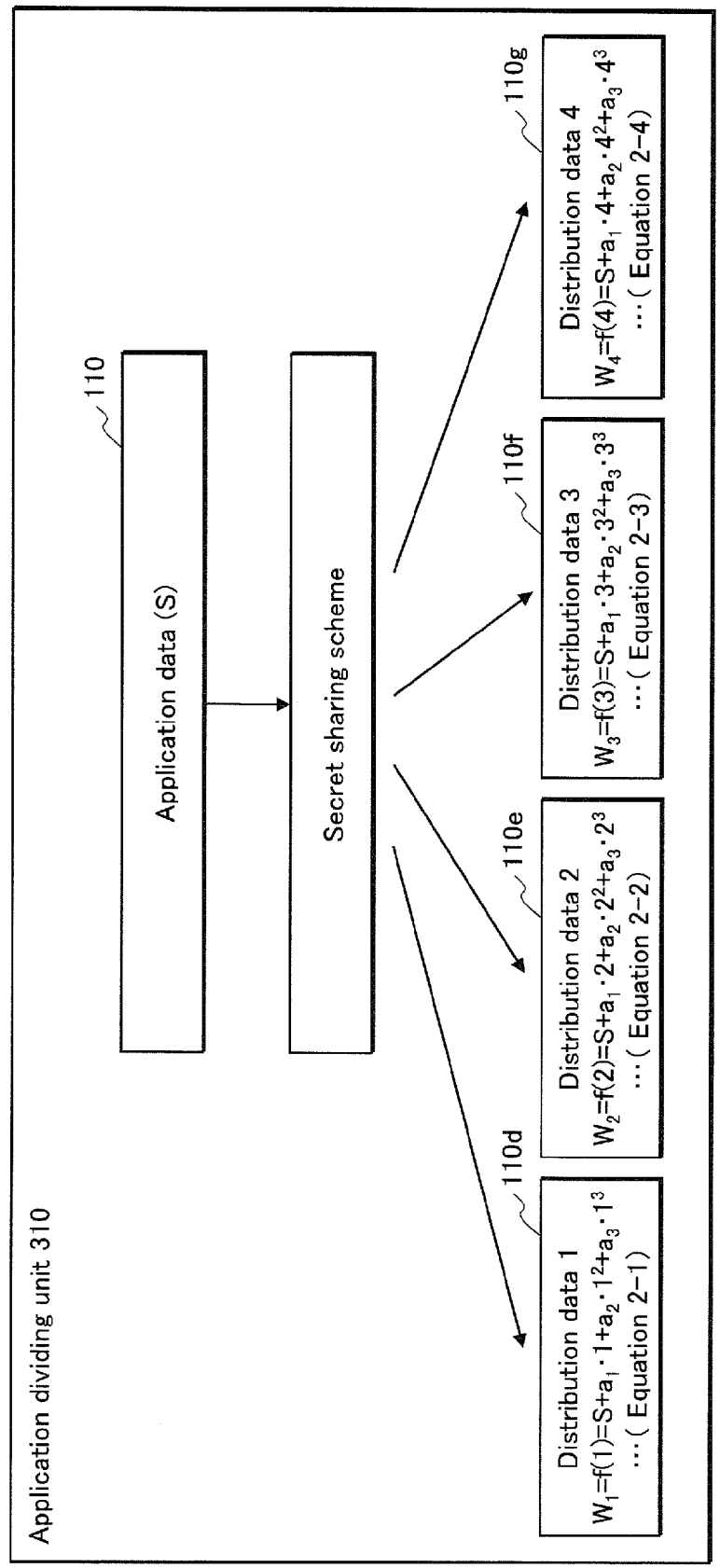
FIG. 21 illustrates distribution of data.

FIG. 21 illustrates an outline of the operation for distributing the data of an application. In this example, four pieces of distribution data are generated from the data of the application by the secret sharing scheme so that the original data of the application can be restored by using three pieces of distribution data among the generated four pieces of distribution data.

The application dividing unit 310 of the protection control module 120 generates, as one example, four pieces of distribution data (distribution data 1, 2, 3 and 4) from each of the applications 110, 111, 112, 113 and 114 by using the secret sharing scheme.

Here, an example case of generating the distribution data from the application 110 is described. As one example, as shown in FIG. 21, the application dividing unit 310 generates four pieces of distribution data: distribution data 1 (110d) "W1=f(1)"; distribution data 2 (110e) "W2=f(2)"; distribution data 3 (110f) "W3=f(3)"; and distribution data 4 (110dg) "W4=f(4)" by using Equations 2-1, 2-2, 2-3 and 2-4 shown in FIG. 21, by distributing the "data S of applicationS" by the secret sharing scheme.

In the detection system 10, as many pieces of verification base data are generated as the number of generated pieces of divisional data. On the other hand, in the detection system 10a, one piece of verification base data is generated. Verification base data 690 shown in FIG. 22 is one example of the verification base data generated by the verification base data generating unit 610.

As shown in FIG. 22, the verification base data 690 includes divisional identification information 691, reference information 692, verification value sets 693a, 693b, 693c, 693d and 693e, and a certificate 694. Each of the verification value sets includes application identification information and a verification value.

Here, the divisional identification information 691 indicates the number of pieces of distribution data generated by the application dividing unit 310, the number being denoted as "d". In this example, the divisional identification information 691 is, for example, "4".

Also, the reference information 692 is a detection threshold "k". In this example, the reference information 692 is, for example, "3".

The application identification information is an identifier identifying a corresponding application.

The verification values are, as described above, (p, g, $C_0$, $C_1$, ..., $C_{k-1}$).

The certificate 694 is a certificate that, as described above, is generated by generating concatenated data by concatenating a plurality of verification values, calculating a hash value by performing a calculation using a hash function onto the generated concatenated data, and applying a digital signature to the calculated hash value by using a signature secret key.

(3) Operation in Detection Process

Figure 24:
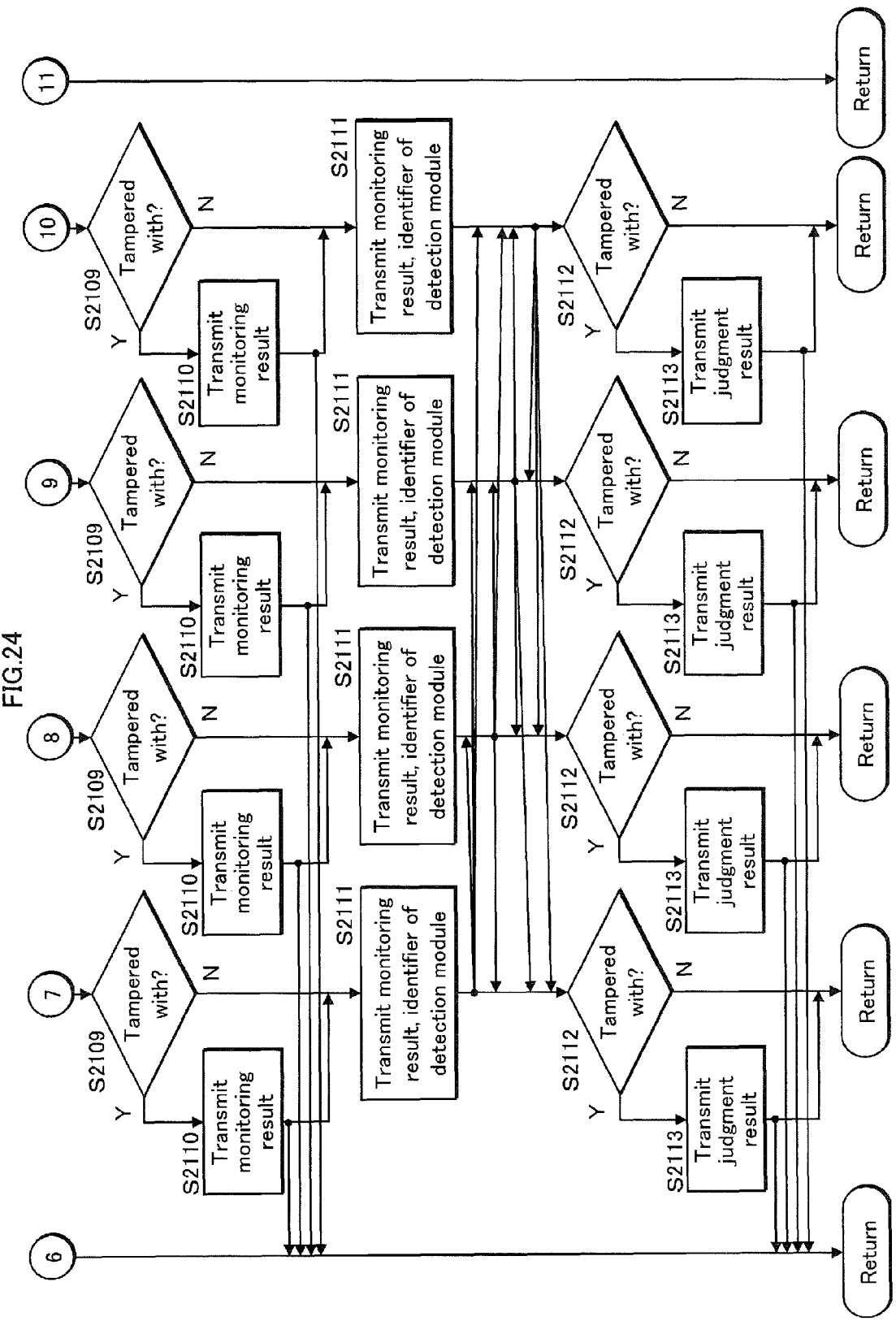
FIG. 24 is a sequence diagram illustrating the operation in the detection process, continuing from FIG. 23.

The following describes the operation of the detection system 10a in the detection process, with reference to sequence diagrams shown in FIGS. 23 to 24.

The operation in steps S2100 and S2101 in the detection process of the detection system 10a in FIG. 22 is the same as the operation in steps S2000 and S2001 of the detection system 10 in FIG. 15, and description thereof is omitted here. The following describes the processing from step S2102.

The application dividing unit 310 of the protection control module 120 sets the $(k-1)^{th}$ degree polynomial, as shown in Equation 1 in FIG. 23 by using the parameters ($a_1$, $a_2$, ..., $a_{k-1}$) and prime number "r" stored in the verification base data holding unit 308. In Equation 1, "S" denotes data of the application 110. The terms with degree "1" or more other than the constant term S respectively have $a_1$, $a_2$, ..., $a_{k-1}$ as the coefficients. The application dividing unit 310 generates d pieces of distribution data Wj (j=1, 2, ..., d) for each application by performing a calculation using Equation 2 shown in FIG. 23.

Here, the value "d" is specified by the divisional identification information included in the verification base data held by the verification base data holding unit 308. Also, the value "k" is specified by the reference information included in the verification base data (step S2102).

For example, when "d" is "4" and "k" is "3", the application dividing unit 310 generates four pieces of distribution data. Also, when a verification using three or more pieces of distribution data is successful, a verification of the protection control module is successful.

The protection control module 120 includes a detection module selecting unit 311a instead of the detection module selecting unit 311 in Embodiment 2. The detection module selecting unit 311a has a similar structure to the detection module selecting unit 311. The following description centers on the difference from the detection module selecting unit 311.

The detection module selecting unit 311a of the protection control module 120 selects detection modules to each of which the application identification information, distribution data, and verification base data are to be distributed (step S2103). Here, the application identification information is identification information identifying the application that is specified by the command, which was received by the protection control module 120 from the OS 180, to be executed. The distribution data is distribution data generated by the application dividing unit 310. The verification base data is verification base data held by the verification base data holding unit 308. An example of the verification base data is verification base data 690 shown in FIG. 22.

Figure 25:
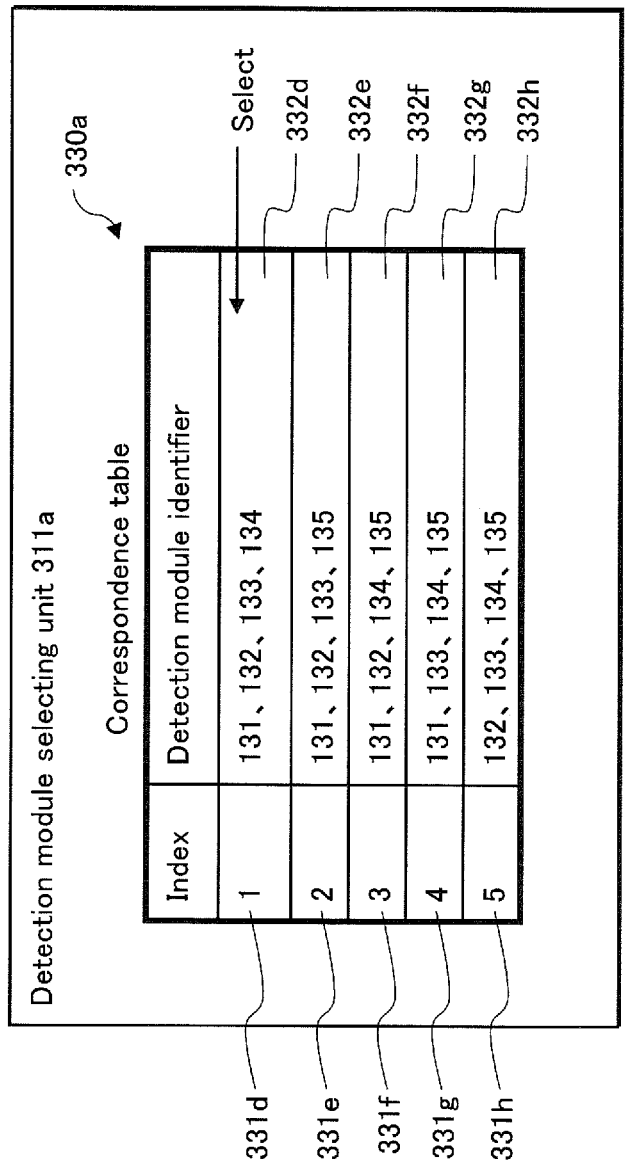
FIG. 25 illustrates the data structure of the correspondence table 330a used to select detection modules.
Figure 26:
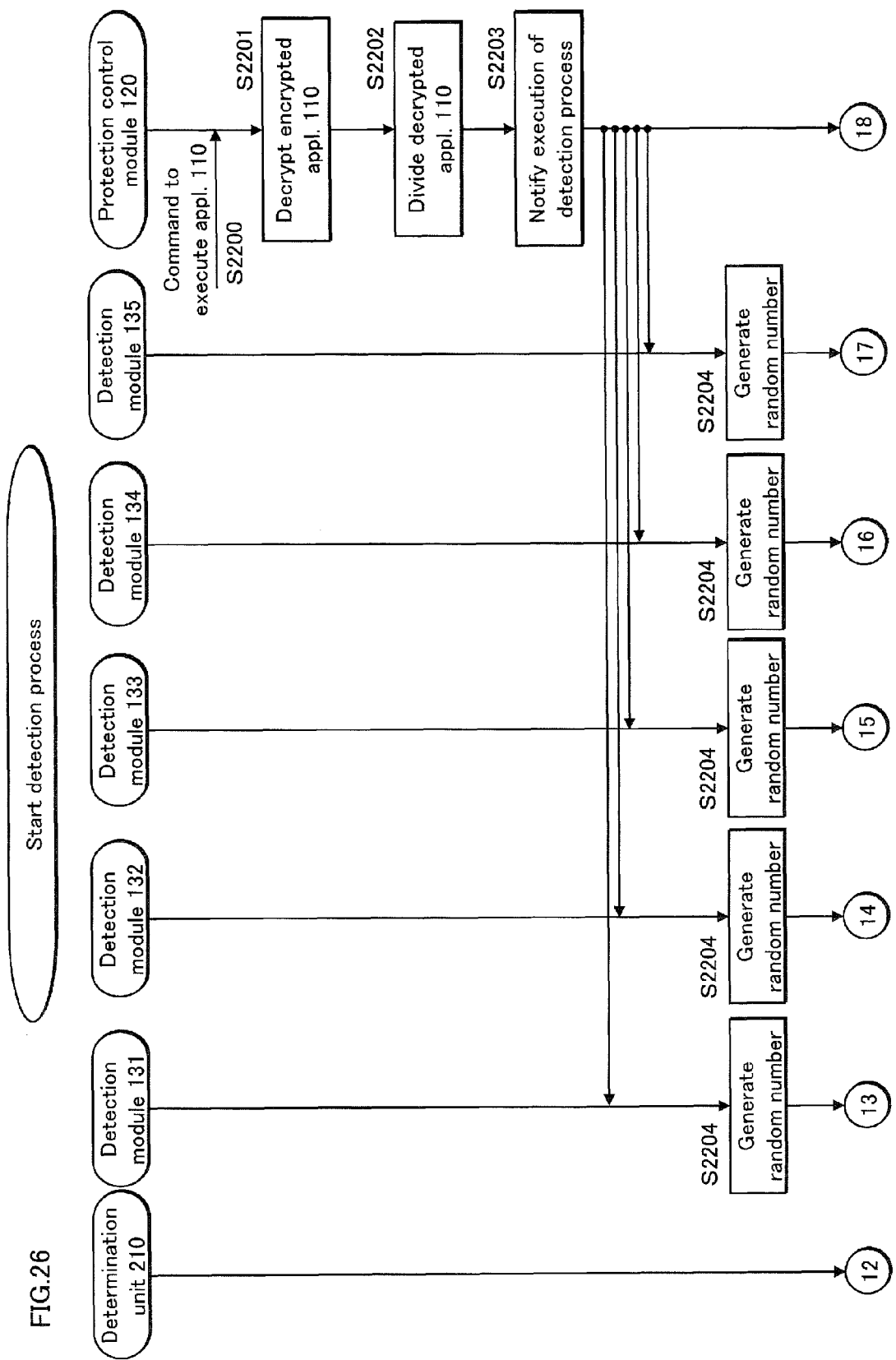
FIG. 26 is a sequence diagram illustrating the operation in the detection process in Embodiment 4, continuing to FIG. 27.
Figure 27:
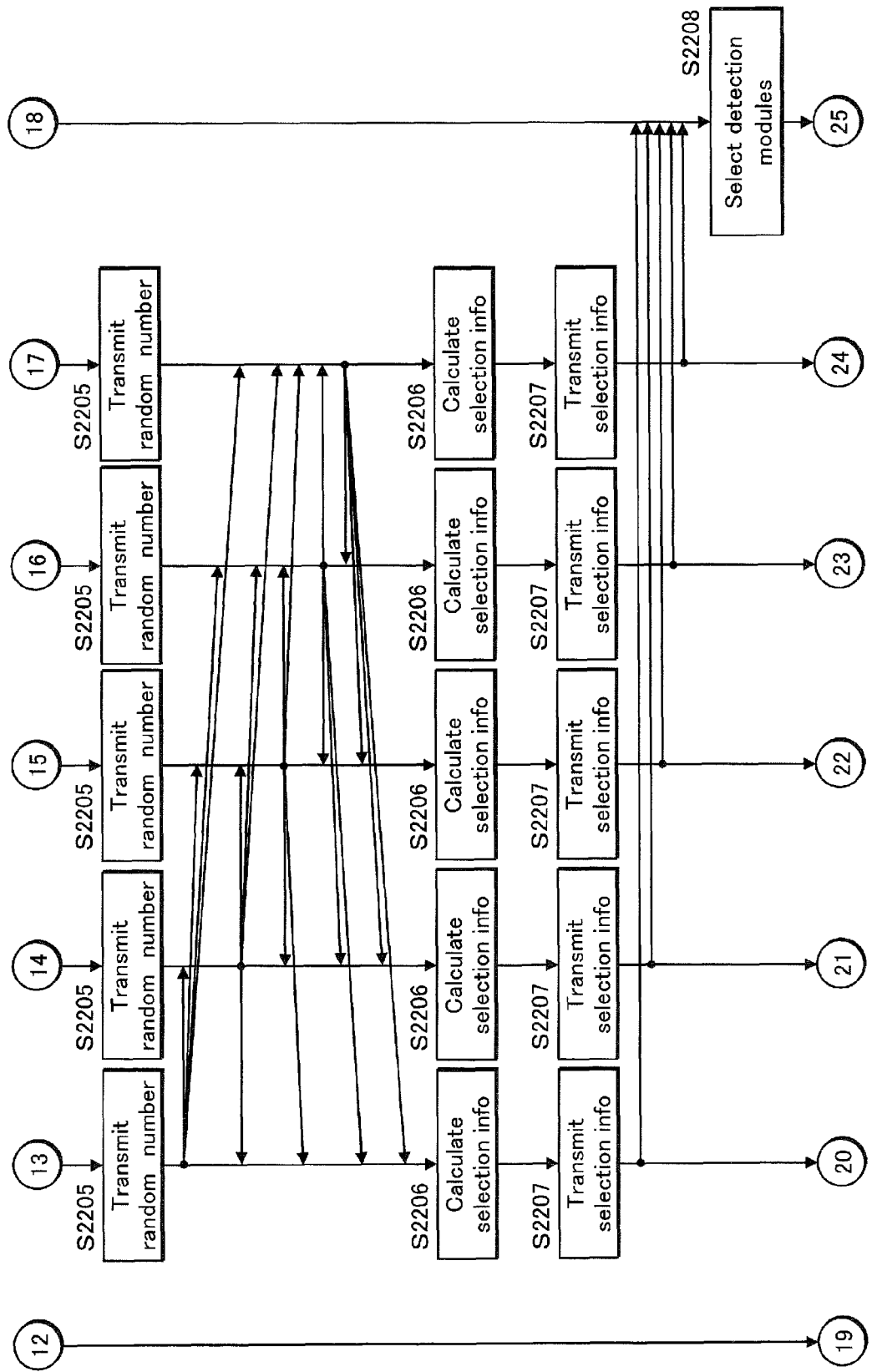
FIG. 27 is a sequence diagram illustrating the operation in the detection process, continuing to FIG. 28.
Figure 28:
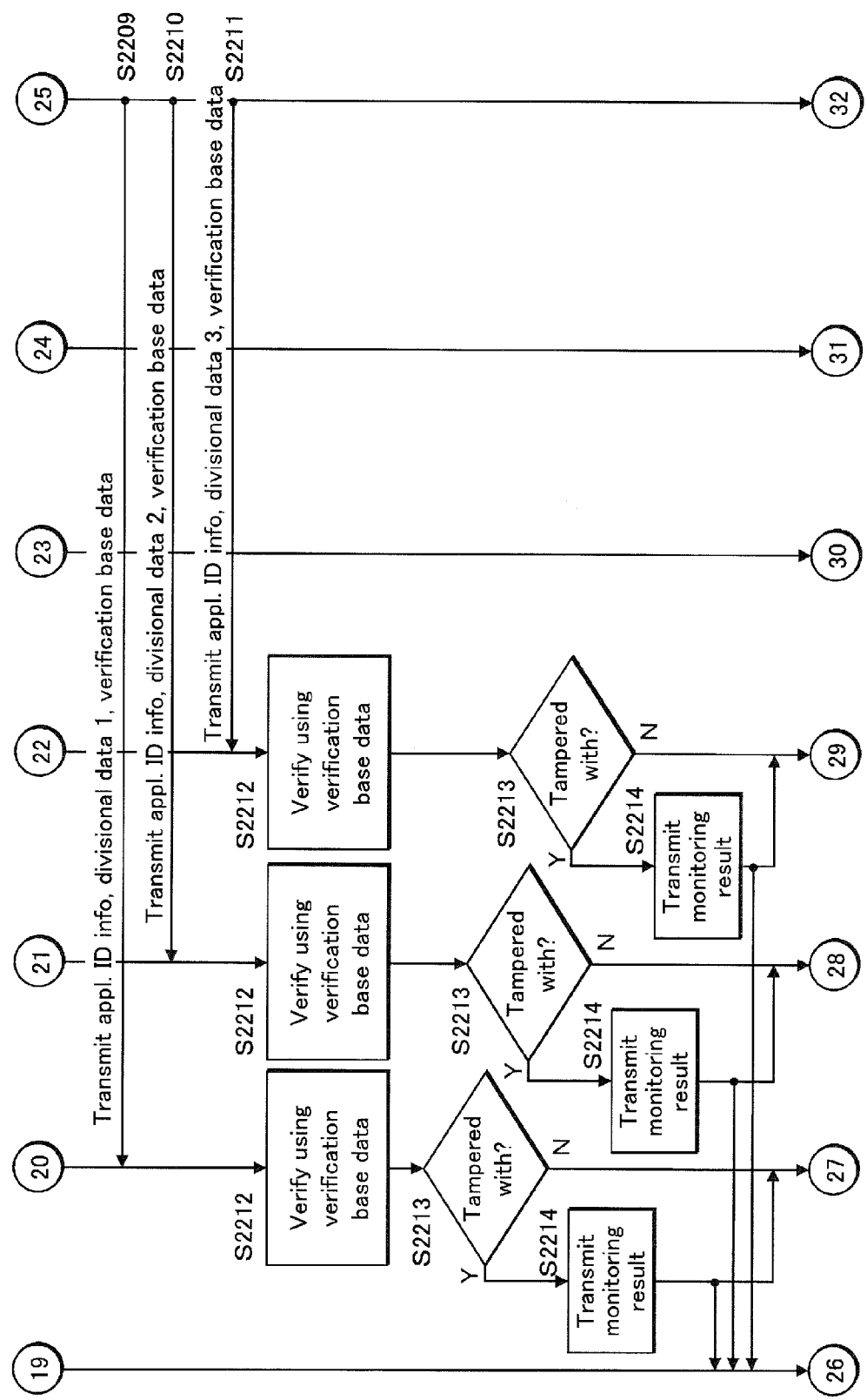
FIG. 28 is a sequence diagram illustrating the operation in the detection process, continuing to FIG. 29.
Figure 29:
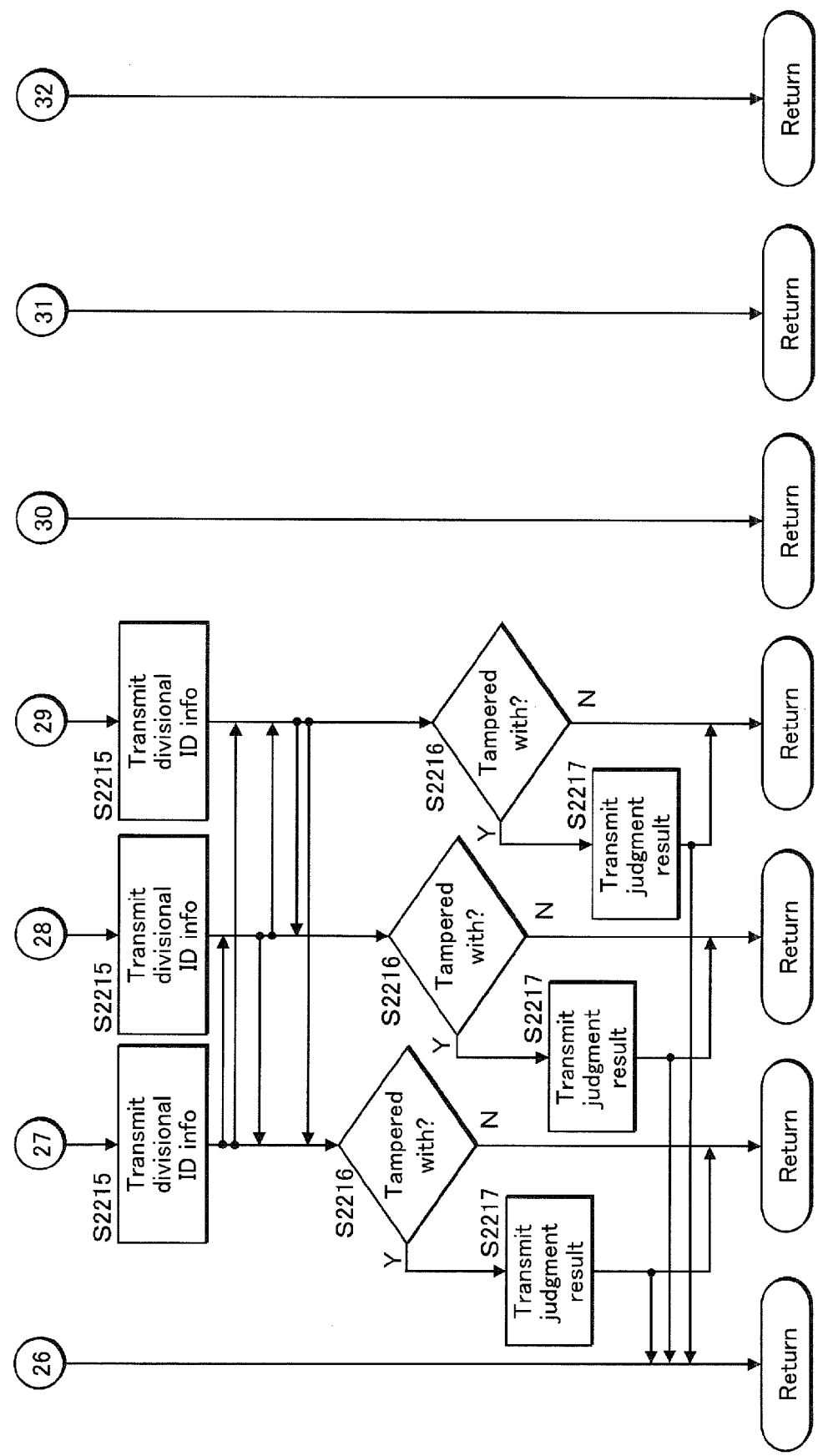
FIG. 29 is a sequence diagram illustrating the operation in the detection process, continuing from FIG. 28.

The following describes how the detection module selecting unit 311a selects detection modules, with reference to FIG. 25.

The detection module selecting unit 311a holds a correspondence table 330a illustrated in FIG. 25.

The detection module selecting unit 311a selects detection modules by determining to which detection modules among the detection modules 131, 132, 133, 134, and 135 the application identification information, distribution data, and verification base data are to be distributed, by referring to the correspondence table 330a.

As shown in FIG. 25, the correspondence table 330a held by the detection module selecting unit 311a indicates, in association with indices provided in the index column, all combinations of four detection modules selected from among the detection modules 131, 132, 133, 134, and 135.

The correspondence table 330a illustrated in FIG. 25 has the same structure as the correspondence table 330 illustrated in FIG. 17. The correspondence table 330a includes a plurality of pairs of an index and a set of detection module identifiers. The index is an identifier identifying a corresponding combination. For example, the correspondence table 330a includes: a combination 332d which is a combination of identifiers "131", "132", "133" and "134" identifying detection modules 131, 132, 133 and 134, respectively, in association with index 331d "1"; a combination 332e which is a combination of identifiers "131", "133", "134" and "135" identifying detection modules 131, 133, 134 and 135, respectively, in association with index 331e "2"; a combination 332f which is a combination of identifiers "131", "132", "134" and "135" identifying detection modules 131, 132, 134 and 135, respectively, in association with index 331f "3"; a combination 332g which is a combination of identifiers "131", "133", "134" and "135" identifying detection modules 131, 133, 134 and 135, respectively, in association with index 331g "4"; a combination 332h which is a combination of identifiers "132", "133", "134" and "135" identifying detection modules 132, 133, 134 and 135, respectively, in association with index 331h "5".

The detection module selecting unit 311a selects the detection modules by determining an index that has the same value as the selection information by referring to the correspondence table 330a, and selecting a combination associated with the determined index by referring to the correspondence table 330a. For example, if the selection information is "1", the detection module selecting unit 311a selects the combination 332d corresponding to the index 331d "1" in the correspondence table 330a. Since the combination 332d include identifiers "131", "132", "133" and "134", the detection modules 131, 132, 133 and 134 are selected. In the following, an explanation is given on the presumption that a combination of the detection modules 131, 132, 133 and 134 was selected.

The protection control module 120 distributes the application identification information, distribution data, and verification base data to the selected detection modules. Here, as one example, the protection control module 120: transmits the application identification information, the first piece of distribution data (distribution data 1 (110d)) for the application, and the verification base data to the detection module 131 (step S2104); transmits the application identification information, the second piece of distribution data (distribution data 2 (110e)) for the application, and the verification base data to the detection module 132 (step S2105); transmits the application identification information, the third piece of distribution data (distribution data 3 (110f)) for the application, and the verification base data to the detection module 133 (step S2106); and transmits the application identification information, the fourth piece of distribution data (distribution data 4 (110g)) for the application, and the verification base data to the detection module 134 (step S2107).

The verification unit 404 in each of the detection modules 131, 132, 133 and 134 judges whether or not Equation 4 shown in FIG. 23 is true. Also, each verification unit 404 verifies the signature of the certificate included in the verification base data (step S2108).

If Equation 4 is not true or the verification has failed, each detection module judges that the protection control module 120 is tampered with (Y in step S2019), and transmits, to the determination unit 210 of the management device 200, a monitoring result indicating that the distribution data is not authentic (step S2110). When Equation 4 is true and the verification has succeeded, each detection module judges that the protection control module 120 is not tampered with (N in step S2109), and transmits, to the other detection modules, a monitoring result indicating that the distribution data is authentic, together with the identifier of the detection module (step S2111). Also, each detection module checks monitoring results received from the other detection modules and the monitoring result of the detection module itself to judge whether or not the verification by Equation 4 was successful in k or more detection modules (step S2112), and when it is judged that the verification by Equation 4 was successful in k or more detection modules (N in step S2112), each detection module determines that the protection control module 120 is not tampered with, and the process is ended. If it is not judged that the verification by Equation 4 was successful in k or more detection modules (Y in step S2112), a judgment result indicating that the protection control module 120 is tampered with is transmitted to the determination unit 210 of the management device 200 (step S2113).

The verification unit 404 judges that the protection control module 120 is not tampered with when it receives monitoring results indicating that the distribution data is authentic, from k (threshold value) or more detection modules including the detection module to which it belongs, from among the d detection modules to which the distribution data were distributed. In this case, even if one more monitoring results indicating that the distribution data is tampered with are transmitted to the verification unit 404 when it should be determined that the distribution data is authentic since less than k detection modules have operated in an unauthorized manner, the verification unit 404 judges that the protection control module 120 is in the normal state since k or more detection modules have determined that the distribution data is authentic.

The verification unit 404 judges that the protection control module 120 is tampered with when it receives monitoring results indicating that the distribution data is not authentic, from (d−k+1) or more detection modules among the d detection modules to which the distribution data were distributed.

Note that the determination unit 210 of the management device 200 may perform the above judgment.

The determination unit 210 determines that the protection control module 120 is not tampered with when it receives monitoring results indicating that the distribution data is authentic, from k (threshold value) or more detection modules, among the d detection modules to which the distribution data were distributed. In this case, even if one more monitoring results indicating that the distribution data is tampered with are transmitted to the determination unit 210 when it should be determined that the distribution data is authentic since less than k detection modules have operated in an unauthorized manner, the determination unit 210 determines that the protection control module 120 is in the normal state since k or more detection modules have determined that the distribution data is authentic.

The determination unit 210 determines that the protection control module 120 is tampered with when it receives monitoring results indicating that the distribution data is not authentic, from (d−k+1) or more detection modules among the d detection modules to which the distribution data were distributed.

3.3 Effects of Detection System 10a

The detection system 10a can detect a tampering of a protection control module by using monitoring results of k or more detection modules, wherein "k" is a positive integer smaller than "d". Accordingly, the detection system 10a can detect a tampering of the protection control module even if (d−k) detection modules have been tampered with.

With the above structure of the detection system 10a, even if a detection module, to which the distribution data was distributed, has operated in an unauthorized manner, it is possible to judge whether or not the protection control module has operated normally. This makes it possible to maintain the security of the system.

Also, with use of the threshold secret sharing scheme in distributing the data of a decrypted application, it is possible to theoretically evaluate the security of the system.

4. Embodiment 4

The following describes a detection system 10b as another embodiment of the present invention.

The detection system 10b has a similar structure to the detection system 10 in Embodiment 2. The following description centers on the difference from the detection system 10.

4.1 Outline

In the detection system 10, the protection control module selects detection modules to which the divisional data are to be distributed. However, when the protection control module operates in an unauthorized manner, and an attacker knows which detection module operates in an unauthorized manner, the attacker can prevent detection of the unauthorized operation of the protection control module by distributing the divisional data to the detection module that operates in an unauthorized manner. In view of this, in the detection system 10b, detection modules determine detection modules to which the divisional data are to be distributed so that the protection control module cannot arbitrarily select detection modules to which the divisional data are to be distributed.

4.2 Operation (1) Operation in Detection Process

The following describes the operation of the detection system 10b in the detection process, with reference to sequence diagrams shown in FIGS. 26 to 29. The operation in steps S2200 to S2202 in the detection process of the detection system 10b is the same as the operation in steps S2000 to S2002 of the detection system 10 in FIG. 15, and description thereof is omitted here. The following describes the processing from step S2203.

The protection control module 120 notifies each of the detection modules of an execution of the detection process (step S2203).

After receiving the notification from the protection control module 120, the verification unit 404 of each detection module generates a random number (step S2204). The transmission unit 402 transmits the generated random number to all the other detection modules (step S2205). Each detection module receives random numbers from all the other detection modules (step S2205), and the verification unit 404 adds up all the received random numbers and the random number generated by the detection module to which the verification unit 404 itself belongs, and calculates selection information that identifies an index included in a correspondence table 330b (described below) that is held by the verification unit 404, by using the sum of the random numbers (step S2206).

Figure 30:
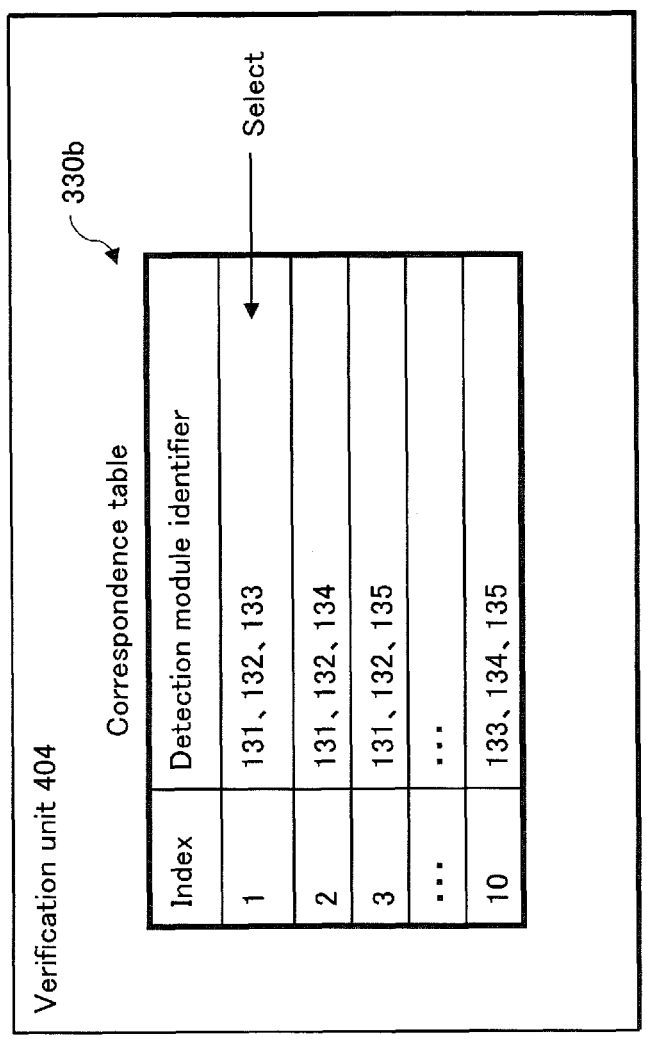
FIG. 30 illustrates the data structure of the correspondence table 330b used to select detection modules.

The verification unit 404 holds a correspondence table 330b illustrated in FIG. 30 as one example. The correspondence table 330b is the same as the correspondence table 330 held by the detection module selecting unit 311 of the protection control module 120.

Each detection module obtains the maximum value of index from the correspondence table 330b. In the correspondence table 330b of this example, "10" is the maximum value of index. Each detection module then calculates the selection information as a result of a modulo operation performed on the sum of the random numbers, with the obtained maximum value used as the modulus (divisor).

Selection information=$(r1+r2+ \ldots +m) \bmod$(maximum value of index)

Here, r1, r2, . . . m are random numbers respectively generated by n detection modules. Also, when the calculation gives "0" as the selection information, the maximum value of index is used as the selection information.

For example, when the sum of the random numbers is "21", and a modulo operation is performed on "21" by using "10" as the modulus (divisor), the result (remainder of division) is "1". Thus, the selection information is "1". Also, when the sum of the random numbers is "30", and a modulo operation is performed on "30" by using "10" as the modulus (divisor), the result (remainder of division) is "0". Thus, the selection information in this case is "10".

Each detection module transmits the selection information to the protection control module 120 (step S2207).

Based on one of the received pieces of selection information, the protection control module 120 selects an index that matches the one piece of selection information from among the indices included in the correspondence table 330 illustrated in FIG. 17, and selects a set of detection module identifiers that corresponds to the selected index (step S2208).

The operation in the succeeding steps S2209 to S2217 is the same as the operation in steps S2004 to S2012 shown in FIGS. 15 to 16 of Embodiment 2, and description thereof is omitted here.

4.3 Effects of Detection System 10b

In the detection system 10b, detection modules in cooperation determine detection modules to which the divisional data are to be distributed. Thus the protection control module cannot arbitrarily select detection modules to which the divisional data are to be distributed. Also, unless all detection modules operate in an unauthorized manner, it is unknown which detection modules are selected. This structure prevents the protection control module from operating in an unauthorized manner and from arbitrarily selecting detection modules to which the divisional data are to be distributed, thus improving the security of the system.

5. Embodiment 5

The following describes a detection system 10c as another embodiment of the present invention.

The detection system 10c has a similar structure to the detection system 10 in Embodiment 2. The following description centers on the difference from the detection system 10.

5.1 Outline

In the detection system 10c, in the protection control module 120, an encrypted application is decrypted through a decryption process which is composed of a plurality of decryption sub-processes. In this process, a correspondence between the input and the output of each decryption sub-process is verified to determine whether or not the protection control module 120 is tampered with.

Figure 31:
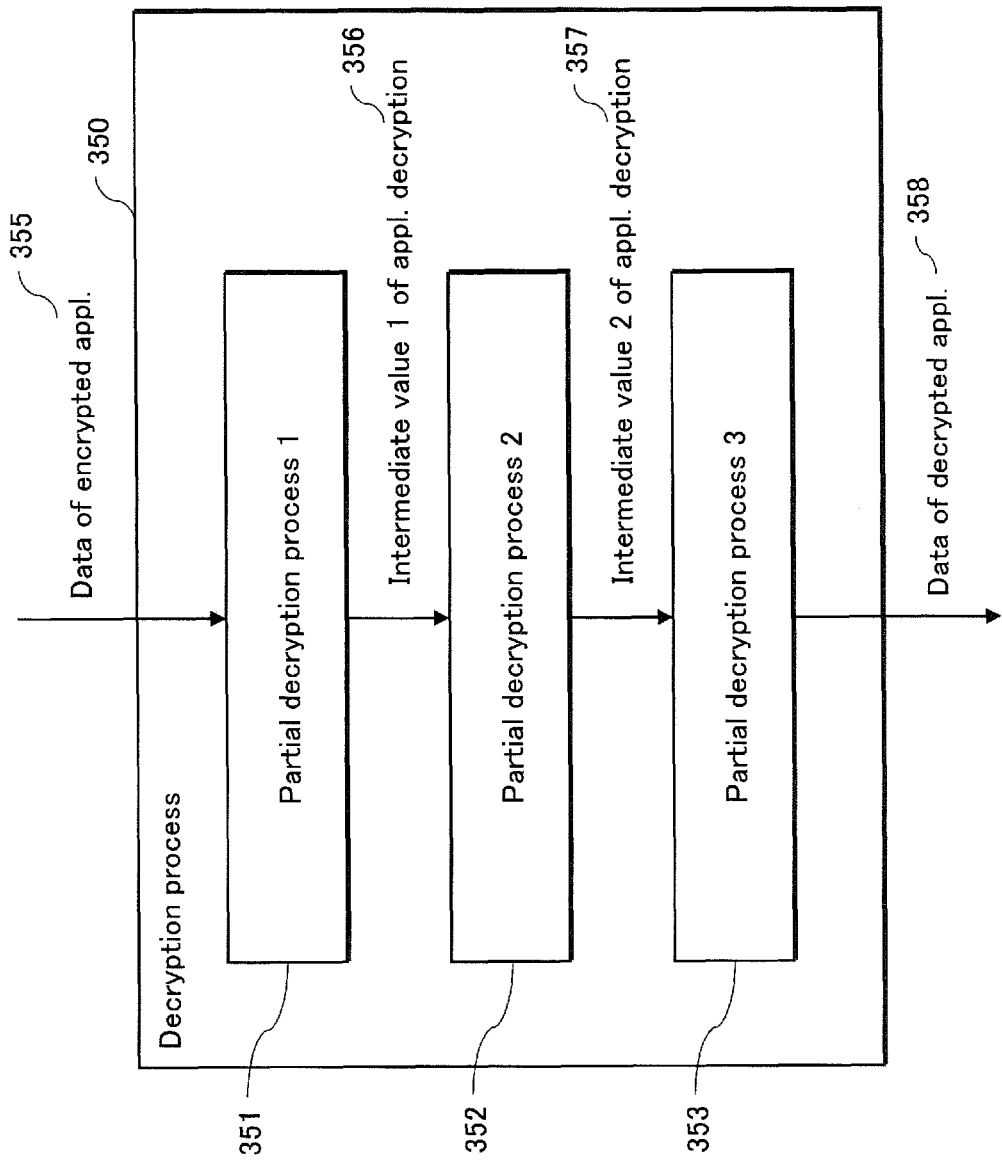
FIG. 31 illustrates the decryption process composed of a plurality of decryption sub-processes in Embodiment 5.

FIG. 31 illustrates an outline of a decryption process 350 in the protection control module 120, the decryption process 350 being composed of a plurality of decryption sub-processes. In the detection system 10c, the decryption process 350 is composed of, for example, three decryption sub-processes: a partial decryption process 1 (351); a partial decryption process 2 (352); and a partial decryption process 3 (353). Note that the decryption process may be composed of four or more partial decryption processes as the decryption sub-processes.

Here, examples of the decryption process composed of a plurality of decryption sub-processes are DES (Data Encryption Standard) and AES (Advanced Encryption Standard).

The partial decryption process 1 (351) receives encrypted application data 355 as input data, generates an intermediate value 1 (356) by decrypting the encrypted application data 355, and outputs the intermediate value 1 (356) to the partial decryption process 2 (352) as output data. The partial decryption process 2 (352) receives the intermediate value 1 (356) as input data, generates an intermediate value 2 (357) by decrypting the intermediate value 1 (356), and outputs the intermediate value 2 (357) to the partial decryption process 3 (353) as output data. The partial decryption process 3 (353) receives the intermediate value 2 (357) as input data, generates application data (358) by decrypting the intermediate value 2 (357), and outputs the application data (358) as output data.

Each detection module verifies a correspondence between the input and the output of each partial decryption process by using verification data generated for each partial decryption process. Note that, from the view point of security, it is desirable that the three detection modules verify respective different partial decryption processes, not that one detection module verifies all the three partial decryption processes. It is desirable in general that the decryption process is composed of a plurality of partial decryption processes, and as many detection modules as the partial decryption processes verify the respective different partial decryption processes with regard to the correspondence between the input and the output thereof. Note that detection modules, which are larger in number than partial decryption processes, may verify the partial decryption processes. In this case, a plurality of detection modules verify one partial decryption process.

5.2 Structure

The management device 200 of the detection system 10c includes a verification base data distribution unit 220a instead of the verification base data distribution unit 220 provided in the management device 200 of the detection system 10. The verification base data distribution unit 220a has a similar structure to the verification base data distribution unit 220 in the management device 200 of the detection system 10. The following description centers on the difference therebetween.

(1) Structure of Verification Base Data Distribution Unit 220a

Figure 32:
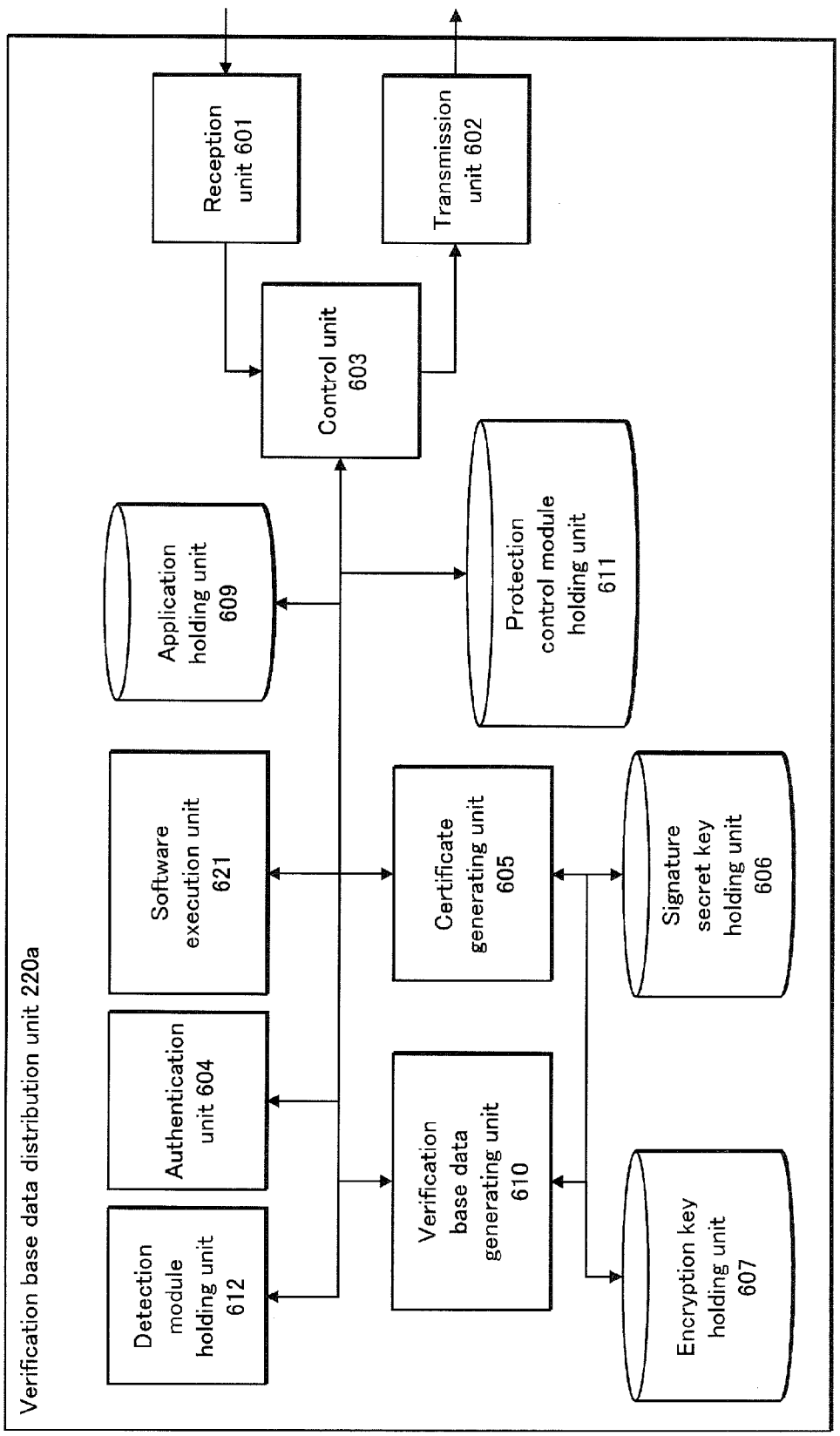

FIG. 32 is a functional block diagram illustrating the functional structure of the verification base data distribution unit 220a of the detection system 10c. The structural elements having the same functions as those of the verification base data distribution unit 220 in the detection system 10 are assigned the same reference signs, and description thereof is omitted.

Compared with the verification base data distribution unit 220 in the detection system 10, it is noted that the verification base data distribution unit 220a is not provided with the data dividing unit 608. Also, the verification base data distribution unit 220a includes a software execution unit 621 that is not present in the verification base data distribution unit 220.

The software execution unit 621 decrypts an encrypted application by using a protection control module held by the protection control module holding unit 611, and obtains the intermediate values 1 and 2 and data of a decrypted application in the plurality of decryption sub-processes constituting the decryption process.

(Data Structure of Verification Base Data)

In the detection system 10c, the structure of the verification base data generated by the verification base data distribution unit 220a is different from that of the verification base data generated in the detection system 10.

FIG. 33 illustrates the data structure of verification base data 240 which is one example of the verification base data in the detection system 10c.

As shown in FIG. 33, the verification base data 240 includes: data 241a associated with the partial decryption process 1; data 241b associated with the partial decryption process 2; and data 241c associated with the partial decryption process 3. The verification base data is held by the verification base data holding unit 308 of the protection control module 120.

(a) As shown in FIG. 33, the data 241a associated with the partial decryption process 1 includes reference information 242a, verification value sets 243a to 247a, a certificate 248a, and a partial decryption identifier 249a.

The reference information 242a is information for judging whether or not the whole partial decryption process has been verified, and the number of decryption sub-processes is written in the reference information 242a. For example, when the decryption process is composed of three decryption sub-processes, "3" is written in the reference information 242a.

The number of the verification value sets 243a to 247a is the same as the number of applications, and the verification value sets 243a, 244a, 245a, 246a and 247a correspond to the applications 110, 111, 112, 113 and 114, respectively. Each of the verification value sets includes application identification information, data, and a verification value.

The application identification information included in the verification value set is an identifier identifying a corresponding application.

The data included in the verification value set is data of the corresponding encrypted application.

The verification value included in the verification value set is a decryption verification value that is generated from the encrypted application data 355 and intermediate value 1 (356), which is the output data of the partial decryption process 1 (351). The verification value is a hash value which is obtained by performing a calculation using a hash function onto concatenated data, which has been obtained by concatenating the input data and the output data of the partial decryption process 1 (351) when the protection control module 120 operated normally.

Verification value=Hash(input data of partial decryption process 1 (351)| |output data of partial decryption process 1 (351))

In this example, a hash value is used as the verification value. However, not limited to this, a signature or the like may be used as follows.

Verification value=Sign(signature secret key,(input data of partial decryption process 1 (351)| |output data of partial decryption process 1 (351)))

The certificate 248a is a decryption process certificate. The decryption process certificate is a signature which is generated by concatenating all verification values included in the data 241a associated with the partial decryption process 1, calculating a hash value by performing a calculation using a hash function onto concatenated data that is obtained by concatenating the plurality of verification values, and applying a digital signature algorithm to the calculated hash value by using the signature secret key held by the signature secret key holding unit 606.

Certificate 248a=Sign(signature secret key, Hash(verification value| |verification value| | . . . | |verification value| |verification value))

The partial decryption identifier 249a is an identifier of the partial decryption process 1 (351). As one example, the partial decryption identifier 249a is "001".

(b) As shown in FIG. 33, the data 241b associated with the partial decryption process 2 includes reference information 242b, verification value sets 243b to 247b, a certificate 248b, and a partial decryption identifier 249b.

The reference information 242b is information for judging whether or not the whole partial decryption process has been verified, and the number of decryption sub-processes is written in the reference information 242b. For example, when the decryption process is composed of three decryption sub-processes, "3" is written in the reference information 242b.

The number of the verification value sets 243b to 247b is the same as the number of applications, and the verification value sets 243b, 244b, 245b, 246b and 247ba correspond to the applications 110, 111, 112, 113 and 114, respectively. Each of the verification value sets includes application identification information, data, and a verification value.

The application identification information included in the verification value set is an identifier identifying a corresponding application.

The data included in the verification value set is an intermediate value 1 generated from the corresponding encrypted application.

The verification value included in the verification value set is a decryption verification value that is generated from the intermediate value 1 (356) and intermediate value 2 (357), which is the output data of the partial decryption process 2 (352). The intermediate value 1 (356) and the intermediate value 2 (357) are obtained when the software execution unit 621 performs an application decryption process. The verification value is a hash value which is obtained by performing a calculation using a hash function onto concatenated data, which has been obtained by concatenating the input data and the output data of the partial decryption process 2 (352) when the protection control module 120 operated normally.

Verification value=Hash(input data of partial decryption process 2 (352)| |output data of partial decryption process 2 (352))

In this example, a hash value is used as the verification value. However, not limited to this, a signature or the like may be used as follows.

Verification value=Sign(signature secret key, Hash (input data of partial decryption process 2 (352)| |output data of partial decryption process 2 (352)))

The certificate 248a is a decryption process certificate. The decryption process certificate is a signature which is generated by concatenating all verification values included in the data 241b associated with the partial decryption process 2, calculating a hash value by performing a calculation using a hash function onto concatenated data that is obtained by concatenating the plurality of verification values, and applying a digital signature algorithm to the calculated hash value by using the signature secret key held by the signature secret key holding unit 606.

Certificate 248b=Sign(signature secret key, Hash(verification value| |verification value| | . . . | |verification value| |verification value))

The partial decryption identifier 249b is an identifier of the partial decryption process 2 (352). As one example, the partial decryption identifier 249b is "002".

(c) As shown in FIG. 33, the data 241c associated with the partial decryption process 3 includes reference information 242c, verification value sets 243c to 247c, a certificate 248c, and a partial decryption identifier 249c.

The reference information 242c is information for judging whether or not the whole partial decryption process has been verified, and the number of decryption sub-processes is written in the reference information 242c. For example, when the decryption process is composed of three decryption sub-processes, "3" is written in the reference information 242c.

The number of the verification value sets 243c to 247c is the same as the number of applications, and the verification value sets 243c, 244c, 245c, 246c and 247c correspond to the applications 110, 111, 112, 113 and 114, respectively. Each of the verification value sets includes application identification information, data, and a verification value.

The application identification information included in the verification value set is an identifier identifying a corresponding application.

The data included in the verification value set is an intermediate value 2 (357) generated from the data of the corresponding encrypted application.

The verification value included in the verification value set is a decryption verification value that is generated from the intermediate value 2 (357) and the application data (358). Here, the application data (358) is the output data of the partial decryption process 3 (353). The data (358) of a decrypted application is obtained when the software execution unit 621 performs an application decryption process. The verification value is a hash value which is obtained by performing a calculation using a hash function onto concatenated data, which has been obtained by concatenating the input data and the output data of the partial decryption process 3 (353) when the protection control module 120 operated normally.

Verification value=Hash(input data of partial decryption process 3 (353)| |output data of partial decryption process 3 (353))

In this example, a hash value is used as the verification value. However, not limited to this, a signature or the like may be used as follows.

Verification value=Sign(signature secret key, Hash (input data of partial decryption process 3 (353)| |output data of partial decryption process 3 (353)))

The certificate 248c is a decryption process certificate. The decryption process certificate is a signature which is generated by concatenating all verification values included in the data 241c associated with the partial decryption process 3, calculating a hash value by performing a calculation using a hash function onto concatenated data that is obtained by concatenating the plurality of verification values, and applying a digital signature algorithm to the calculated hash value by using the signature secret key held by the signature secret key holding unit 606.

Certificate 248c=Sign(signature secret key, Hash(verification value| |verification value| | . . . | |verification value| |verification value))

The partial decryption identifier 249c is an identifier of the partial decryption process 3 (353). As one example, the partial decryption identifier 249c is "003".

5.3 Operation (1) Operation in Verification Base Data Generations Process

Figure 34:
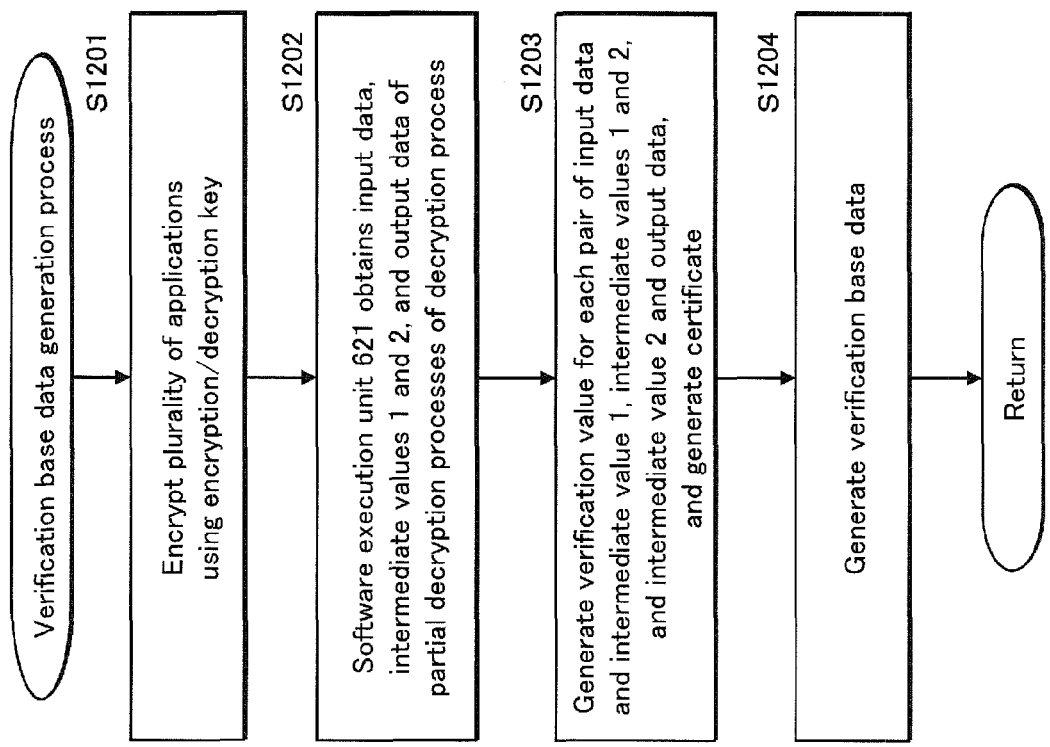
FIG. 34 is a flowchart illustrating the operation in the verification base data generation process.

The operation of the detection system 10c in the verification base data generation process is described with reference to the flowchart of FIG. 34.

In the generation of the verification base data, the software execution unit 621 encrypts a plurality of applications installed in the device 100 and held by the application holding unit 609 by using the encryption/decryption key of the protection control module 120 (step S1201). The software execution unit 621 executes the decryption process of the protection control module 120 to decrypt a plurality of encrypted applications and obtain the intermediate value 1 (356), intermediate value 2 (357), and data (358) of a decrypted application which are the output data of the partial decryption process 1 (351), partial decryption process 2 (352), and partial decryption process 3 (353), respectively (step S1202).

Next, the certificate generating unit 605 performs the following process for each application. First, it generates a verification value for each of a pair of the data (355) of an encrypted application and the intermediate value 1 (356), a pair of the intermediate value 1 (356) and the intermediate value 2 (357), and a pair of the intermediate value 2 (357) and the data (358) of a decrypted application, and generates a certificate for each partial decryption process from a plurality of verification values by using the signature secret key held by the signature secret key holding unit 606 (step S1203).

Lastly, the verification base data generating unit 610 generates the verification base data 240 that includes: data 241*a* associated with the partial decryption process 1; data 241*b* associated with the partial decryption process 2; and data 241*c* associated with the partial decryption process 3 (step S1204).

(2) Operation in Detection Process

Figure 35:
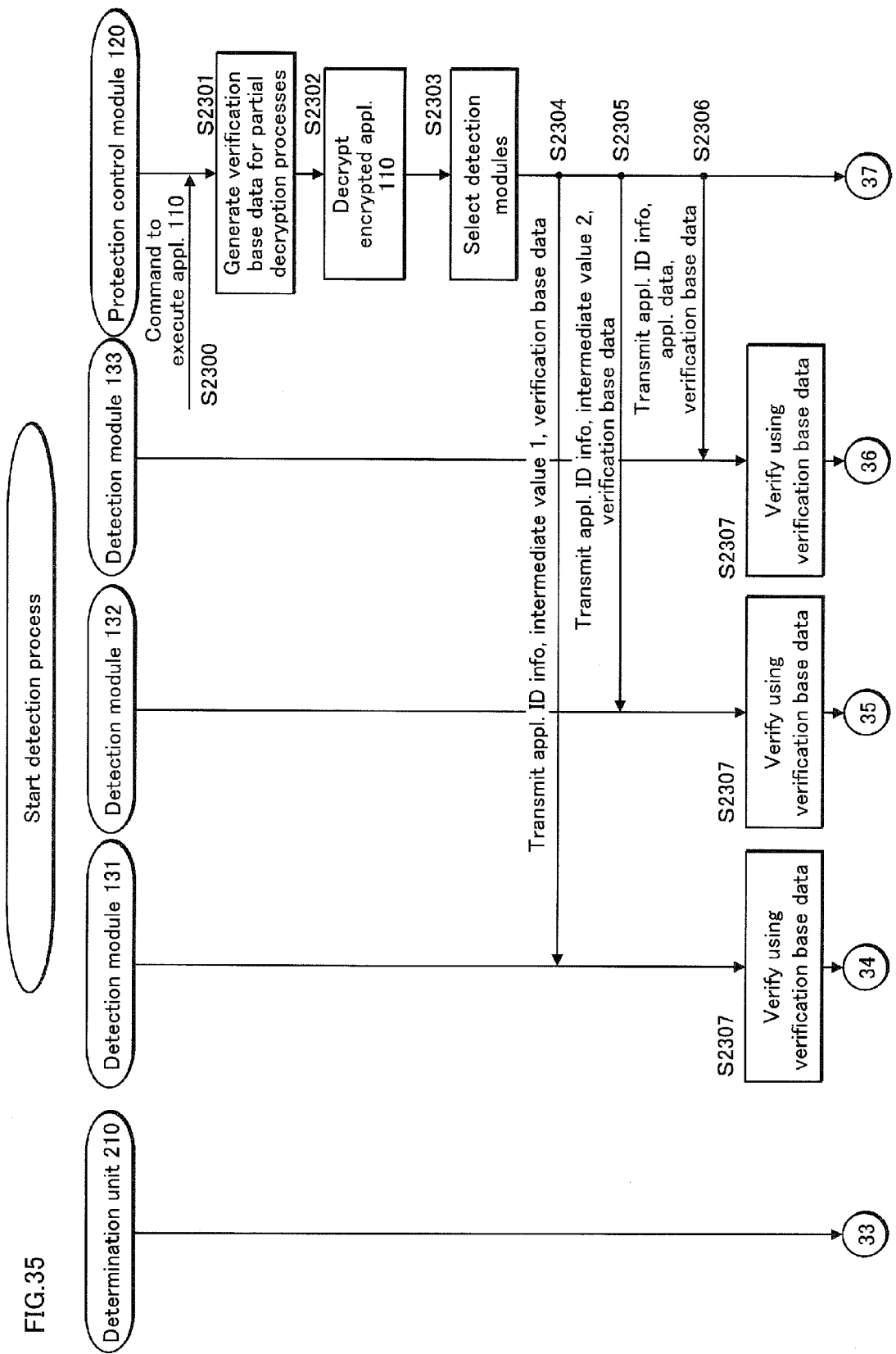
FIG. 35 is a sequence diagram illustrating the operation in the detection process, continuing to FIG. 36.
Figure 36:
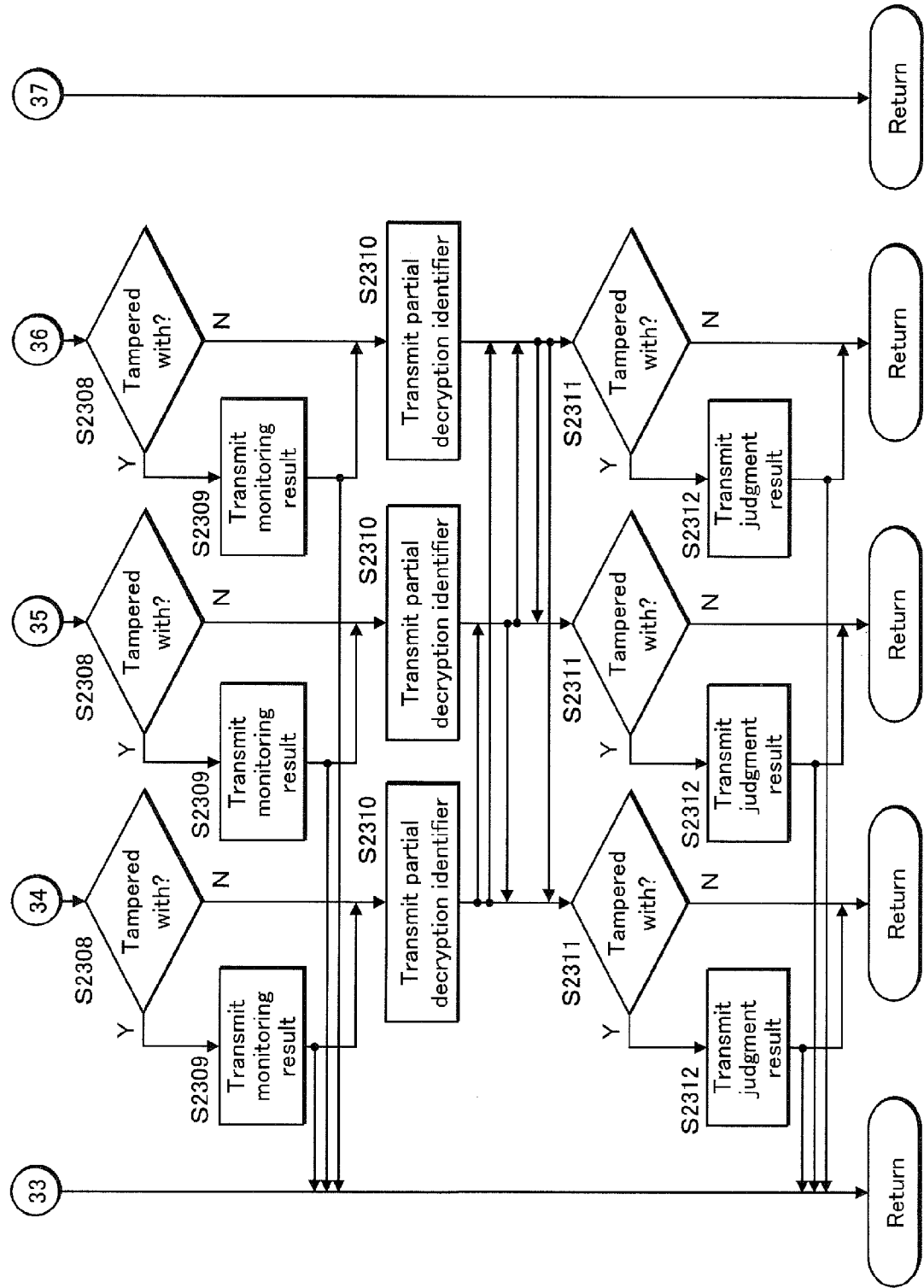
FIG. 36 is a sequence diagram illustrating the operation in the detection process, continuing from FIG. 35.

FIGS. 35 and 36 are sequence diagrams of the detection process performed in the detection system 10*c*.

The following explains an example case where the protection control module 120 performs the detection process when the device 100 executes the application 110.

The protection control module 120 receives a command to execute the application 110 (step S2300). The verification base data generating unit 309 of the protection control module 120 then extracts the data 241*a* associated with the partial decryption process 1, the data 241*b* associated with the partial decryption process 2, and the data 241*c* associated with the partial decryption process 3, from the verification base data 240 (FIG. 33) held by the verification base data holding unit 308, generates the data 241*a* associated with the partial decryption process 1 as verification base data 250*a* (illustrated in FIG. 37) of the partial decryption process 1, generates the data 241*b* associated with the partial decryption process 2 as verification base data 250*b* (illustrated in FIG. 38) of the partial decryption process 2, and generates the data 241*c* associated with the partial decryption process 3 as verification base data 250*c* (illustrated in FIG. 39) of the partial decryption process 3 (step S2301).

The verification base data 250*a* of the partial decryption process 1 illustrated in FIG. 37 is the same as the data 241*a* associated with the partial decryption process 1 of the verification base data 240 illustrated in FIG. 33. The verification base data 250*b* of the partial decryption process 2 illustrated in FIG. 38 is the same as the data 241*b* associated with the partial decryption process 2 of the verification base data 240 illustrated in FIG. 33. The verification base data 250*c* of the partial decryption process 3 illustrated in FIG. 39 is the same as the data 241*c* associated with the partial decryption process 3 of the verification base data 240 illustrated in FIG. 33.

After the verification base data 250*a*, 250*b* and 250*c* are generated, protection control module 120 decrypts the encrypted application 110 (step S2302).

The protection control module 120 determines to which detection modules among the detection modules 131, 132, 133, 134, and 135 the verification base data are to be distributed, by referring to the correspondence table 330 held by the detection module selecting unit 311 (step S2303). In this example, the detection modules 131, 132 and 133 are selected.

The protection control module 120 transmits, to the selected detection module 131, the application identification information identifying the application 110, the intermediate value 1 (356), and the verification base data 250*a* of the partial decryption process 1 (step S2304).

Also, the protection control module 120 transmits, to the selected detection module 132, the application identification information identifying the application 110, the intermediate value 2 (357), and the verification base data 250*b* of the partial decryption process 2 (step S2305).

Furthermore, the protection control module 120 transmits, to the selected detection module 133, the application identification information identifying the application 110, the data (358) of the decrypted application, and the verification base data 250*c* of the partial decryption process 3 (step S2306).

Each detection module verifies whether or not the correspondence between the input and the output of the partial decryption process is correct, by using the received verification base data (step S2307). More specifically, each detection module generates a verification value from the data included in the received verification base data and the data of the received intermediate value or the data of the application. Each detection module then compares the generated verification value with a verification value included in the received verification base data, and checks whether or not both verification values match. Furthermore, signature verification of the decryption process certificate is performed.

If verification values do not match or the signature verification has failed, each detection module judges that the intermediate value or the data of the application is not authentic (Y in step S2308), and transmits, to the determination unit 210, a monitoring result indicating that the intermediate value or the data of the application is not authentic (step S2309). When the verification values match and the signature verification has succeeded, each detection module judges that the protection control module 120 is not tampered with (N in step S2308), and transmits, to all the other detection modules, a notification that the partial decryption processes have been verified, together with the partial decryption identifiers in the verification base data (step S2310). As one example, the detection module 131 transmits a notification that the partial decryption process 1 has been verified, together with the partial decryption identifier "001" identifying the partial decryption process 1 (351). Following this, each of the detection modules confirms whether or not all partial decryption processes of the protection control module 120 have been verified (step S2311). More specifically, each detection module judges whether or not partial decryption identifiers identifying all the partial decryption processes other than the partial decryption process assigned to the detection module itself have been received. When it judges that partial decryption identifiers identifying all the partial decryption processes other than the partial decryption process assigned to the detection module itself have been received, each detection module judges that the protection control module 120 is not tampered with (N in step S2311) and the process ends.

If it judges that not all partial decryption identifiers identifying all the partial decryption processes other than the partial decryption process assigned to the detection module itself have been received, each detection module judges that the protection control module 120 has operated in an unauthorized manner since there is a possibility that not all partial decryption processes have been verified or a possibility that the output data (the intermediate value 1 (356), intermediate value 2 (357), and data (358) of a decrypted application) of all the partial decryption processes and the verification base data 250*a*, 250*b* and 250*c* have been transmitted to one detection module, and judges that the protection control module 120 is tampered with (Y in step S2311), and transmits, to the determination unit 210, a judgment result indicating that the protection control module 120 is tampered with (step S2312).

5.4 Effects of Detection System 10c

In the detection system 10c, the decryption process which is performed by the protection control module 120 is composed of a plurality of partial decryption processes that are decryption sub-processes, and the correspondence between the input data and the output data is verified for each partial decryption process. Accordingly, even if a detection module operates in an unauthorized manner, it is possible to prevent the whole decryption process, which is executed by the protection control module 120, from being leaked. Furthermore, it is possible to recognize which part among the whole decryption process executed by the protection control module 120 is tampered with.

Furthermore, even if a detection module that has not been selected by the protection control module 120 operates in an unauthorized manner, it does not affect the detection process targeted for the protection control module 120, and it is possible to verify whether or not the protection control module is tampered with.

6. Other modifications

While the present invention has been described based on the above Embodiments, the present invention is of course not limited to these Embodiments. The present invention also includes cases such as the following.

(1) In each of the above embodiments, a mutual monitoring process may be performed after the decryption process. The mutual monitoring process is explained in Patent Literature 3 in detail, and description thereof is omitted here.

(2) In the above modification (1), the mutual monitoring process is performed after the decryption process, and when it is judged that the protection control module 120 is normal and a detection module that operates in an unauthorized manner is detected through the mutual monitoring, the detected detection module that operates in an unauthorized manner may be invalidated by the protection control module 120. Also, an invalidation process may be performed by using a normal detection module. The invalidation process is explained in Patent Literature 3 in detail, and description thereof is omitted here.

(3) In the above Embodiment 4, all the n detection modules cooperate with each other, wherein each of the n detection modules calculates and transmits a random number, then each detection module adds up the random numbers of all the detection modules, and calculates selection information that is used to select a set of detection modules, by using the sum of the random numbers. However, the present invention is not limited to this structure.

For example, some of the n detection modules may cooperate with each other so that the selection information can be calculated by using random numbers generated by these cooperating detection modules.

More specifically, some of the n detection modules (in this example, m detection modules, wherein "m" is an integer equal to or smaller than "n") each generate a random number, and thus the m detection modules generate random numbers $r1, r2, \ldots, rm$. A sum of the generated m random numbers $r1, r2, \ldots, rm$ is calculated, and a modulo operation is performed on the sum of the random numbers by using the maximum value of index as the modulus (divisor), and a resultant value is used as the selection information.

Selection information=$(r1+r2 \ldots +rm)$mod(maximum value of index)

Here, when the calculation gives "0" as the selection information, the maximum value of index is used as the selection information.

(4) In the above Embodiment 4, all the detection modules cooperate with each other so that the selection information is calculated from random numbers transmitted from all the detection modules. However, the present invention is not limited to this structure.

All the detection modules and the protection control module 120 may cooperate with each other so that each module can calculate the selection information from random numbers transmitted from the other modules.

More specifically, each of the n detection modules calculates a random number and the n detection modules generate random numbers $r1, r2, \ldots, rn$, the protection control module generates a random number R, a sum of the generated (n+1) random numbers $R, r1, r2, \ldots, rn$ is calculated, and the selection information, which is used to determine a set of detection modules to be selected, is calculated by using the calculated sum of the random numbers.

Selection information=$(R+r1+r2 \ldots +rn)$mod(maximum value of index)

Here, when the calculation gives "0" as the selection information, the maximum value of index is used as the selection information.

Also, the following modification may be adopted. Each of m detection modules among the n detection modules calculates a random number and the m detection modules generate random numbers $r1, r2, \ldots, rm$, the protection control module generates a random number R, a sum of the generated (m+1) random numbers $R, r1, r2, \ldots, rm$ is calculated, and the selection information, which is used to determine a set of detection modules to be selected, is calculated by using the calculated sum of the random numbers.

Selection information=$(R+r1+r2 \ldots +rm)$mod(maximum value of index)

Here, when the calculation gives "0" as the selection information, the maximum value of index is used as the selection information.

(5) In the above Embodiment 4, all the detection modules cooperate with each other so that the selection information is calculated from random numbers transmitted from all the detection modules. However, the present invention is not limited to this structure.

The selection information may be determined by using a secret algorithm shared by the protection control module 120 and the detection modules.

For example, the protection control module 120 generates a random number R, and calculates a hash value H by performing a calculation using a hash function onto the generated random number R by using a key K that is held secretly by the protection control module 120.

$H$=KeyedHash$(K,R)$

Here, the "KeyedHash (A, B)" represents a hash value that is obtained by performing a calculation using a keyed hash function onto a value B by using a key A.

Similarly, each of n detection modules generates a random number ri, and calculates a hash value hi by performing a calculation using a keyed hash function KeyedHash onto the generated random number by using a key ki that is held secretly by each detection module.

$hi$=KeyedHash$(ki,ri)$ $(i=1, 2, \ldots, n)$

In this way, (n+1) hash values $H, h1, h2, \ldots, hn$ are calculated.

Next, a sum of the generated (n+1) random numbers is calculated, and a modulo operation is performed on the sum of the random numbers by using the maximum value of index as the modulus (divisor), and a resultant value is used as the selection information.

Selection information=$(H+h1+h2 \ldots +hn)$mod(maximum value of index)

Here, when the calculation gives "0" as the selection information, the maximum value of index is used as the selection information.

Note that the selection information may be calculated by using m detection modules among the n detection modules, not all the n detection modules.

Selection information=$(H+h1+h2 \ldots +hm)$mod(maximum value of index)

(6) In the above Embodiment 4, all the detection modules cooperate with each other so that the selection information is calculated from random numbers transmitted from all the detection modules. However, the present invention is not limited to this structure.

The selection information may be generated by using an ID of the device 100. The ID of the device 100 is, for example, a manufacturing number of the device 100.

For example, the selection information may be calculated as follows.

Selection information=(manufacturing number of device 100)mod(maximum value of index)

Here, when the calculation gives "0" as the selection information, the maximum value of index is used as the selection information.

With this structure, if an attacker analyzes one attack-target device and recognizes which index is selected by the analyzed device, since the other devices have different IDs from the ID of the analyzed device and selection information used by the other devices are different from the selection information used by the analyzed device, and thus the selection information recognized through the analysis of the attack-target device cannot be used in the other devices. In this way, it is possible to prevent attacks to the other devices.

(7) In the above Embodiment 4, all the detection modules cooperate with each other so that the selection information is calculated from random numbers transmitted from all the detection modules. However, the present invention is not limited to this structure.

The selection information may be calculated by using time information of the device 100. Here, as one example, the time information of the device 100 is composed of year, month, day, hour, minute, and second.

For example, the selection information may be calculated as follows.

Selection information=(year, month, day, hour, minute, and second)mod(maximum value of index)

Here, when the calculation gives "0" as the selection information, the maximum value of index is used as the selection information.

Also, the selection information may be calculated as follows.

Selection information=Hash(year, month, day, hour, minute, and second)mod(maximum value of index)

Here, when the calculation gives "0" as the selection information, the maximum value of index is used as the selection information.

(8) In the above Embodiment 4, all the detection modules cooperate with each other so that the selection information is calculated from random numbers transmitted from all the detection modules. However, the present invention is not limited to this structure.

The management device 200 may specify an index. The details are as follows. In step S2203, the protection control module 120 notifies each of the detection modules of an execution of the detection process. However, instead of this, the protection control module 120 notifies the management device 200 of an execution of the detection process. When the determination unit 210 of the management device 200 receives the notification of the detection process from the protection control module 120, the instruction generating unit 503 instructs the module selection unit 504 to select modules. The module selection unit 504 selects an index from the correspondence table, and transmits the selected index to the instruction generating unit 503. The instruction generating unit 503 transmits the index received from the module selection unit 504 to the protection control module 120 via the transmission unit 502.

Upon receiving the index, the protection control module 120 selects a set of detection module identifiers that corresponds to the received index.

(9) In the above Embodiment 4, in step S2208, the protection control module 120 receives indices from the detection modules, and selects detection modules based on the received indices. This process may be modified as follows. That is to say, if the indices received by the protection control module 120 from the plurality of detection modules do not match completely, namely, if one or more of the received indices differ from the other ones, the protection control module 120 judges that any of the detection modules operates in an unauthorized manner and notifies the determination unit 210 of the judgment.

(10) In the above Embodiment 4, in steps S2209 to S2211, the protection control module 120 transmits the verification base data to the detection modules that have been selected based on the selection information.

In this process, if the protection control module 120 does not transmit the verification base data to the detection modules that have been selected based on the selection information, the detection modules may judge that the protection control module 120 is tampered with, and notify the determination unit 210 of the judgment. Here, the detection modules know the actual value of the selection information, and thus can recognize the detection modules that are selected based on the selection information if they have the correspondence table 330. Accordingly, if one of the selected detection modules does not receive the verification base data, the detection module can recognize that the protection control module 120 has not transmitted the verification base data to the detection modules that were selected based on the selection information.

Also, if the verification base data is transmitted to a detection module that is not included in the detection modules that have been selected based on the selection information, it may be judged that the protection control module 120 is tampered with. Here, the detection modules know the actual value of the selection information, and thus can recognize the detection modules that are selected based on the selection information if they have the correspondence table 330. Accordingly, if a detection module not included in the selected detection modules receives the verification base data, the detection module can recognize that the protection control module 120 has not transmitted the verification base data to the detection modules that have been selected based on the selection information.

Also, if a detection module does not receive the application identification information, divisional data and verification base data within a predetermined time period after transmitting the selection information in step S2207, the detection module may judge that the protection control module 120 is tempered with.

(11) The above embodiments may be combined with the Modification (1) for implementation. In the above Modification (1), the mutual monitoring process is executed, and thus it is possible to check whether or not each detection module operates in an unauthorized manner after the detection process is performed. On the other hand, in the above embodiments, the mutual monitoring process is not executed, and thus the process of the device 100 can be light. Execution and no execution of the mutual monitoring process may be switched regularly, may be switched differently depending on the application, may be instructed to be switched by the management device 200, or may be switched in view of the state of processing inside the device 100. Also, in the case where the mutual monitoring process is executed, all detection modules may be selected in step S2003.

(12) Each of the above modules may be an individual computer program, a module embedded in the operating system, a driver program called by the operating system, or an application program.

(13) In the above Embodiments 2-5, a plurality of detection modules and a protection control module operate in the device 100 that is an information processing device. However, the present invention is not limited to this structure.

A protection-target computer program and a protection control module for protecting the computer program may operate in the device 100, a plurality of detection modules may operate in a detection device that is different from the device 100, and the plurality of detection modules may monitor the protection control module in the device 100. Here, the device 100 and the detection device are connected with each other via a network.

Here, the number of the detection devices is not limited to one. A plurality of detection devices may be connected with the device 100 via a network. The number of detection devices is equal to the number of detection modules. In each detection device, one detection module operates. The detection module in each detection device monitors the protection control module in the device 100. As a result, a plurality of detection modules operating in a plurality of detection devices monitor the protection control module in the device 100.

(14) In the above Embodiments 2-5, in the device 100 that is an information processing device, a plurality of pieces of divisional data are generated from an application, or a plurality of pieces of distribution data are generated from an application by the threshold secret sharing scheme, or the decryption process for decrypting an encrypted application is composed of a plurality of decryption sub-processes and the input data and the output data of each decryption sub-process is used. However, the present invention is not limited to this structure.

Since the protection control module is a control program, a plurality of pieces of divisional data may be generated from the protection control module. Also, a plurality of pieces of distribution data may be generated from the protection control module by the threshold secret sharing scheme. Furthermore, the protection control module may be encrypted, a decryption process for decrypting the encrypted protection control module may be composed of a plurality of decryption sub-processes, and the input data and the output data of each decryption sub-process may be used.

In these cases, the detection modules detect tampering of the protection control module by using the plurality of pieces of divisional data generated from the protection control module. Also, the detection modules detect tampering of the protection control module by using the plurality of pieces of distribution data generated from the protection control module. Furthermore, in the decryption process for decrypting the encrypted protection control module, tampering of the protection control module may be detected by using the input data and the output data of each decryption sub-process.

(15) Embodiment 2 and Embodiment 3 may be combined together. In that case, a plurality of pieces of divisional data are generated by a (k, d) secret sharing scheme instead of by the verifiable secret sharing scheme, wherein "k" denotes a threshold value, and "d" denotes the number of pieces of divisional data. As the verification values of the verification base data, hash values of the divisional data are used.

(16) The device 100 as an information processing device is specifically a personal computer, a BD playback device, a DVD playback device, a BD recording device, a DVD recording device, a digital broadcast reception playback device, a digital broadcast recording device, a mobile telephone or the like.

(17) The following structure may be adopted.

One aspect of the present invention relates to an information processing device comprising: a protection control module having a function to protect an application; and n detection modules, the protection control module including: a decryption unit receiving an encrypted application of the application as input data, decrypting the input data, and outputting a result of the decryption as output data; a dividing unit dividing the output data to at least d (d≥2) pieces of divisional data; a selection unit selecting d detection modules from among the n detection modules; and a distribution unit distributing the d pieces of divisional data to the d detection modules selected by the selection unit, each of the d detection modules including a verification unit judging whether or not a received piece of divisional data is authentic by using verification data and input data, the verification data being generated based on a piece of divisional data, the input data, and a value of divisional data that is expected when the decryption unit operates normally.

According to the present invention, each detection module does not perform a verification using data of the protection control module itself, but verifies the decryption process of the application executed by the protection control module. This prevents the confidential data stored in the protection control module from leaking to the detection modules.

Also, according to the present invention, even if (n−d) detection modules that do not execute the detection are attacked, it does not affect the detection process on the protection control module, making it possible to verify whether or not the protection control module is tampered with.

In the above information processing device, the dividing unit may generate the d pieces of divisional data so that the output data can be restored only by using k pieces of divisional data among the d pieces of divisional data.

With this structure, the output data can be restored from k pieces of divisional data held by k detection modules among the d detection modules. This makes it possible to confirm whether or not the output data has been decoded correctly from the input data.

In the above information processing device, the selection unit may select the d detection modules based on a piece of predetermined information by referring to a correspondence table indicating combinations of the predetermined information and detection module identification information.

With this structure, the protection control module can select detection modules by using the correspondence table.

In the above information processing device, the predetermined information may be updated each time the distribution unit distributes the divisional data.

With this structure, the predetermined information can be updated each time the distribution unit distributes the divisional data. This makes it possible for the protection control module to select a new set of detection modules at each selection, preventing transmission destinations of the divisional data from being determined arbitrarily.

In the above information processing device, the predetermined information may be generated by using partial information held by the detection modules.

With this structure, the detection modules determine the detection modules that are to be selected by the protection control module, preventing the protection control module from determining them arbitrarily.

In the above information processing device, each detection module may include a transmission unit generating a random number and transmitting the generated random number to other detection modules, and the partial information to be held may be the random number generated by the detection module.

With this structure, the detection modules determine, by using random numbers, the detection modules that are to be selected by the protection control module, preventing the protection control module from determining them arbitrarily.

The above information processing device may connect to a management device and may receive the predetermined information from the management device.

With this structure, the management device determines the detection modules that are to be selected by the protection control module, preventing the protection control module from determining them arbitrarily.

Another aspect of the present invention relates to an information processing device comprising: a protection control module having a function to protect an application; and n detection modules, the protection control module including: a decryption unit executing a decryption process onto an encrypted application of the application, the decryption process being composed of d process steps; a selection unit selecting d detection modules from among the n detection modules; and a distribution unit distributing d pieces of verification-target data, which are output data of the respective d process steps, to the d detection modules, each of the d detection modules including a verification unit judging whether or not the verification-target data is authentic by using a distributed piece of verification-target data, input data of a process step corresponding to the distributed piece of verification-target data, and verification data that is generated based on the input data and output data that is expected when the decryption unit operates normally.

According to the above structure, each detection module does not perform a verification using data of the protection control module itself, but verifies the decryption process of the application executed by the protection control module. This prevents the confidential data stored in the protection control module from leaking to the detection modules.

Also, according to the present invention, a plurality of detection modules verify respectively different process steps. This prevents data of the application from leaking to the detection modules.

Also, according to the present invention, it is possible to detect which process step of the detection process is tampered with.

(18) The following structure may be adopted.

(a) A further aspect of the present invention relates to a tampering monitoring system comprising: a protection control circuit protecting a computer program; n detection circuits monitoring the protection control circuit, wherein "n" is a positive integer; and a management device.

The protection control circuit includes: a generation circuit generating d pieces of distribution data from the computer program, wherein "d" is a positive integer smaller than "n"; a selection circuit selecting d detection circuits from among the n detection circuits; and a distribution circuit distributing the generated d pieces of distribution data to the selected d detection circuits on a one-to-one basis.

Each of the d detection circuits judges whether or not a received piece of distribution data is authentic to detect whether or not the protection control circuit is tampered with, and transmits a judgment result indicating whether or not the protection control circuit is tampered with.

The management device receives judgment results from the d detection circuits and manages the protection control circuit with regard to tampering by using the received judgment results.

The detection circuit includes: a reception circuit receiving a piece of distribution data from the protection control circuit that generates d pieces of distribution data from the computer program, selects d detection circuits from among the n detection circuits that are for monitoring the protection control circuit, and distributes the generated d pieces of distribution data to the selected d detection circuits on a one-to-one basis, wherein "n" and "d" are positive integers and "d" is smaller than "n"; a verification circuit judging whether or not the received piece of distribution data is authentic; a transmission circuit transmitting a monitoring result indicating that the piece of distribution data is authentic to other detection circuits when the verification circuit judges that the received piece of distribution data is authentic. The reception circuit receives, from the other detection circuits, monitoring results indicating whether or not distribution data received by the other detection circuits are authentic. The verification circuit judges whether or not the protection control circuit is tampered with by using the monitoring result of the detection circuit itself and the received monitoring results. The transmission circuit transmits a judgment result indicating whether or not the protection control circuit is tampered with.

(b) A still further aspect of the present invention relates to a tampering monitoring system comprising: a protection control module protecting a protection-target computer program; n detection modules monitoring the protection control module, wherein "n" is a positive integer; and a management device.

The protection control module includes: a memory storing a control computer program composed of a plurality of computer instructions; and a processor reading computer instructions one by one from the control computer program stored in the memory, analyzing each read computer instruction, and operating based on each result of analysis. The control computer program causes a computer to perform the steps of: generating d pieces of distribution data from the computer program, wherein "d" is a positive integer smaller than "n"; selecting d detection modules from among the n detection modules; and distributing the generated d pieces of distribution data to the selected d detection modules on a one-to-one basis.

Each of the d detection modules judges whether or not a received piece of distribution data is authentic to detect whether or not the protection control module is tampered with, and transmits a judgment result indicating whether or not the protection control module is tampered with.

The management device receives judgment results from the d detection modules and manages the protection control module with regard to tampering by using the received judgment results.

Each detection module includes: a memory storing a control computer program composed of a plurality of computer instructions; and a processor reading computer instructions one by one from the control computer program stored in the memory, analyzing each read computer instruction, and operating based on each result of analysis. The control computer program causes a computer to perform the steps of: receiving a piece of distribution data from the protection control module; judging whether or not the received piece of distribution data is authentic; transmitting a monitoring result indicating that the piece of distribution data is authentic to other detection modules. The receiving step receives, from the other detection modules, monitoring results indicating whether or not distribution data received by the other detection modules are authentic. The judging step judges whether or not the protection control module is tampered with by using the monitoring result of the detection module itself and the received monitoring results. The transmitting step transmits a judgment result indicating whether or not the protection control module is tampered with.

(19) Each of the above devices is, specifically, a computer system composed of a microprocessor, ROM, RAM, hard disk unit, display unit, keyboard, mouse, etc. A computer program is stored on the RAM or the hard disk unit. Each device fulfills its functions when the microprocessor operates in accordance with the computer program. To fulfill its functions, the computer program is composed of a combination of instruction codes that indicate instructions to the computer.

(20) Part or all of constituent elements constituting each of the above devices may be achieved in a system LSI (Large Scale Integration). The system LSI is an ultra multi-functional LSI that is manufactured by integrating a plurality of components on one chip. More specifically, the system LSI is a computer system including a microprocessor, ROM, RAM, and the like. A computer program is stored on the RAM. The microprocessor operates in accordance with the computer program, thereby enabling the system LSI to fulfill its functions.

Each part of constituent elements constituting each of the above devices may be achieved on one chip, or part or all thereof may be achieved on one chip.

Although the term "system LSI" is used here, it may be called IC, LSI, super LSI, ultra LSI or the like, depending on the level of integration. Also, an integrated circuit may not necessarily be manufactured as an LSI, but may be achieved by a dedicated circuit or a general-purpose processor. It is also possible to use the FPGA (Field Programmable Gate Array), with which a programming is available after the LSI is manufactured, or the reconfigurable processor that can re-configure the connection or setting of the circuit cells within the LSI.

Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

(21) Part or all of the constituent elements constituting each of the above devices may be achieved as an IC card or a single module that is attachable/detachable to or from each device. The IC card or module is a computer system that includes a microprocessor, ROM, RAM, and the like. The IC card or module may include the above-mentioned ultra multi-functional LSI. The microprocessor operates in accordance with the computer program and causes the IC card or module to fulfill its functions. The IC card or module may be tamper-resistant.

(22) The present invention may be methods shown by the above. The present invention may be a computer program that allows a computer to realize the methods, or may be digital signals representing the computer program.

Furthermore, the present invention may be a computer-readable recording medium such as a flexible disk, a hard disk, CD-ROM, MO, DVD, DVD-ROM, DVD RAM, BD (Blu-ray Disc), or a semiconductor memory, that stores the computer program or the digital signals. Furthermore, the present invention may be the digital signals recorded on any of the above recording mediums.

Furthermore, the present invention may be the computer program or the digital signals transmitted via an electric communication line, a wireless or wired communication line, a network of which the Internet is representative, a data broadcast or the like.

Furthermore, the present invention may be a computer system that includes a microprocessor and a memory, the memory storing the computer program, and the microprocessor operating according to the computer program.

Furthermore, by transferring the program or the digital signal via the recording medium, or by transferring the program or the digital signal via the network or the like, the program or the digital signal may be executed by another independent computer system.

(23) The present invention may be any combination of the above-described embodiments and modifications.

Industrial Applicability

In the tampering monitoring system, protection control module and detection module of the present invention, not all the detection modules, but the detection modules selected by the protection control module are caused to execute the detection process. With this structure, even if some detection modules not selected by the protection control module are tampered with and operate in an unauthorized manner, if the selected detection modules are not tampered with, it is regarded as a whole of the tampering monitoring system that the tampering does not have an effect on the tampering detection process targeted for the protection control module. This structure produces an advantageous effect that it is possible to verify whether or not the protection control module is tampered with, and is useful as a technology for monitoring modules and the like operating in devices.

Reference Signs List 10, 10a, 10b, 10c detection system
10d monitoring system
100 device
110, 111, 112, 113, 114 application
120, 120d protection control module
130 detection module group
131, 132, 133, 134, 135 detection module
130d1, 130d2, . . . , 130dn detection module
171 CPU
172 EEPROM
173 RAM
180 OS
190 boot loader
200, 200d management device
210 determination unit 220, 220a verification base data distribution unit
230 communication unit
301 reception unit
302 transmission unit
302d distribution unit
303 control unit
304 decryption load unit
305 tampering detection unit
306 analysis tool detection unit
307 encryption/decryption key holding unit
308 verification base data holding unit
309 verification base data generating unit
310 application dividing unit
310d generation unit
311, 311a detection module selecting unit
311d selection unit
401 reception unit
402 transmission unit
403 control unit
404 verification unit
405 verification base data holding unit
501 reception unit
502 transmission unit
503 instruction generating unit
504 module selection unit
601 reception unit
602 transmission unit
603 control unit
604 authentication unit
605 certificate generating unit
606 signature secret key holding unit
607 encryption key holding unit
608 data dividing unit
609 application holding unit
610 verification base data generating unit
611 protection control module holding unit
612 detection module holding unit
621 software execution unit

The invention claimed is:

1. A tampering monitoring system comprising:
a protection control device protecting a computer program;
n detection devices monitoring the protection control device, wherein "n" is a positive integer; and
a management device,
wherein the management device includes:
 a first generation unit generating d pieces of first distribution data from the computer program, which is authentic, and generating d pieces of verification data from the generated d pieces of first distribution data, wherein "d" is a positive integer smaller than "n"; and
 a transmission unit transmitting the generated d pieces of verification data,
wherein the protection control device includes:
 a reception unit receiving the d pieces of verification data;
 a second generation unit generating d pieces of second distribution data from the computer program;
 a selection unit randomly selecting d detection devices from among the n detection devices; and
 a distribution unit distributing d data pairs to the randomly-selected d detection devices on a one-to-one basis, each data pair including a different one of the generated d pieces of second distribution data and one of the d pieces of verification data corresponding to the piece of second distribution data,
wherein each of the d detection devices judges whether or not the piece of second distribution data in the received data pair is authentic by using the piece of verification data and the piece of second distribution data in the received data pair, judges that the protection control device is not tampered with when judging that the piece of second distribution data is authentic, judges that the protection control device is tampered with when judging that the piece of second distribution data is not authentic, and transmits a judgment result indicating whether or not the protection control device is tampered with, and
wherein the management device receives judgment results from the d detection devices and manages the protection control device with regard to tampering by using the received judgment results.

2. The tampering monitoring system of claim 1, further comprising:
an information processing device that includes the protection control device and the n detection devices and stores the computer program,
wherein the information processing device is connected with the management device via a network.

3. The tampering monitoring system of claim 1, further comprising:
an information processing device,
wherein the information processing device includes the protection control device and stores the computer program, and
wherein the information processing device, the n detection devices, and the management device are connected with each other via a network.

4. A protection control device protecting a computer program, the protection control device comprising:
a generation unit generating d pieces of distribution data from the computer program, wherein "d" is a positive integer;
a selection unit randomly selecting d detection devices from among n detection devices monitoring the protection control device, wherein "n" is a positive integer greater than "d"; and
a distribution unit distributing d data pairs to the randomly-selected d detection devices on a one-to-one basis, each data pair including a different one of the generated d pieces of distribution data and one of d pieces of verification data corresponding to the piece of distribution data,
wherein each of the d detection devices judges whether or not the piece of distribution data in a received data pair is authentic by using the piece of verification data and the piece of distribution data in the received data pair, judges that the protection control device is not tampered with when judging that the piece of distribution data is authentic, and judges that the protection control device is tampered with when judging that the piece of distribution data is not authentic.

5. The protection control device of claim 4, wherein the generation unit includes:
a storage unit storing an encrypted computer program having been generated by encrypting the computer program;
a decryption unit generating a computer program by decrypting the encrypted computer program; and
a distribution data generating unit generating the d pieces of distribution data from the generated computer program.

6. The protection control device of claim 5, wherein the distribution data generating unit generates the d pieces of distribution data by dividing data constituting the computer program.

7. The protection control device of claim 5, wherein
wherein the distribution data generating unit generates the d pieces of distribution data from the data constituting the computer program by a verifiable secret sharing scheme, and
wherein the verifiable secret sharing scheme is a secret sharing scheme for splitting the computer program amongst a plurality of members, each of which is allocated a share of the computer program so that the computer program can be restored by using k or more pieces of split data, wherein "k" is a positive integer smaller than "d".

8. The protection control device of claim 4,
wherein the generation unit includes:
 a storage unit storing an encrypted computer program having been generated by encrypting the computer program; and
 a decryption unit generating the d pieces of distribution data from the encrypted computer program when performing a decryption process to decrypt the encrypted computer program, and
wherein the decryption process is composed of d decryption sub-processes, and in the decryption process, the d decryption sub-processes are performed in sequence to decrypt the encrypted computer program, and d outputs of the respective d decryption sub-processes are used as the d pieces of distribution data.

9. The protection control device of claim 4,
wherein the selection unit holds a correspondence table including one or more pairs of: a combination of d detection devices among the n detection devices; and a piece of identification information identifying the combination of d detection devices, and
wherein the selection unit obtains selection information to be used to select a combination of d detection devices, obtains a combination of d detection devices identified by a piece of identification information that corresponds to the obtained selection information, and selects detection devices included in the obtained combination.

10. The protection control device of claim 9, wherein
the selection unit generates a random number and uses the generated random number as the selection information.

11. The protection control device of claim 9, wherein
the selection unit newly generates selection information each time the distribution unit distributes d pieces of distribution data.

12. The protection control device of claim 9,
wherein each of the detection devices generates a random number and transmits the generated random number to all of the other detection devices,
wherein each of the detection devices generates selection information by using received random numbers and the random number generated by the detection device, and transmits the generated selection information to the protection control device, and
wherein the selection unit receives the selection information from the detection devices, and uses the received selection information.

13. The protection control device of claim 9,
wherein a management device managing the protection control device with regard to tampering generates the selection information and transmits the generated selection information to the protection control device, and
wherein the selection unit receives the selection information from the management device and uses the received selection information.

14. The protection control device of claim 4, wherein
the computer program is one of: an application program to be protected by the protection control device; and a program that indicates an operation procedure of the protection control device.

15. The protection control device of claim 4,
wherein the protection control device is included in an information processing device, and
wherein the information processing device stores the computer program.

16. A detection device monitoring a protection control device protecting a computer program, the protection control device (i) generating d pieces of distribution data from the computer program, (ii) randomly selecting d detection devices from among n detection devices, including the detection device, that are for monitoring the protection control device, (iii) distributing d data pairs to the randomly-selected d detection devices on a one-to-one basis, each data pair including a different one of the generated d pieces of distribution data and one of d pieces of verification data corresponding to the piece of distribution data, wherein "n" and "d" are positive integers and "d" is smaller than "n", the detection device comprising:
 a receiving unit receiving a data pair, from among the d data pairs distributed by the protection control device, including a piece of distribution data and a piece of verification data corresponding to the piece of distribution data;
 a verification unit judging whether or not the piece of distribution data in the received data pair is authentic by using the piece of verification data and the piece of distribution data in the received data pair; and
 a transmission unit transmitting a monitoring result indicating that the piece of distribution data is authentic to other detection devices when the verification unit judges that the received piece of distribution data is authentic,
wherein the reception unit receives, from the other detection devices, monitoring results indicating that distribution data received by the other detection devices are authentic,
wherein the verification unit judges whether or not the protection control device is tampered with by using the monitoring result of the detection device and the received monitoring results, and
wherein the transmission unit transmits a judgment result indicating whether or not the protection control device is tampered with.

17. The detection device of claim 16,
wherein the detection unit judges whether or not all of the d detection devices, including the detection device, have judged that the distribution data received by the d detection devices are authentic, by using the monitoring result of the detection device and the received monitoring results,
wherein the detection unit determines that the protection control device is not tampered with if it is judged that all of the d detection devices have judged that the received distribution data are authentic, and
wherein the detection unit determines that the protection control device is tampered with if it is judged that at least one of the d detection devices has judged that the received distribution data is not authentic.

18. The detection device of claim 16,
wherein the protection control device generates the d pieces of distribution data by a verifiable secret sharing scheme from data constituting the computer program, the verifiable secret sharing scheme being a secret sharing scheme for splitting the computer program amongst a plurality of members, each of which is allocated a share of the computer program so that the computer program can be restored by using k or more pieces of split data, wherein "k" is a positive integer smaller than "d", wherein the detection unit judges whether or not at least k detection devices, including the detection device, have judged that the distribution data received by the at least k detection devices are authentic, by using the monitoring result of the detection device itself and the received monitoring results, wherein the detection unit determines that the protection control device is not tampered with if it is judged that the at least k detection devices have judged that the received distribution data are authentic, and wherein the detection unit determines that the protection control device is tampered with if it is judged that distribution data received by (d −k +1) or more detection devices are not authentic.

19. The detection device of claim 16, wherein
the n detection devices and the protection control device are included in an information processing device that stores the computer program.

20. The detection device of claim 16, wherein
the protection control device is included in an information processing device that stores the computer program.

21. A control method for controlling a protection control device protecting a computer program, the control method comprising the steps of:
generating d pieces of distribution data from the computer program, wherein "d" is a positive integer;
randomly selecting d detection devices from among n detection devices monitoring the protection control device, wherein "n" is a positive integer greater than "d"; and
distributing d data pairs to the randomly-selected d detection devices on a one-to-one basis, each data pair including a different one of the generated d pieces of distribution data and one of d pieces of verification data corresponding to the piece of distribution data,
wherein each of the d detection devices judges whether or not the piece of distribution data in a received data pair is authentic by using the piece of verification data and the piece of distribution data in the received data pair, judges that the protection control device is not tampered with when judging that the piece of distribution data is authentic, and judges that the protection control device is tampered with when judging that the piece of distribution data is not authentic.

22. A non-transitory computer-readable recording medium storing a control program for controlling a protection control device protecting a computer program, the control program causing a computer to execute the steps of:
generating d pieces of distribution data from the computer program, wherein "d" is a positive integer;
randomly selecting d detection devices from among n detection devices monitoring the protection control device, wherein "n" is a positive integer greater than "d"; and distributing d data pairs to the randomly-selected d detection devices on a one-to-one basis, each data pair including a different one of the generated d pieces of distribution data and one of d pieces of verification data corresponding to the piece of distribution data,
wherein each of the d detection devices judges whether or not the piece of distribution data in a received data pair is authentic by using the piece of verification data and the piece of distribution data in the received data pair, judges that the protection control device is not tampered with when judging that the piece of distribution data is authentic, and judges that the protection control device is tampered with when judging that the piece of distribution data is not authentic.

23. A control method for controlling a detection device monitoring a protection control device protecting a computer program, the protection control device (i) generating d pieces of distribution data from the computer program, (ii) randomly selecting d detection devices from among n detection devices, including the detection device, that are for monitoring the protection control device, (iii) distributing d data pairs to the randomly-selected d detection devices on a one-to-one basis, each data pair including a different one of the generated d pieces of distribution data and one of the d pieces of verification data corresponding to the piece of distribution data, wherein "n" and "d" are positive integers and "d" is smaller than "n", the control method comprising the steps of:
receiving a data pair, from among the d data pairs distributed by the protection control device, including a piece of distribution data and a piece of verification data corresponding to the piece of distribution data;
judging whether or not the received piece of distribution data in the received data pair is authentic by using the piece of verification data and the piece of distribution data in the received data pair; and
transmitting a monitoring result indicating that the piece of distribution data is authentic to other detection devices when the verification step judges that the received piece of distribution data is authentic,
wherein the receiving step includes receiving, from the other detection devices, monitoring results indicating whether or not distribution data received by the other detection devices are authentic,
wherein the judging step includes judging whether or not the protection control device is tampered with by using the monitoring result of the detection device and the received monitoring results, and
wherein the transmitting step includes transmitting a judgment result indicating whether or not the protection control device is tampered with.

24. A non-transitory computer-readable recording medium storing a control program for controlling a detection device monitoring a protection control device protecting a computer program, the protection control device (i) generating d pieces of distribution data from the computer program, (ii) randomly selecting d detection devices from among n detection devices, including the detection device, that are for monitoring the protection control device, (iii) distributing d data pairs to the randomly-selected d detection devices on a one-to-one basis, each data pair including a different one of the generated d pieces of distribution data and one of d pieces of verification data corresponding to the piece of distribution data, wherein "n" and "d" are positive integers and "d" is smaller than "n", the control program causing a computer to execute the steps of:
receiving a data pair, from among the d data pairs distributed by the protection control device, including a piece of distribution data and a piece of verification data corresponding to the piece of distribution data;
judging whether or not the piece of distribution data in the received data pair is authentic by using the piece of verification data and the piece of distribution data in the received data pair; and
transmitting a monitoring result indicating that the piece of distribution data is authentic to other detection device when the verification step judges that the received piece of distribution data is authentic, wherein the receiving step includes receiving, from the other detection devices, monitoring results indicating whether or not distribution data received by the other detection devices are authentic, wherein the judging step includes judging whether or not the protection control device is tampered with by using the monitoring result of the detection device and the received monitoring results, and wherein the transmitting step includes a judgment result indicating whether or not the protection control device is tampered with.

25. The tampering monitoring system of claim 1, wherein each of the d pieces of verification data generated by the first generation unit includes identification information for identifying the verification data, and wherein the distribution unit distributes each of the d data pairs to a corresponding one of the d detection devices based on the identification information included in the piece of verification data in the data pair.

* * * * *